(12) United States Patent
Boduch et al.

(10) Patent No.: US 8,165,468 B2
(45) Date of Patent: Apr. 24, 2012

(54) METHODS AND APPARATUS FOR PERFORMING DIRECTIONLESS WAVELENGTH ADDITION AND SUBTRACTION WITHIN A ROADM BASED OPTICAL NODE

(75) Inventors: Mark E. Boduch, Geneva, IL (US); Kimon Papakos, Chicago, IL (US)

(73) Assignee: Tellabs Operations, Inc., Naperville, IL (US)

( * ) Notice: Subject to any disclaimer, the term of this patent is extended or adjusted under 35 U.S.C. 154(b) by 773 days.

(21) Appl. No.: 12/319,839

(22) Filed: Jan. 13, 2009

(65) Prior Publication Data
US 2009/0180779 A1   Jul. 16, 2009

Related U.S. Application Data

(60) Provisional application No. 61/011,047, filed on Jan. 14, 2008, provisional application No. 61/133,210, filed on Jun. 25, 2008.

(51) Int. Cl.
*H04J 14/02* (2006.01)
(52) U.S. Cl. ............... 398/83; 398/82; 398/48; 398/49; 398/59; 398/79; 370/401; 385/24
(58) Field of Classification Search ............... 398/3–5, 398/27, 34, 45, 48–50, 55, 59, 79, 82, 83; 370/235, 351, 401, 409; 385/24
See application file for complete search history.

(56) References Cited

U.S. PATENT DOCUMENTS

| | | | |
|---|---|---|---|
| 7,072,580 B2 * | 7/2006 | Arecco et al. | 398/4 |
| 7,437,075 B2 * | 10/2008 | Doerr et al. | 398/83 |
| 7,620,321 B2 * | 11/2009 | Miura et al. | 398/45 |
| 7,751,714 B2 * | 7/2010 | Zhong et al. | 398/83 |
| 7,995,921 B2 * | 8/2011 | Grubb | 398/79 |
| 8,009,986 B2 * | 8/2011 | Chang et al. | 398/83 |

(Continued)

FOREIGN PATENT DOCUMENTS

EP    1 349 309 A2    10/2003

(Continued)

OTHER PUBLICATIONS

Notification of Transmittal of the International Search Report and the Written Opinion of the International Searching Authority, or the Declaration, for PCT/US2010/031233, mailed Jul. 22, 2010, 12 pages.

(Continued)

*Primary Examiner* — Loha Ben
(74) *Attorney, Agent, or Firm* — Hamilton, Brook, Smith & Reynolds, P.C.

(57) ABSTRACT

In today's reconfigurable optical add/drop multiplexer (ROADM) based optical node, transponders associated with the ROADMs' add/drop ports are dedicated to a given network node interface. Dedicated transponders reduce the flexibility to route around network failures. Example embodiments of the invention includes an optical node and corresponding method for routing optical signals within an optical node. The optical node may include at least two ROADMs to transmit respective wavelength division multiplexed (WDM) signals onto at least two inter-node network paths and at least one add/drop module including add ports to direct add wavelengths received from tributary network paths to each of the ROADMs via intra-node network paths to allow the wavelengths to be available to be added to the inter-node network paths. Advantageously, a transponder may transmit and receive to and from different network node interfaces within the optical node, thereby improving the optical node's ability to route around network failures.

33 Claims, 37 Drawing Sheets

U.S. PATENT DOCUMENTS

| | | | |
|---|---|---|---|
| 2006/0133804 A1 | 6/2006 | Boduch et al. | |
| 2008/0069123 A1* | 3/2008 | Nagata et al. | 370/401 |
| 2008/0118245 A1 | 5/2008 | Chang et al. | |
| 2008/0131130 A1 | 6/2008 | Chang et al. | |
| 2008/0260386 A1* | 10/2008 | Boduch et al. | 398/83 |
| 2010/0272441 A1* | 10/2010 | Boduch et al. | 398/83 |

FOREIGN PATENT DOCUMENTS

EP        1 628 424 A2    2/2006

OTHER PUBLICATIONS

Kaman, V., et al., "Comparison of Wavelength-Selective Cross-Connect Architectures for Reconfigurable All-Optical Networks," *PS'2006—Photonics in Switching Conference*, pp. 1-3; (Oct. 2006).

Kaman, V., et al., "Multi-Degree ROADM's with Agile Add-Drop Access," pp. 31-32, (Aug. 2007).

"Media for Lightwave", [online], Pen Well Corporation, Dec. 2008, [retrieved on Feb. 9, 2009]. Retrieved from the Internet URL: http://lw.pennnet.com/Articles/Article_Display.cfm?ARTICLE_ID=252957&p=13&dcmp=LWDENL_ARCH.

"Who Makes What: ROADMs", *Light Reading*, CMP Media LLC, Jul. 26, 2004.

Roorda, P., et al., "Evolution to Colorless and Directionless ROADM Architectures," Paper presented at the Optical Fiber Communication Conference and Exposition and the National Fiber Optic Engineers Conference (OFC/NFOEC 2008), (Feb. 2008).

Notification of Transmittal of the International Search Report and the Written Opinion of the International Searching Authority, or the Declaration, for PCT/US2009/000193, mailed on May 5, 2009.

* cited by examiner

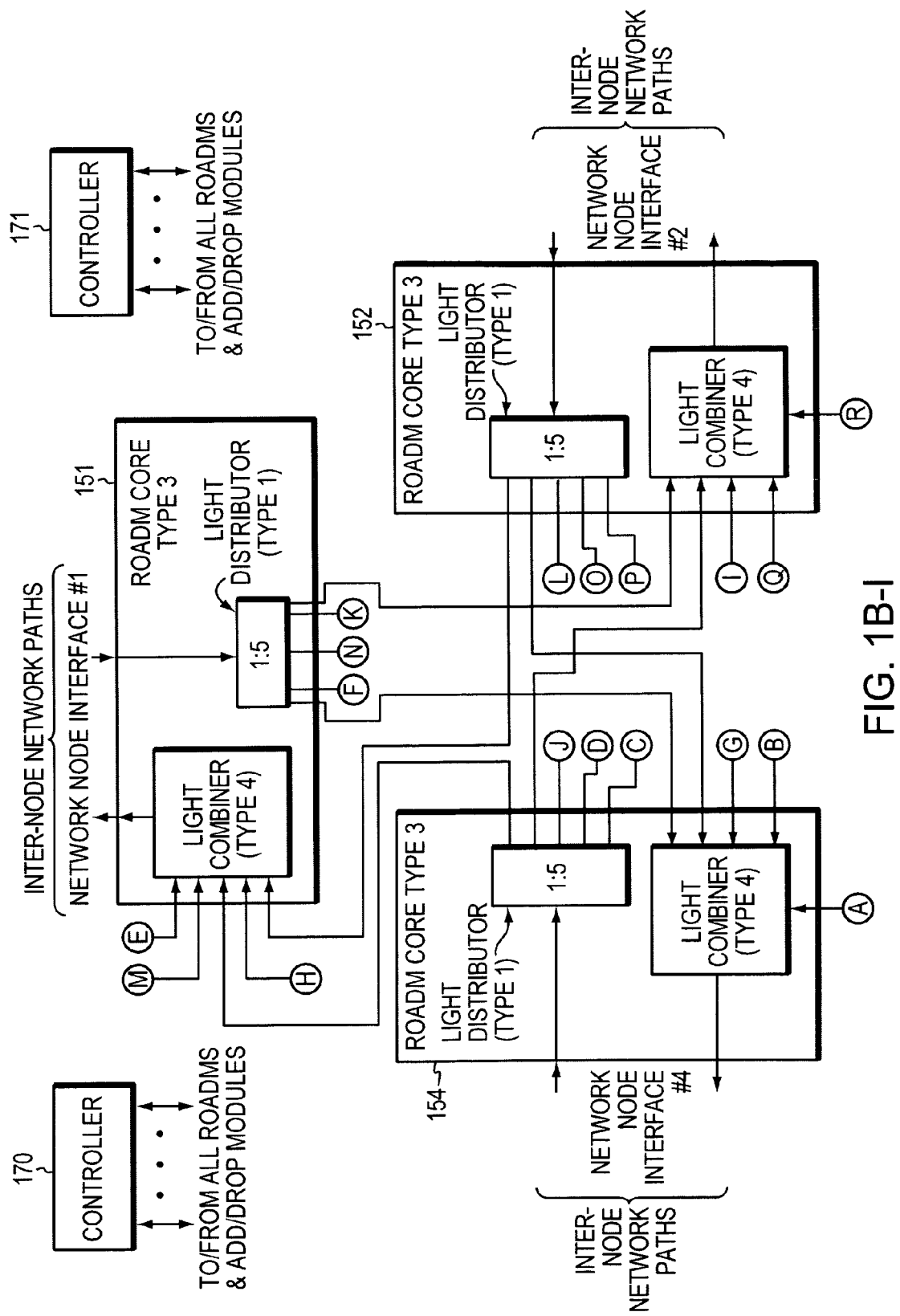
FIG. 1B-I

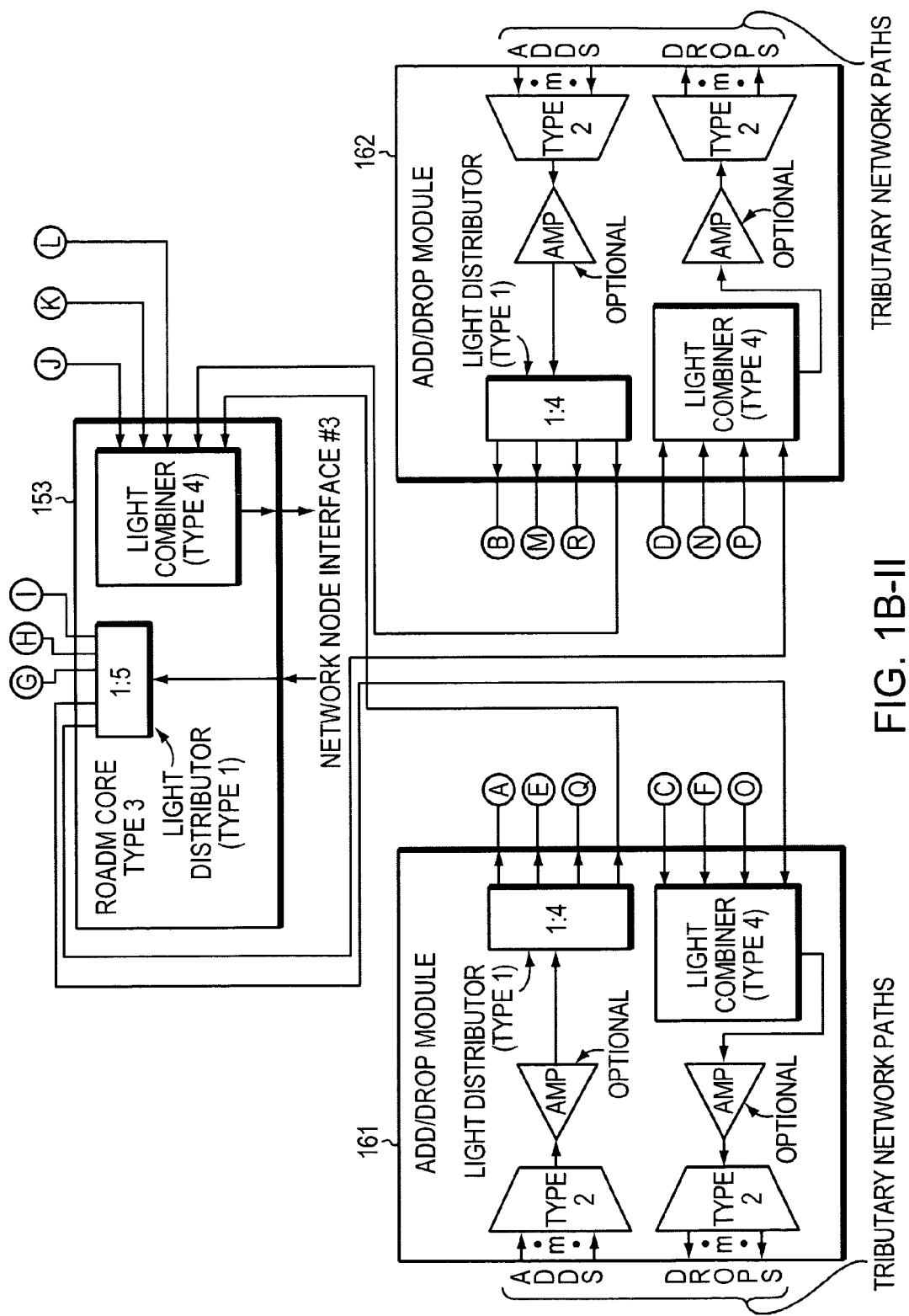
FIG. 1B-II

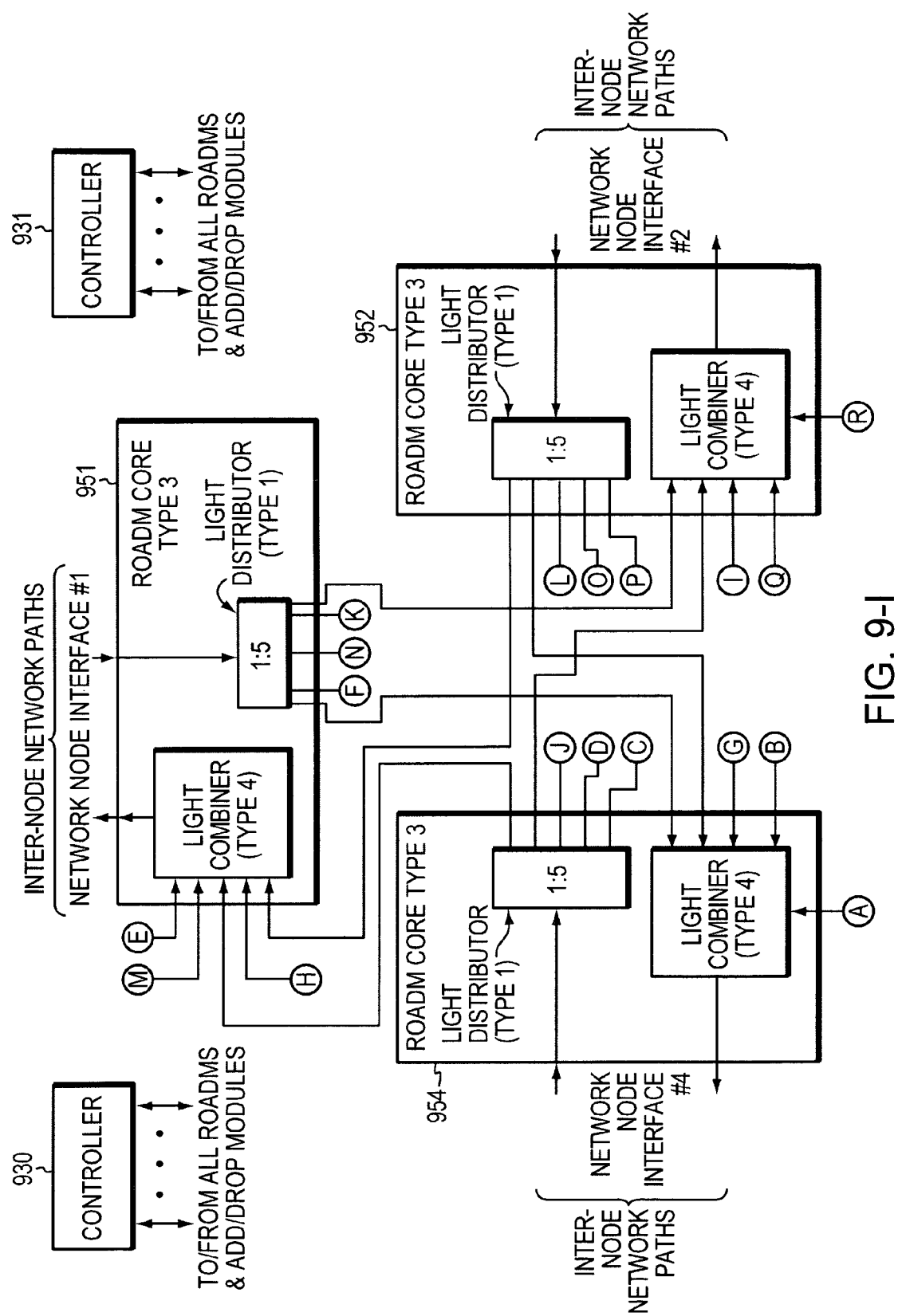
FIG. 9-I

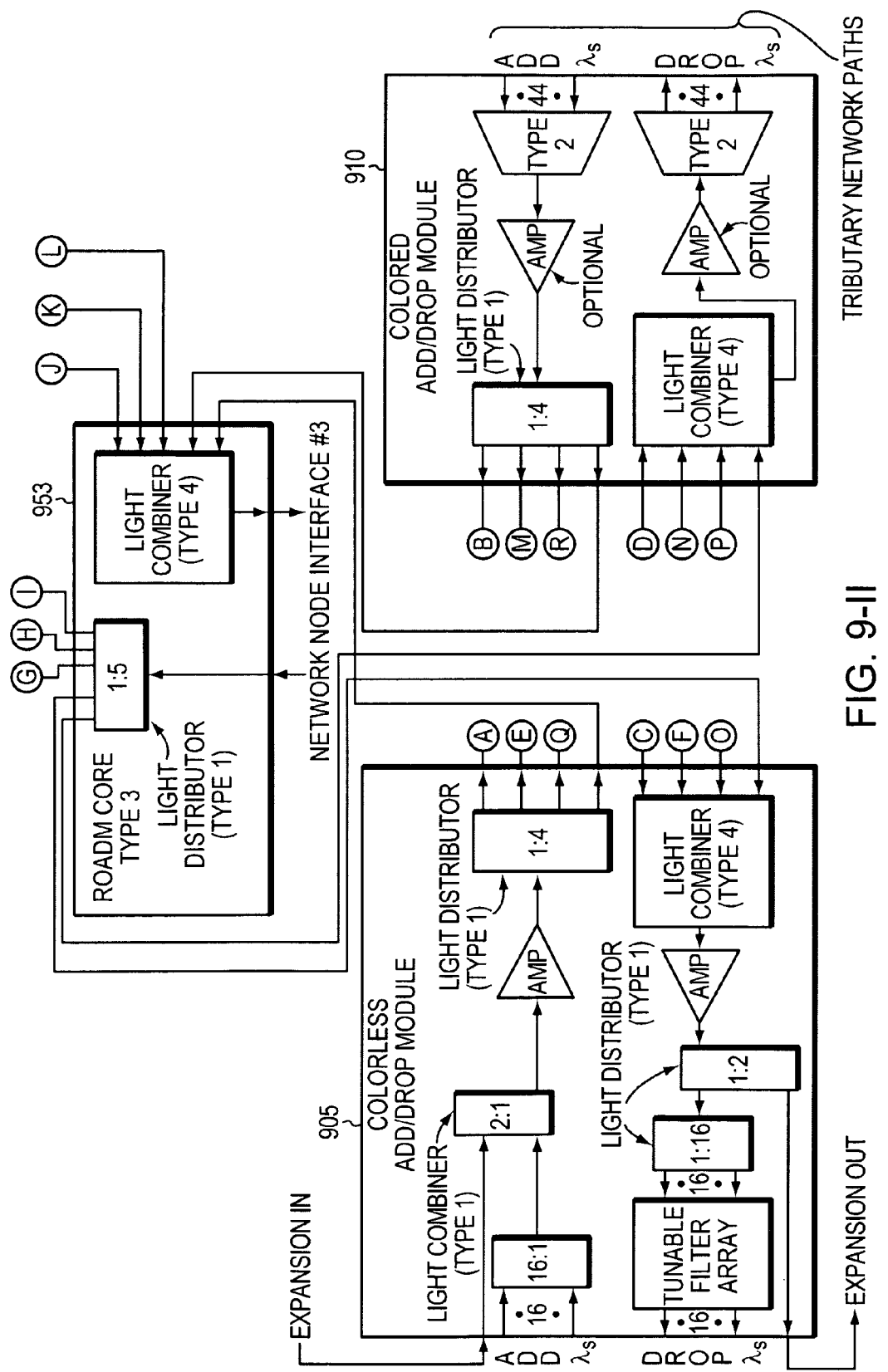
FIG. 9-II

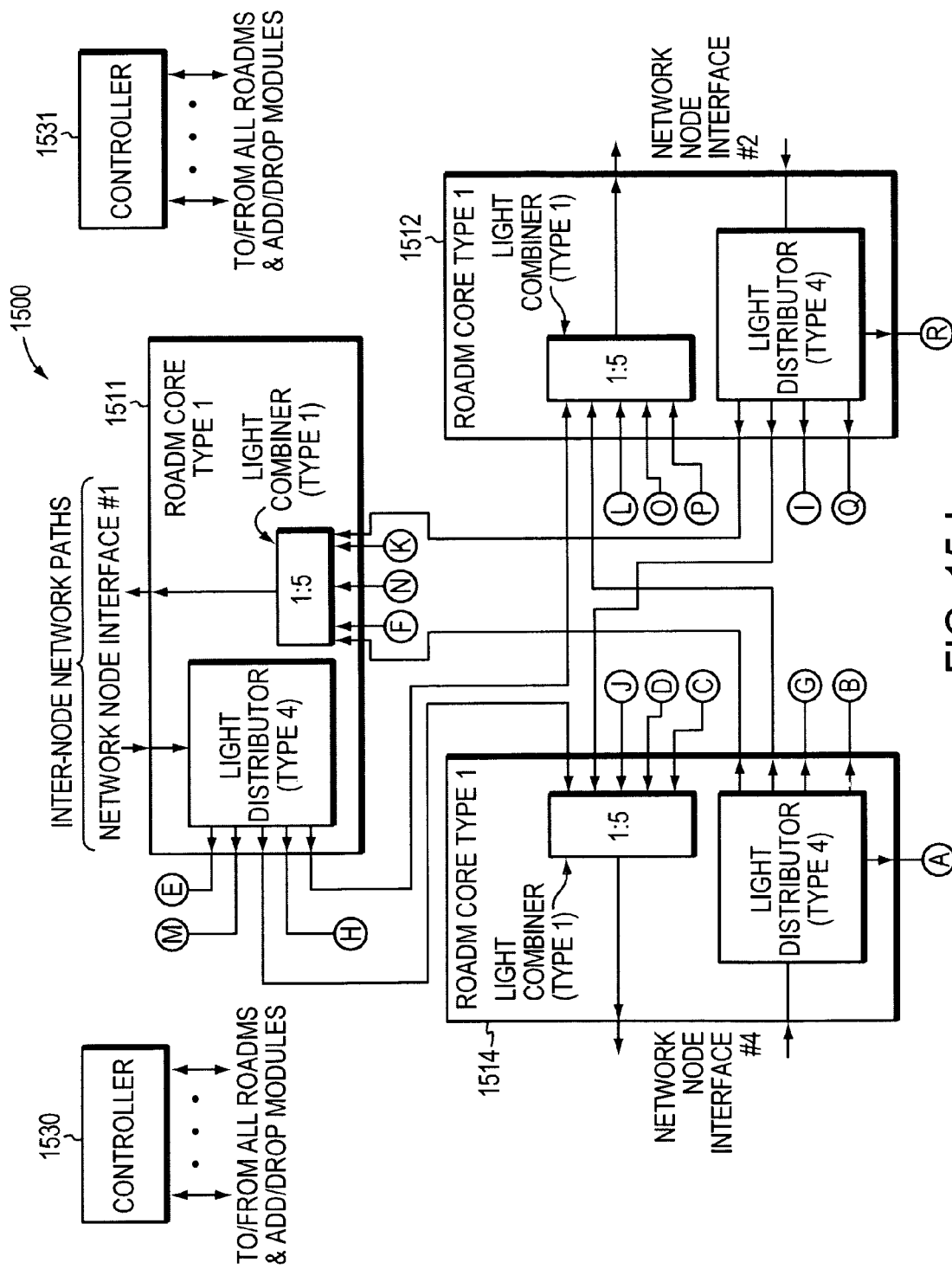
FIG. 15-I

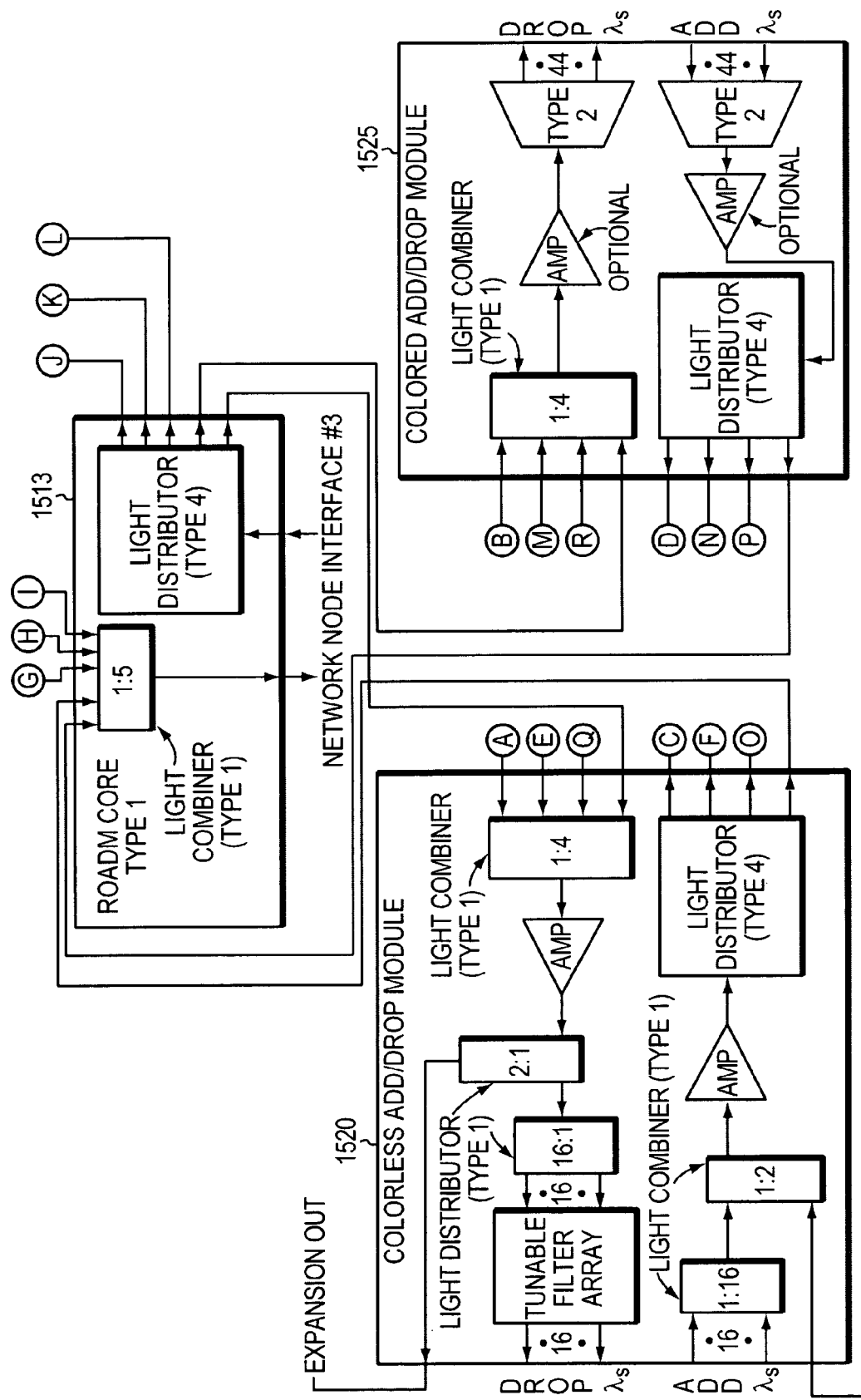
FIG. 15-II

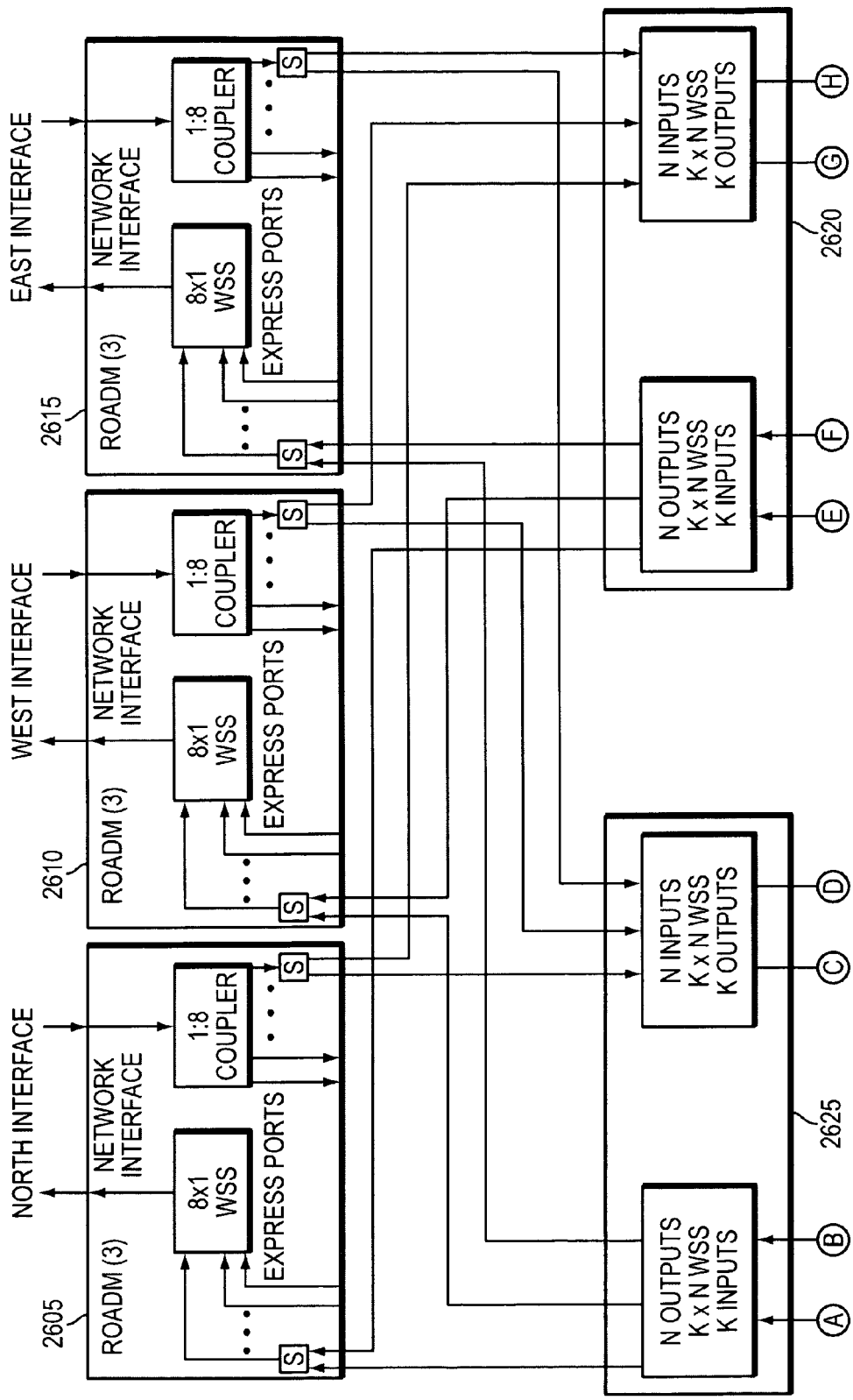
FIG. 26-I

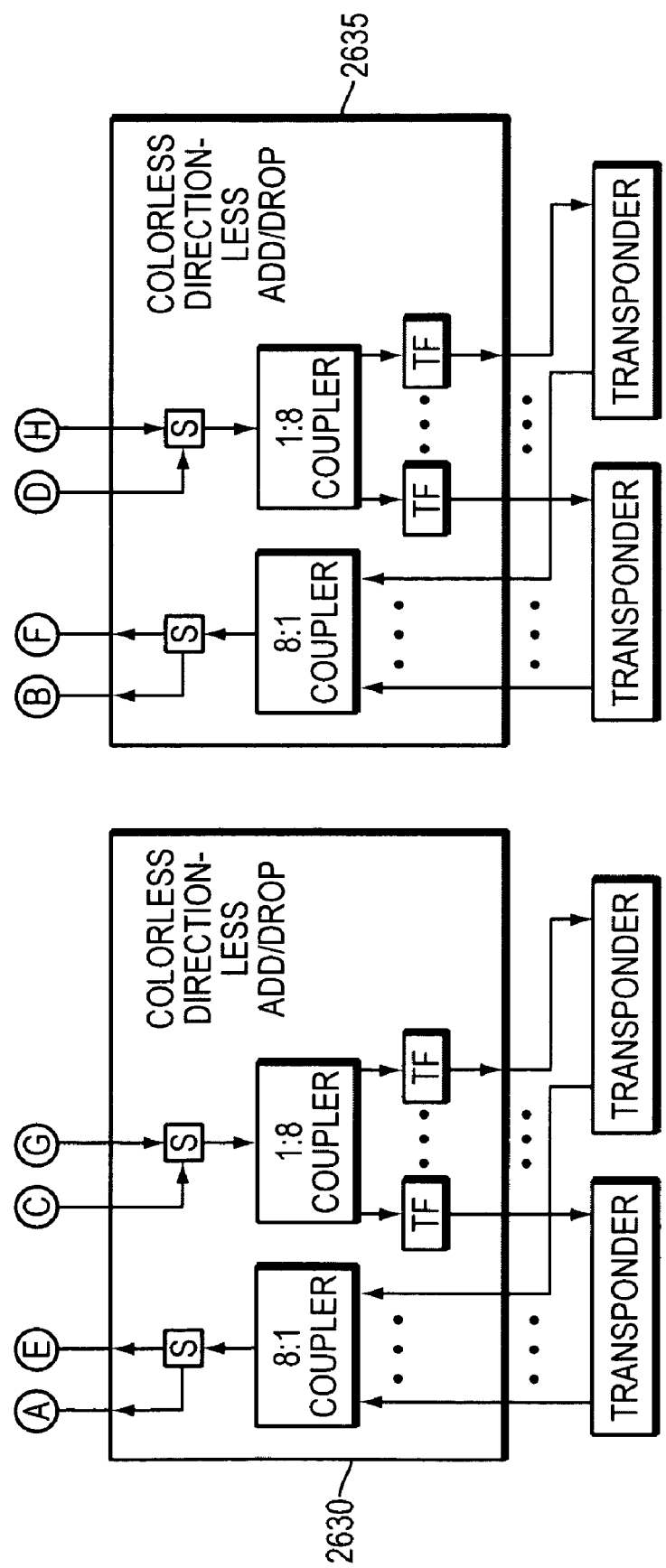
FIG. 26-II

METHODS AND APPARATUS FOR PERFORMING DIRECTIONLESS WAVELENGTH ADDITION AND SUBTRACTION WITHIN A ROADM BASED OPTICAL NODE

RELATED APPLICATIONS

This application claims of the benefit of U.S. Provisional Application No. 61/011,047, filed on Jan. 14, 2008, and U.S. Provisional Application No. 61/133,210, filed on Jun. 25, 2008. The entire teachings of the above applications are incorporated herein by reference.

BACKGROUND OF THE INVENTION

In existing reconfigurable optical add-drop multiplexer (ROADM) based optical nodes, a set of add ports and a set of drop ports are dedicated to a given output network node interface. Attached to a given add/drop port is an optical transponder. The optical transponder provides an ability to convert a "white light" non-colored optical signal to a colored optical signal (and vice versa). The ROADM then provides an ability to multiplex multiple colored optical signals into a single multi-wavelength dense wavelength division multiplexed (DWDM) optical signal. When dedicating a given transponder to a given network node interface, there can be corresponding inflexibility at the network level in the presence of network failures (e.g., fiber failures and node failures). This can occur in so called "mesh networks."

SUMMARY OF THE INVENTION

An optical node and corresponding method of routing optical signals within an optical node according to an example embodiment of the invention may include at least two reconfigurable optical add/drop multiplexers (ROADMs) to transmit respective wavelength division multiplexed (WDM) signals onto at least two inter-node network paths. The example embodiment may further include at least one add/drop module including add ports to direct each add wavelength received from tributary network paths to any of the at least two ROADMs via intra-node network paths to be available to be added to the inter-node network paths.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1B is a block diagram of a network node employing an example embodiment of the invention;

FIG. 9 is a block diagram of a network node including type-3 ROADM core devices, a colorless directionless add/drop module, a colored directionless add/drop module, and controllers according to an example embodiment of the invention;

FIG. 15 is a block diagram of a network node including type-1 ROADM core devices, a colorless directionless add/drop module, and a colored directionless add/drop module according to an example embodiment of the invention;

FIG. 26 is a block diagram of an optical node including three ROADM core modules, two combined K×N WSS and N×K WSS modules, and two colorless directionless add/drop modules according to an example embodiment;

DETAILED DESCRIPTION OF THE INVENTION

A description of example embodiments of the invention follows.

The present application incorporates by reference the contents of U.S. patent application Ser. No. 11/697,527, entitled "MULTIFUNCTIONAL AND RECONFIGURABLE OPTICAL NODE AND OPTICAL NETWORK," published Jan. 17, 2008, as U.S. Patent Application Publication No. 2008/0013954, in its entirety as if fully set forth herein. The teachings of all patents, published applications and references cited herein are incorporated by reference in their entirety.

In an optical mesh network, it is possible to route optical signals at different wavelengths ("wavelengths") around network failures using the reconfigurable capability of the reconfigurable optical add/drop multiplexer (ROADMs) used within these networks. In an event of a network failure and wavelength re-routing, a wavelength which was previously being received on one network node interface within the optical node may now be received on a different node interface within an optical node. If this occurs, then it would be useful if the optical node could route this wavelength to the corresponding transponder which was previously attached to a different network node interface within the optical node. Some example embodiments of the present invention provide methods and apparatus that allow a given transponder within an optical node to transmit and receive to and from any of the N network node interfaces within an optical node.

Figure 1A:
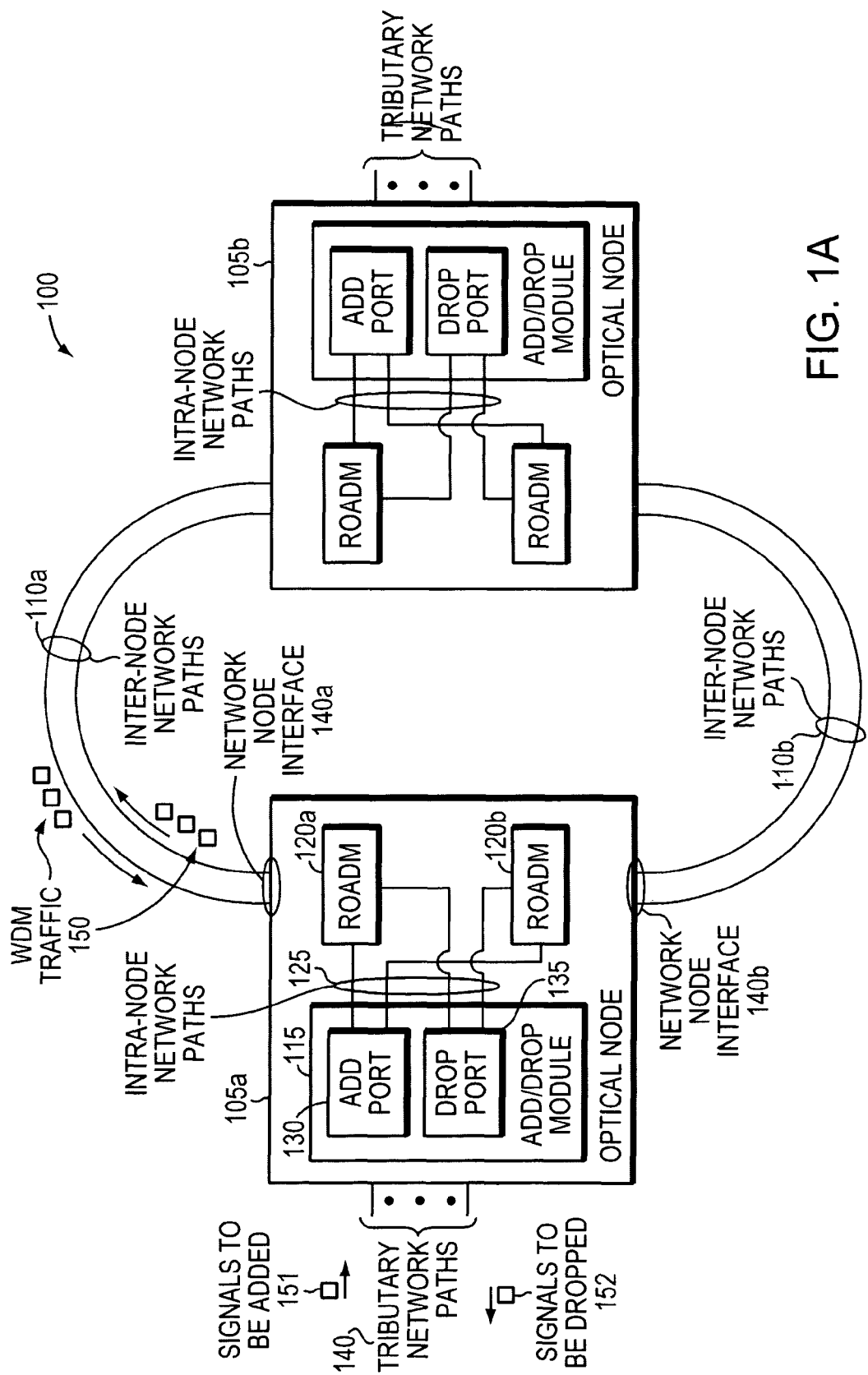
FIG. 1A is a block diagram of a network employing an example embodiment of the invention.

FIG. 1A illustrates an optical network 100 employing optical nodes 105a and 105b according to an example embodiment of the present invention. The optical network 100 includes optical nodes 105a-b configured to transmit respective wavelength division multiplexed (WDM) signals 150 via inter-node network paths 110a-b. The optical nodes 105a-b connect to the inter-node network paths 110a-b via network node interfaces; for example, optical node 105a connects to inter-node network paths 110a and 110b via network node interfaces 140a and 140b, respectively. The optical nodes 105a-b may include at least one add/drop module 115 in communication with at least two reconfigurable optical add/drop multiplexers (ROADMs) 120a-b via intra-node network paths 125. The add/drop module 115 may include an add port 130 and a drop port 135. Note that the terms 'ROADM(s),' 'ROADM Core(s)' and 'ROADM Core device(s)' may be used interchangeably herein. The ROADMs 120a-b and add/drop module 115 may be configured by tuning the lasers in the transponders (not shown), attaching network node interfaces 140a-b to the inter-node network paths 110a-b, attaching add/drop modules to the ROADMs using fiber optic cables, or by any other suitable configuration method.

In operation, signals (e.g., wavelengths) received on tributary network paths 140 may be added to WDM signals transmitted via the inter-node network paths 110a-b. The add port 130 may optionally combine, amplify, and distribute signals (e.g., wavelengths) 151 to the at least two ROADMs 120a-b. The ROADMs 120a-b may combine and transmit the signals onto inter-node network paths 110a-b where the signals may flow, for example, to other network nodes 105b. The drop port 135 may be configured to drop signals 152 from inter-node network paths 110a-b to tributary network paths 140. That is, WDM signals received from inter-node network paths 110a-b may be received by the at least two ROADMs 120 where they may flow to the at least one add/drop module 115. The drop port 135 may combine, amplify, and demultiplex WDM signals onto tributary network paths 140.

Thus, in the example embodiment of FIG. 1A, optical nodes 105a-b may each include at least two ROADMs 120a-b configured to transmit respective wavelength division multiplexed (WDM) signals onto at least two inter-node network paths 110a-b. The optical nodes 105a-b may also each include at least one add/drop module 115, which includes add ports 130 configured to direct add wavelengths received from tributary network paths 140 to each of the at least two ROADMs 120a-b via intra-node network paths 125 to be available to be added to the inter-node network paths 110a-b.

The add/drop module 115 may further include drop ports 135 coupled to each of the ROADMs 120a-b via the intra-node network paths 125 configured to drop wavelengths from each of the inter-node network paths 110a-b to the tributary network paths 140. The add/drop module 115 may also include an expansion port that provides the ability to add additional add/drop ports to the add/drop module 115. In an example embodiment of the invention, the number of add/drop modules 115 is fewer than the number of ROADMs 120a-b. The add/module 115 may be a "colored" add/drop module or a "colorless" add/drop module 115 and may further include a tunable filter array. The add/drop module 115 may also include an optical amplifier to amplify wavelengths transmitted to each of the ROADMs 120a-b via the intra-node network paths 125.

The at least two ROADMs 120a-b and at least one add/drop module 115 may further include express ports, where the number of express ports is a function of the number of ROADMs 120a-b and add/drop module(s) 115. Depending on the embodiment, the number of express ports on each ROADM may be greater than, equal to, or less than the number of express ports on each add/drop module.

The optical node 105a may also include a controller (not shown) operable to configure each ROADM 120a-b to select one of at least two of the same wavelengths from the at least one add/drop module 115 and from at least one other ROADM, and place the wavelength on the respective inter-node path 110a-b. Alternatively, in embodiments including at least three ROADMs, the controller may be operable to configure each ROADM to select one of the at least two of the same wavelengths from the other ROADMs to output the wavelength on the respective inter-note path 110a-b. In embodiments including multiple add/drop modules, such as the embodiment shown in FIG. 1B, the controller may be operable to allow each ROADM 120a-b to select one of the at least two identical wavelengths from among the multiple add/drop modules.

The add/drop module 115 may include multiple optical devices, such as combiners/distributors, amplifiers, and multiplexers/demultiplexers. In an alternative example embodiment, the optical node 105a may be a core node of a metro network configured to deliver video content from content servers via nodes of the metro network to nodes on tributary network paths coupled to the metro network by the core nodes. The optical node 105a can also be used to distribute other types of rich content, such as high-definition television (HDTV) signals. Embodiments of the optical node 105a can provide low latency necessary for delivering video signals by eliminating the optical-electrical-optical conversions needed for other types of switching. In addition, embodiments enable random A-to-Z traffic patterns, relaxing requirements for accurate traffic forecasting while avoiding wavelength blocking and contention problems. FIG. 1B depicts, in additional detail, example embodiments of the present invention. In one example embodiment, an optical node may include four ROADMs 151-154 (referred to as ROADM Core Type-3), and two Directionless add/drop modules 161-162 (referred to as add/drop modules). Each ROADM 151-154 provides one network node interface (or one node degree). Each add/drop module 161-162 provides m add/drop interfaces which can be directed to any of the four ROADM network node interfaces, which are labeled as network node interfaces #1-4. The ROADM cores 151-154 illustrated in FIG. 1B contain one light distributor and one light combiner and the add/drop modules 161-162 contain two light combiners and two light distributors, and up to two optional optical amplifiers (Amps).

The optical node shown in FIG. 1B also includes controllers 170-171 which may be connected to each of the ROADMs 151-154 and the add/drop modules 161-162. The controllers 170-171 can be used to control the ROADMs 151-154 to select one of at least two identical wavelengths transmitted from one of the other modules 161-162 or ROADMs 151-154 in the optical node. The selection process is described in greater detail below with reference to FIGS. 22-28. For example, the controller 171 can cause ROADM 151 to select one of the identical wavelengths emitted from the other ROADMs 152-154, the add/drop modules 161-162, or a combination of the other ROADMs 152-154 and add/drop modules 161-162.

In order to fully understand the operations provided by the configuration illustrated in FIG. 1B, each of the optical subcomponents will first be described below.

Types of Light Combiners and Light Distributors

Figure 2A:
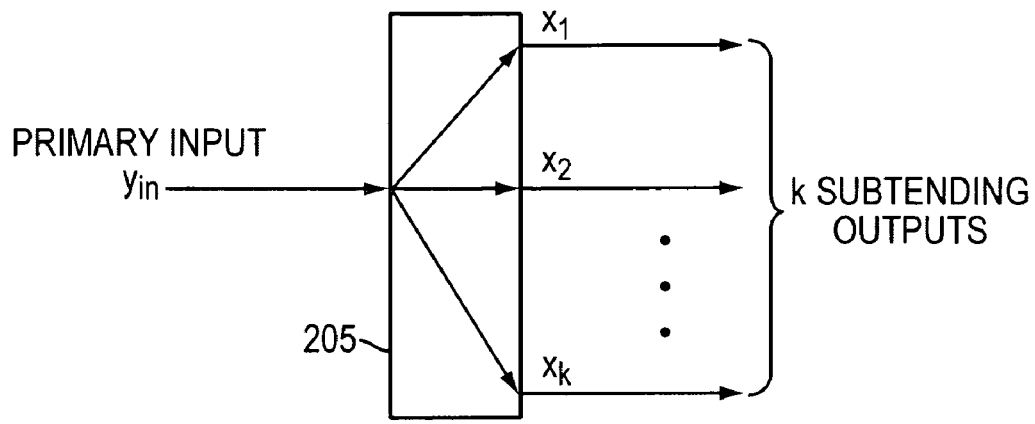
FIG. 2A is a block diagram of an example type-1 light distributor.

FIG. 2A illustrates an example of a type-1 light distributor 205 used within both the ROADM cores 151-154 and the add/drop modules 161-162. The type-1 light distributor 205 can route a portion of the total amount of light entering at a primary input $y_{in}$ to each of the m subtending outputs, which are individually denoted as $x_1, x_2 \ldots x_m$, where m is the total number of subtending outputs. Expressed another way, $x_i$ represents the ith subtending output, where "i" ranges from 1 to m. For the case of an "even" distributor, an equal amount of light is diverted from the primary input $y_{in}$ to each of the subtending outputs ($x_1, x_2 \ldots x_m$). For instance, for the case of an "even" 1-to-2 light distributor having two subtending outputs $x_1$ and $x_2$, half of the light at the primary input $y_{in}$ is diverted to subtending output $x_1$, and half of the light is diverted to subtending output $x_2$.

In general, the amount of optical power $P_{x_i}$ at any given output $x_i$ of m total outputs can be determined by the formula $P_{x_i} = b_i P_{y_{in}}$ (where $P_{y_{in}}$ is the amount of optical power applied to primary input $y_{in}$, $b_i$ represents the scaling coefficient of the light distributor for output $x_i$, and $$\sum_{i=1}^{m} b_i = 1 \Big).$$

Therefore, for the case of an 50/50 light distributor, 50 percent of the light is sent to output $x_1$ ($b_1$=0.5) and 50 percent of the light is sent to output $x_2$ ($b_2$=0.5). In reality, an actual light distributor may not be ideal and the light from the primary input $y_{in}$ may not always be perfectly coupled into the subtending outputs, so that a small error term ($e_i$) may be associated with each output $x_i$ of the type-1 light distributor. Therefore, for the non-ideal light distributor, $P_{x_i} = b_i P_{y_{in}} - e_i$.

The type-1 light distributor 205 can also be constructed such that an uneven proportion of light from the primary input $y_{in}$ is directed to each of the subtending outputs so that the amount of light output on each subtending output is not identical. Therefore, for the case of an ideal 80/20 light distributor, 80 percent of the light is sent to output $x_1$ ($b_1$=0.8) and 20 percent of the light is sent to output $x_2$ ($b_2$=0.2). The type-1 light distributor 205 can operate without being programmed with the knowledge of the frequencies (wavelengths) associated with the light upon which it operates. The type-1 light distributor 205 is also called an optical power divider or an optical splitter or an optical coupler.

Figure 2B:
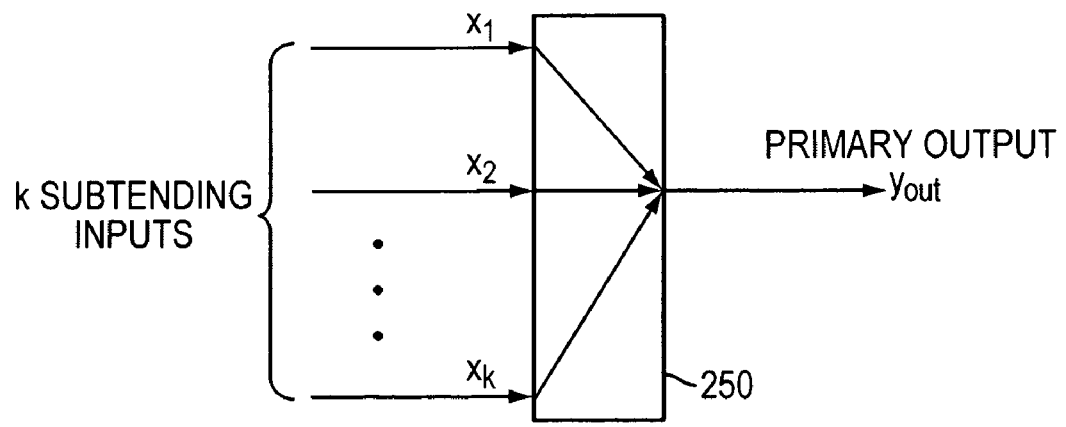
FIG. 2B is a block diagram of an example type-1 light combiner.

FIG. 2B illustrates a type-1 light combiner 250. The type-1 light combiner 250 can be configured to combine the light from its subtending inputs and direct the optical power associated with those subtending inputs to a primary output, $y_{out}$. The subtending inputs are individually identified as $x_1, x_2 \ldots x_m$, m in this case being the total number of subtending inputs. Expressed in another way, $x_i$ in this example represents the ith subtending input, where "i" ranges from 1 to m. In an example of a ROADM core device including a type-1 light combiner 250, the total number of subtending inputs can be the same as the total number of subtending outputs. However, it is also possible for the total number of subtending inputs to be different than the total number of subtending outputs.

In addition, the light combiner 250 can be an "even" combiner, in which the percentage of light sent to the primary output $y_{out}$ from each of the subtending inputs is equal. For the case of an "even" 1-to-2 light combiner, half of the light output from the primary output $y_{out}$ comes from the subtending input $x_1$, and half of the light output from the primary output $y_{out}$ comes from the subtending input $x_2$. In general, for the case of a m input light combiner, the amount of optical power $P_{y_{out}}$ at output $y_{out}$ can be determined by the formula $$P_{y_{out}} = \sum_{i=1}^{m} b_i P_{x_i}$$

(where $b_i$ represents the scaling coefficient of the light combiner for input $$x_i, \sum_{i=1}^{m} b_i = 1,$$

and $P_{x_i}$ is the power applied to input $x_i$). However, for a non-ideal light combiner, the light from the subtending inputs may not always be perfectly coupled into the primary output, so that a small error term (e) may be associated with the type-1 light combiner. Therefore, for the non-ideal light combiner $$P_{y_{out}} = \sum_{i=1}^{m} b_i P_{x_i} - e.$$

It is also possible for the type-1 light combiner 250 to be also constructed such that an uneven proportion of light is directed from each of the subtending inputs to the light combiner 250 output. As a result, the primary output may receive a different percentage of light from each subtending input. Therefore, for the case of an ideal 70/30 light combiner, 70 percent of the light from input $x_1$ is coupled to you ($b_1$=0.7) and 30 percent of the light from input $x_2$ is coupled to $y_{out}$ ($b_2$=0.3). The type-1 light combiner 250 can operate without being programmed with a knowledge of the frequencies (wavelengths) associated with the light upon which it operates. The type-1 light combiner 250 may also be referred to as an optical power adder or an optical coupler. Additional discussion of the type-1 light distributor, as well as discussion of other types of light distributors, can be found in U.S. Patent Application Publication No. 2008/0013954.

Figure 3A:
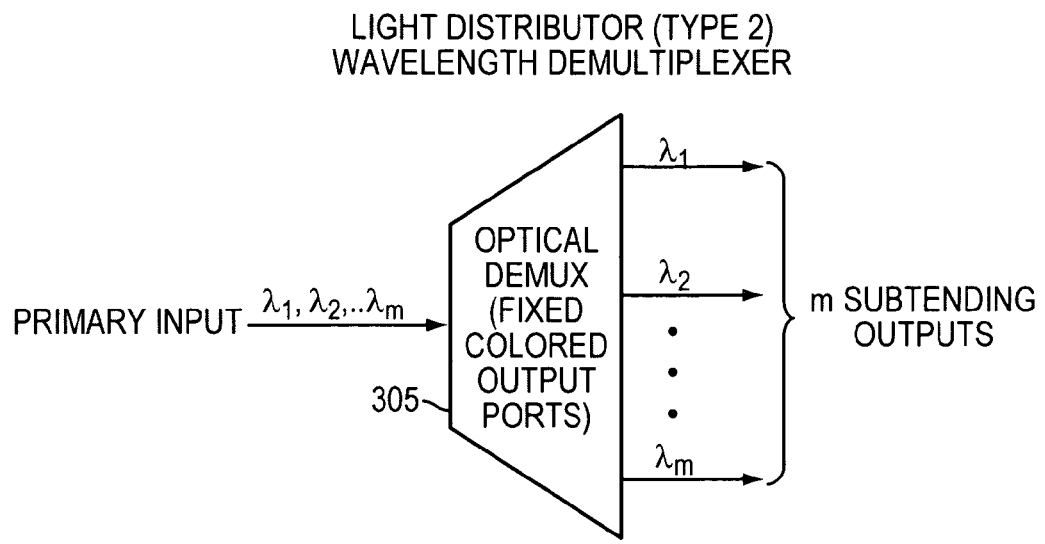
FIG. 3A is a block diagram of an example type-2 light distributor.

FIG. 3A shows an example of a type-2 light distributor 305. The type-2 light distributor 305 can be configured to demultiplex individual wavelengths from a composite wavelength division multiplexed light stream including m multiple wavelengths denoted as $\lambda_1, \lambda_2, \ldots \lambda_m$, where m represents the total number of wavelengths in the stream. A wavelength division multiplexed (WDM) light stream or a dense wavelength division multiplexed (DWDM) light stream can be applied to the primary input of the type-2 light distributor 305. The type-2 light distributor 305 is then able to divert particular wavelengths to particular subtending outputs, depending upon its design.

In the FIG. 3A example, a DWDM signal including wavelengths $\lambda_1$ to $\lambda_m$ is applied to the type-2 light distributor 305, and the light distributor 305 directs wavelength $\lambda_1$ to subtending output 1, wavelength $\lambda_2$ to subtending output 2, and more generally, directs wavelength $\lambda_m$ to subtending output m. For the type-2 light distributor 305, a given wavelength is directed to a pre-defined and predetermined subtending output. There may be an inherent insertion power loss associated with the path each wavelength takes from the primary input to its corresponding subtending output. While one example embodiment employs the same number of wavelengths as the number of subtending outputs, it is within the scope of the invention, in an example embodiment, for the number of wavelengths to differ from the number of subtending outputs. Additional discussion of the type-2 light distributor 305, as well discussion of other types of light distributors, can be found in U.S. Patent Application Publication No. 2008/0013954.

Figure 3B:
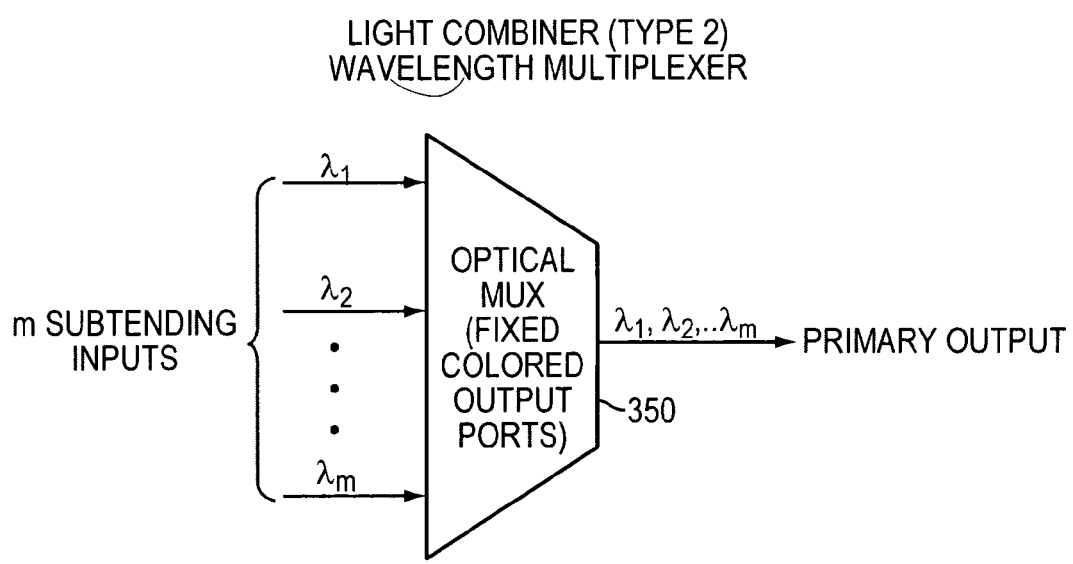
FIG. 3B is a block diagram of an example type-2 light combiner.

FIG. 3B shows an example of a type-2 light combiner 350, which can be used to multiplex individual wavelengths, such as $\lambda_1, \lambda_2, \ldots, \lambda_m$, arriving on individual subtending inputs in order to form a composite wavelength division multiplexed light stream on primary output including light of the multiple wavelengths $\lambda_1, \lambda_2, \ldots, \lambda_m$ (m in this case being an integer representing the total number of wavelengths input into the light combiner 350). A single predefined wavelength is applied to each subtending input of the type-2 light combiner 350.

In the FIG. 3B example, wavelength $\lambda_1$ is applied to subtending input 1, wavelength $\lambda_2$ is applied to subtending input 2, and wavelength $\lambda_m$ is applied to subtending input m. The resulting light stream exiting from the primary output then includes a DWDM signal including wavelengths $\lambda_1$ through $\lambda_m$. There may be an inherent insertion power loss associated with the path each wavelength takes from its subtending input to the primary output. An example of a physical component that performs wavelength multiplexing or wavelength demultiplexing is an Arrayed Waveguide Grating (AWG). While one example embodiment employs the same number of wavelengths as the number of subtending inputs, it is within the scope of the invention, in an example embodiment, for the number of wavelengths to differ from the number of subtending inputs.

In another example embodiment, in a ROADM core device including a type-2 light combiner 350, the total number of subtending inputs can be the same as the total number of subtending outputs. But it is within the scope of the invention, in an example embodiment, for the total number of subtending inputs of such a ROADM core device to be different than the total number of subtending outputs. Additional discussion of the type-2 light combiner 350, as well as discussion of other types of light combiners, can be found in U.S. Patent Application Publication No. 2008/0013954.

Figure 4A:
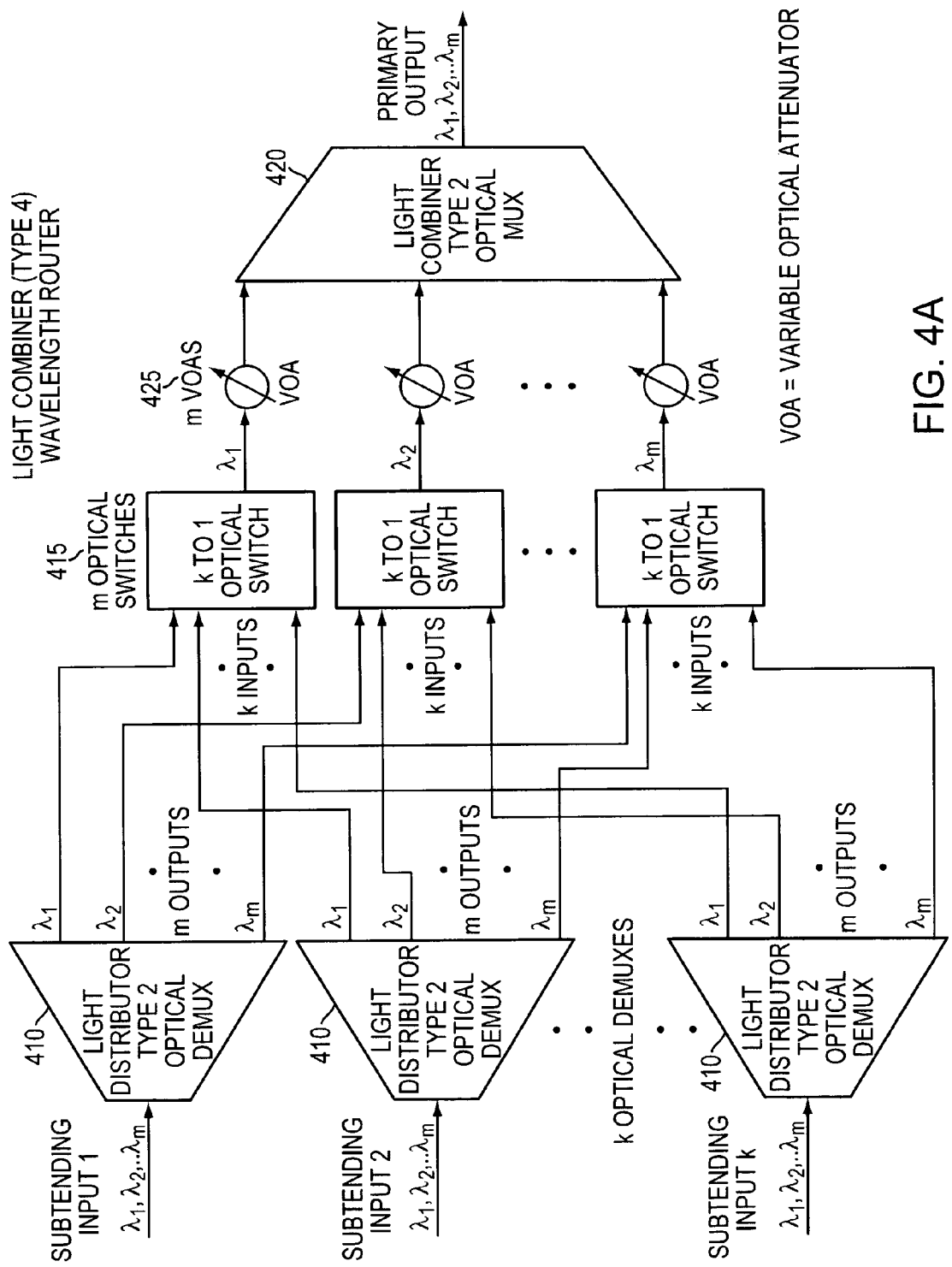
FIG. 4A is a block diagram of an example type-4 light combiner.

FIG. 4A shows an example of a type-4 light combiner. As can be seen in FIG. 4A, the type-4 light combiner uses type-2 light distributors 410 and a type-2 light combiner 420, optical switches 415, and Variable Optical Attenuators (VOAs) 425 positioned between the optical switches 415 and the type-2 light combiner 420. The type-2 light distributors 410 and the type-2 light combiner 420, can be the same as, for example, the type-2 light distributor in FIG. 3A or the type-2 light combiner in FIG. 3B, although they are not limited thereto. In addition, a control signal associated with each VOA 425 can be used to set the attenuation value of each VOA 425. The subtending inputs are individually denoted by the phrase "subtending input 1", "subtending input 2", . . . "subtending input k", where k denotes the total number of subtending inputs.

The type-4 light combiner can be configured and programmed to direct each wavelength arriving in the light stream entering the subtending inputs 1 through k through a particular path to the primary output. This is accomplished by: 1) receiving different multiple-wavelength signals, each composed of multiple wavelengths up to m wavelengths ($\lambda_1, \lambda_2, \ldots, \lambda_m$), with the type-2 light distributors 410 on the subtending inputs (m representing the total number of wavelengths within the light stream entering the primary inputs); 2) separating each multiple-wavelength signal into a plurality of single-wavelength optical signals with a different one of the type-2 light distributors 410; 3) directing single-wavelength optical signals of the same wavelength from the type-2 light distributors 410 to the same optical switch; 4) using the optical switches 415 to select only one of the received single-wavelength optical signals of the same wavelength for outputting towards the primary output; 5) individually attenuating each selected single-wavelength optical signal output from the optical switches 415 with a corresponding VOA 425; and 6) combining the attenuated, selected single-wavelength optical signals with the type-2 light combiner 420 into a combined multiple-wavelength optical signal and outputting the combined multiple-wavelength optical signal on the primary output.

As illustrated in FIG. 4A, up to m number of wavelengths can be included within the light stream entering each subtending input, and up to m wavelengths can exit the primary output. As noted above, the k-to-1 optical switches 415 can be configured so that only one wavelength from each subtending input can be directed to the primary output. Therefore, for example, if wavelength $\lambda_2$ from subtending input 1 is directed to the primary output, then wavelength $\lambda_2$ from subtending input 2 (or any other input) cannot simultaneously be directed to the primary output. The k-to-1 optical switches 415 are programmable to select any of the single-wavelength optical signals of the same wavelength received by each optical switches 415 for outputting towards the primary output.

It can also be noted that once a given wavelength is directed to the primary output, the optical power of that wavelength can be attenuated by some programmable amount via the VOA 425 associated with that output wavelength, although it is not required to do so. It can also be noted that the VOA 425 associated with a given wavelength can be programmed such that the wavelength is blocked from exiting the primary output completely.

In an example embodiment of the present invention, it is possible for the type-4 light combiner to not include the VOAs 425. Further, the light combiner may include more or less than the number of type-2 light distributors 410, VOAs 425, optical switches 415, and type-2 light combiner 420s shown in FIG. 4A. Further still, the type-4 light combiner may include additional elements.

In addition, one or more of the type-2 light distributors 410, VOAs 425, optical switches 415, and type-2 light combiner 420 of the type-4 light combiner shown in FIG. 4A may be replaced by any other suitable component that performs the functions thereof discussed above. As an example, a single VOA function and a single k to 1 optical switch function may be implemented with a single micro-electro-mechanical-system (MEMS) mirror device which can both switch light and attenuate light simultaneously. In an alternative example embodiment, both the VOA function and the k to 1 optical switch function may be implemented using liquid crystal technology.

In summary, the path through the type-4 light combiner is as follows. A WDM or DWDM light stream is applied to each of the subtending inputs of the combiner. The light stream of each input can include up to m wavelengths simultaneously. The type-2 light distributor at each subtending input then demultiplexes the WDM/DWDM light streams into their individual wavelengths. The k-to-1 optical switch associated with each wavelength is then used to select a wavelength from one of the k subtending inputs thereof. Each of the selected individual wavelengths is attenuated by some programmable amount via its corresponding VOA 425. The type-2 light combiner 420 then multiplexes up to m wavelengths into a WDM/DWDM signal and outputs the result on the primary output.

As can be seen from FIG. 4A, the type-4 light combiner is a k-to-1, type-4 light combiner operating upon m wavelengths that requires m VOA control signals, and m k-to-1 optical switch control signals. This type-4 light combiner is also called a wavelength router or a wavelength selective switch (WSS). Additional discussion of the type-4 light combiner, as well as discussion of other types of light combiners, can be found in U.S. Patent Application Publication No. 2008/0013954.

Figure 4B:
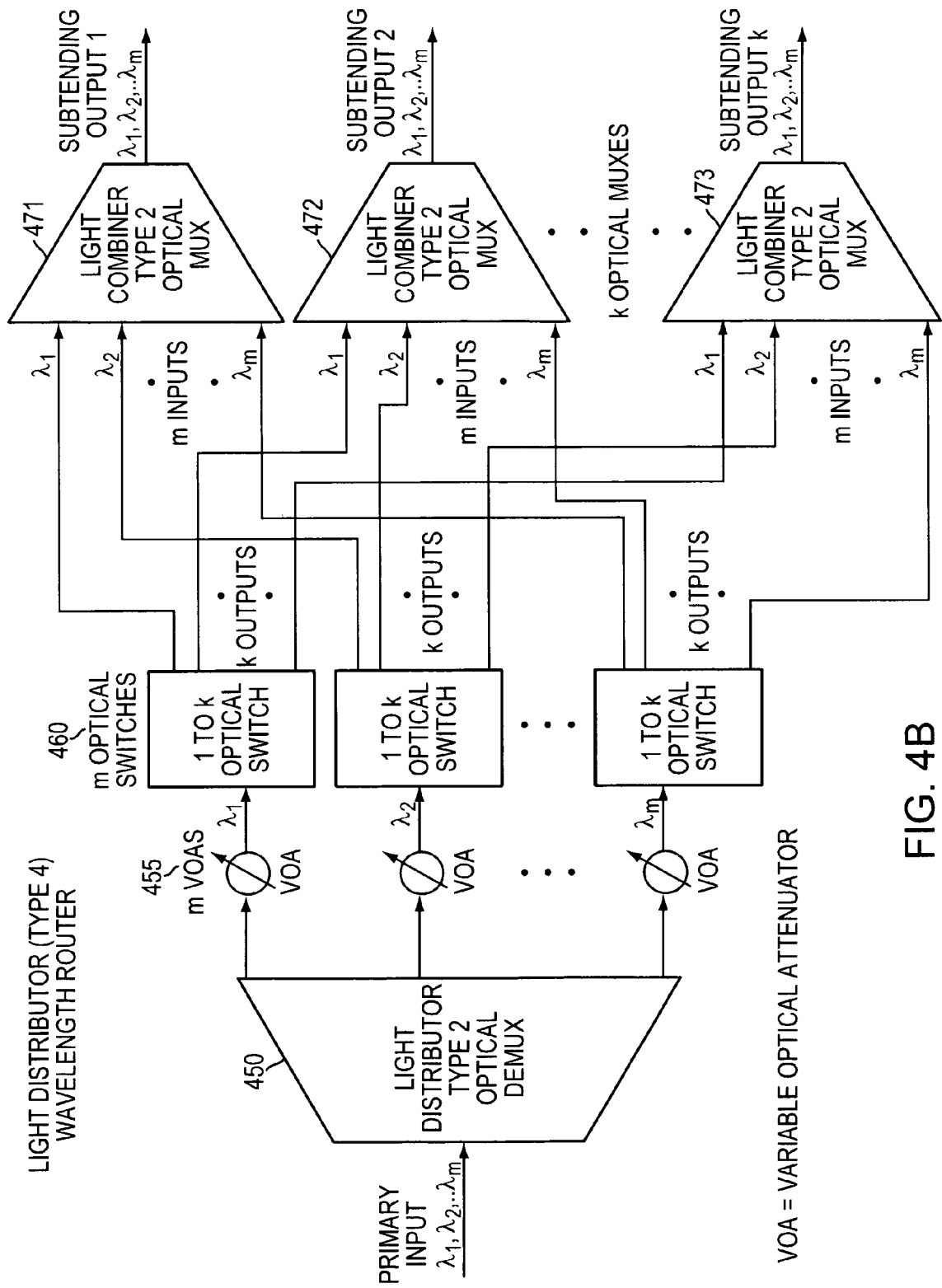
FIG. 4B is a block diagram of an example type-4 light distributor.

FIG. 4B shows an example of a type-4 light distributor. The type-4 light distributor can include a type-2 light distributor 450, type-2 light combiners 471-473, 1 to k optical switches 460, and VOAs 455 positioned between the type-2 light distributor 450 and the optical switches 460. The type-2 light distributor 450 and the type-2 light combiners 471-473 can be the same as, for example, the type-2 light distributor in FIG. 3A and the type-2 light combiner in FIG. 3B, respectively, although they are not limited thereto. In addition, a control signal associated with each VOA 455 can be used to set the attenuation value of each VOA 455.

The type-4 light distributor can be configured and programmed to direct each wavelength arriving in the light stream entering the primary input to only one of the type-2 light combiners 471-473 and its associated subtending output, which are individually denoted by 1 through k (k being an integer representing the total number of subtending outputs in this case). This is accomplished by: 1) receiving a multiple-wavelength signal, composed of multiple wavelengths up to m wavelengths ($\lambda_1, \lambda_2, \ldots \lambda_m$), with the type-2 light distributor 450 on the primary input (m representing the total number of wavelengths within the light stream entering the primary input); 2) separating the multiple-wavelength signal into a plurality of single-wavelength optical signals with the type-2 light distributor 450; 3) individually attenuating each single-wavelength optical signal output from the type-2 light distributor 450 with a corresponding VOA 455; 4) directing each attenuated single-wavelength optical signal to a different and corresponding 1 to k optical switch 460; 5) assigning each attenuated single-wavelength optical signal to only one of the type-2 light combiners 471-473 using the corresponding 1 to k optical switch 460, so that different sets of attenuated single-wavelength optical signals can be directed to different type-2 light combiners 471-473; 6) combining optical signals in each set of assigned, attenuated, single-wavelength optical signals output from the optical switches 460 into a single output signal with one of the type-2 light combiners 471-473; and 7) outputting each single output signal from the type-2 light combiner 471-73 on its associated subtending output.

The 1-to-k optical switches 460 can be programmable to direct an optical signal input thereinto to any one of the type-2 light combiners 471-473 and their associated subtending outputs. As illustrated in FIG. 4B, up to m wavelengths can be included within the light stream entering the primary input, and up to m wavelengths can exit any given subtending output. The subtending outputs are individually denoted by the phrase "subtending output 1", "subtending output 2", . . . "subtending output k", where k denotes the total number of subtending outputs.

As noted above, the 1-to-k optical switches 460 can direct a given wavelength applied thereto to only one type-2 light combiner 471-473 and only one subtending output. Therefore, for example, if wavelength $\lambda_2$ is directed to subtending output 1, then it cannot simultaneously be directed to subtending output 2, for instance, or any other subtending output. In addition, the type-4 light distributor can be programmed to attenuate the optical power of each wavelength using the VOA 455 associated with that wavelength before it is directed to a given subtending output by one of the 1-to-k optical switches 460.

It is also possible for the VOA 455 associated with a given wavelength to be programmed such that the wavelength is blocked (or substantially blocked) from exiting any of the subtending outputs. In an example embodiment of the present invention, it is possible for the type-4 light distributor not to include the VOAs 455. Further, the light distributor may include more or less than the number of type-2 light distributors 450, VOAs 455, 1 to k optical switches 460, and type-2 light combiners 471-473 shown in FIG. 4B. Further still, the type-4 light distributor may include additional elements not shown in FIG. 4B.

In addition, one or more of the type-2 light distributors 450, the VOAs 455, 1 to k optical switches 460, and the type-2 light combiners 471-473 of the type-4 light distributor shown in FIG. 4B may be replaced by any other suitable component that performs the functions of these elements discussed above. As an example, a single VOA function and a single 1 to k optical switch function may be implemented with a single micro-electro-mechanical-system (MEMS) mirror device which can both switch light and attenuate light simultaneously. In an alternative example embodiment, both the VOA function and the 1 to k optical switch function may be implemented using liquid crystal technology in another example implementation.

In summary, the path through the type-4 light distributor is as follows. A WDM or DWDM light stream is applied to the primary input of the type-4 distributor. The type-2 light distributor 450 then demultiplexes the WDM/DWDM light stream into its individual wavelengths. Each of the individual wavelengths is attenuated by some programmable amount via a corresponding VOA 455. Each wavelength is then directed to its corresponding type-2 light combiner 471-473 and its corresponding k subtending output via its corresponding 1-to-k optical switch 460. At each type-2 light combiner 471-473, the combiner multiplexes up to m wavelengths into a WDM/DWDM signal on a corresponding subtending output.

The light distributor in FIG. 4B is a 1-to-k; type-4 light distributor configured to operate upon m wavelengths and using m VOA control signals, and m 1-to-k optical switch control signals. The type-4 light distributor is also called a wavelength router or a wavelength selective switch (WSS). Additional discussion of the type-4 light distributor, as well as discussion of other types of light distributors, can be found in U.S. Patent Application Publication No. 2008/0013954.

Figure 5:
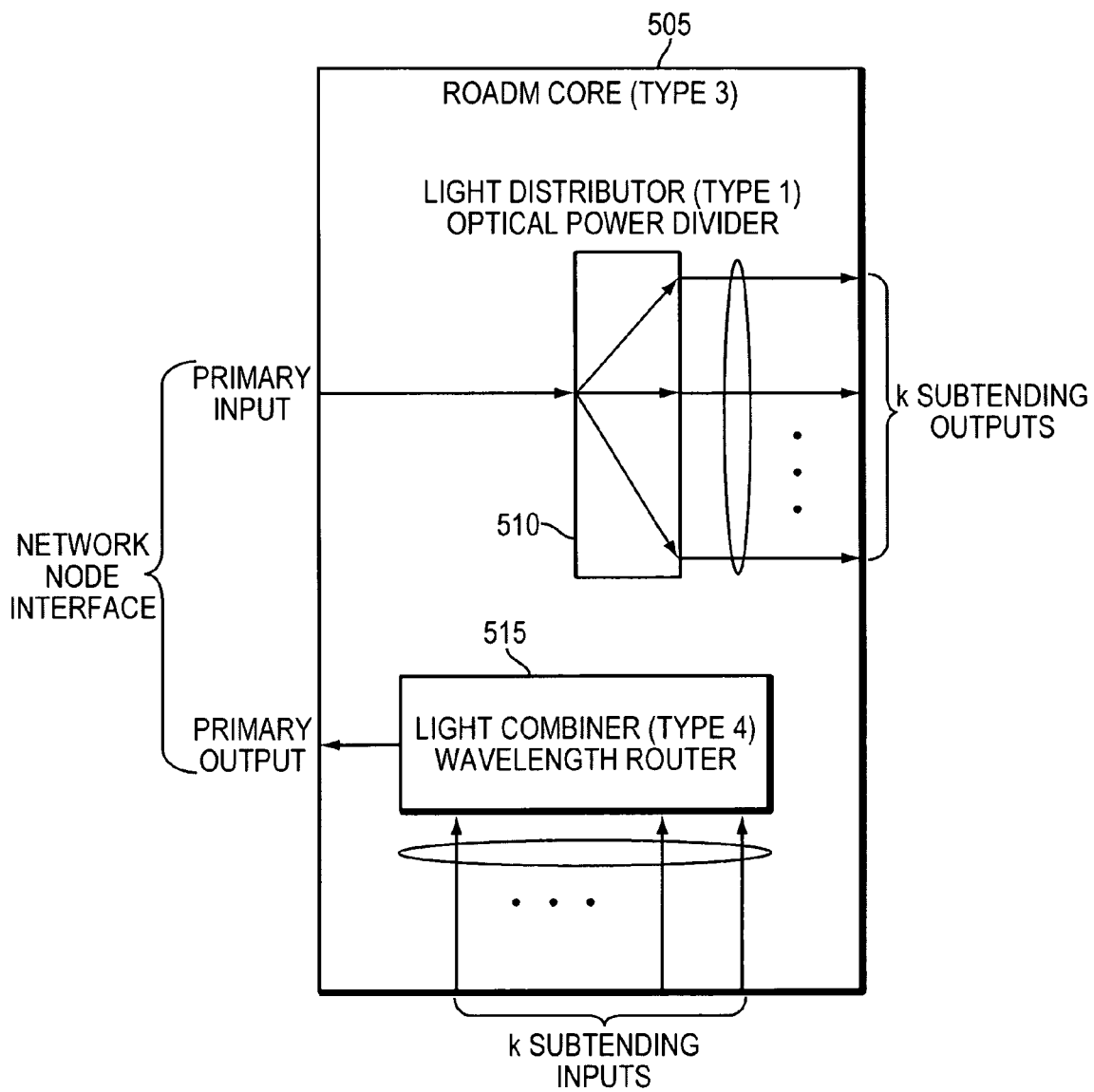
FIG. 5 is a block diagram of an example type-3 reconfigurable optical add/drop multiplexer (ROADM) core device.

FIG. 5 depicts an example of an embodiment of a type-3 ROADM core device 505. The type-3 ROADM core device 505 can include a type-1 light distributor 510, and a type-4 light combiner 515. The type-1 light distributor 510 and the type-4 light combiner 515 can be the same as, for example, the type-1 light distributor shown in FIG. 2A and the type-4 light combiner shown in FIG. 4A, respectively, although they are not limited thereto.

Since the type-3 ROADM core device 505 includes a type-1 light distributor 510 and a type-4 light combiner 515, it can be configured to: 1) divide an optical signal received from another optical node from the network node interface on its primary input into a plurality of optical-power-divided output signals and output the optical-power-divided output signals on a plurality of subtending outputs with the type-1 light distributor 510; 2) receive first and second multiple-wavelength optical signals from first and second subtending inputs, respectively, with the type-4 light combiner 515; 3) separate the first and second multiple-wavelength optical signals into a first plurality of single-wavelength optical signals originating from the first multiple-wavelength signal and a second plurality of single-wavelength optical signals originating from the second multiple-wavelength optical signal with the type-4 light combiner 515; 4) for single-wavelength optical signals in the first and second plurality of single-wavelength optical signals having the same wavelength, select for outputting only one single-wavelength optical signal from one of the first and second plurality of single-wavelength optical signals with the type-4 light combiner 515; 5) attenuate each selected single-wavelength optical signal with the type-4 light combiner 515; and 6) combine the attenuated, selected single-wavelength optical signals into a single primary output optical signal to be output on the primary output of the ROADM core device 505 to the network node interface to another node, with the type-4 light combiner 515.

Additional discussion of the type-3 ROADM core device 505, as well as discussion of other types of ROADM core devices, can be found in U.S. Patent Application Publication No. 2008/0013954.

DETAILS ON EXAMPLE EMBODIMENTS OF THE INVENTION

Now that the optical sub-components in FIGS. 1A and 1B have been fully explained, the operation of the optical nodes presented in FIGS. 1A and 1B can be discussed. In FIG. 1A each ROADM core (e.g., ROADMs 120*a* and 120*b*) performs two fundamental operations: 1) it broadcasts each wavelength which it receives via the input of its network node interface 140*a-b* to all other ROADM cores 120*a-b* and add/drop modules 115 (via its type-1 light distributor), and 2) it selects wavelengths from all other ROADM cores 120*a-b* and add/drop modules 115 for transmission via the output of its network node interface 140*a-b* (via its type-4 light combiner).

Setting aside the add/drop modules 115 for the moment, on the input of each network node interface 140*a-b* there can be up to m number of wavelengths present. Similarly, on the output of each network node interface 140*a-b* there can be up to m number of wavelengths present. Since each ROADM core 120*a-b* sends all of its m wavelengths present on its input network node interface to each of the other ROADM cores 120*a-b*, each ROADM core 120*a-b* can select wavelengths for transmission on its output network node interface from all the wavelengths arriving on all of the input network node interfaces of the optical node other than its own input network node interface.

However, assuming the m wavelengths arriving on each input node interface are number 1 to m, each individual wavelength i (where the value of i can range from 1 to m) can only be present at most one time on any given output network node interface. In the optical node shown in FIG. 1B, for example, the ROADM core 152 associated with network node interface #2 can receive wavelength $\lambda_2$ from any of input network node interfaces #1, #3 and #4, but it can only select one of these wavelengths $\lambda_2$ to be placed on its output network node interface at a time. The type-4 light combiner provides each ROADM core 151-154 with the ability to select wavelengths from any of the input network node interfaces for placement on its output network node interface (other than its own associated input network node interface).

Therefore, it can be seen that the node shown in FIG. 1B containing the type-3 ROADM cores 151-154 is capable of routing wavelengths from each of its input network node interfaces to each of its output network node interfaces in a programmable manner. Furthermore, since each ROADM core 151-154 contains a VOA for each output wavelength, the set of wavelengths exiting each output network node interface can be power equalized, regardless of which input network node interfaces the various wavelengths are selected from.

As shown in FIG. 1B, the directionless add/drop modules 161-162 (or simply add/drop modules) add another capability to the optical node beyond the capability of routing wavelengths between network node interfaces. Specifically, the directionless add/drop modules 161-162 allow wavelengths which are received from any of the input network node interfaces to be dropped to transponders connected to the drop ports of the add/drop modules 161-162. The add/drop modules 161-162 also allow wavelengths to be forwarded to any output network node interface from transponders connected to the add ports of the directionless add/drop modules 161-162.

In particular, in the add direction, up to m transponders (each tuned to one of m wavelengths) can be connected to the m add ports of a given directionless add/drop module 161-162. The type-2 light combiner within each add/drop module 161-162 is then used to multiplex up to m wavelengths into a single optical signal exiting the type-2 light combiner. This composite signal may then be amplified by an optional optical amplifier within the add/drop module 161-162, and then broadcasted to all of the ROADM cores 151-154 within the optical node via the type 1 light distributor on each add/drop module. The type-4 light combiner within each ROADM core 151-154 can then select for output transmission from the up to m wavelengths from each add/drop module and each of the other ROADM core modules.

In the drop direction, each directionless add/drop module 161-162 receives up to m wavelengths from each of the ROADM cores 151-154. The type-4 light combiner is then used to select up to m wavelengths from the sets of m wavelengths received from the ROADM cores 151-154, and transmits these selected up to m wavelengths to an optional optical amplifier, which is used to amplify each of the received up to m wavelengths by a similar amount. The up to m wavelengths are then transmitted to the type-2 light distributor within the add/drop module 161-162, which then de-multiplexes each of the up to m wavelengths on its m output ports.

From FIG. 1B, it can be noticed that if a particular wavelength i is originally directed from input network node interface #j to a particular transponder connected to a drop port on a given add/drop module, if due to a network failure this same exact wavelength now arrives on input network node interface #p, then the type-4 light combiner within the add/drop module can now switch the wavelength i received on input network node interface #p to the same transponder which was previously receiving wavelength i from network node interface #j.

In FIG. 1B, if m=44, then the figure shows a four degree node with two banks of 44 channel add/drop ports. Any of the 88 transponders (not shown) connected to the two banks of add/drop ports can be directed to any of the four output network node interfaces (labeled 1, 2, 3, 4), and any wavelength received from any of the four input network node interfaces can be directed to any of the 88 transponders connected to the two banks of drop ports.

FIG. 1B shows a network node containing four type-3 ROADM cores 151-154 and two directionless add/drop modules 161-162. However, the invention is not limited to this combination, and in fact, a given network node can contain any combination of type-3 ROADM cores 151-154 and directionless add/drop modules 161-162, as will become apparent.

Figure 6A:
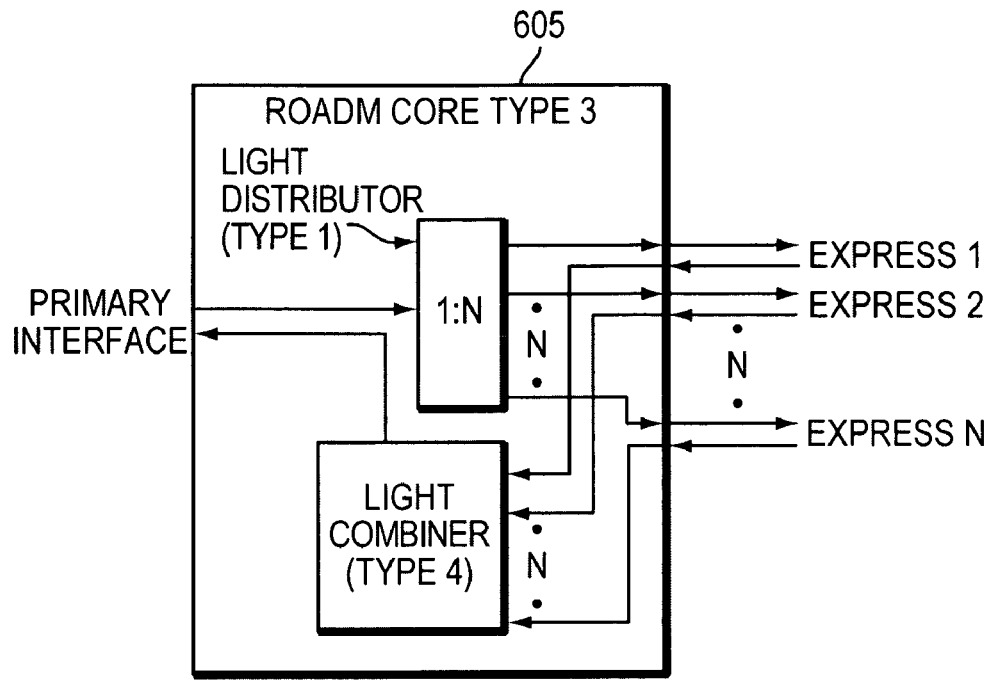
FIG. 6A is a block diagram of an example type-3 ROADM core device.
Figure 6B:
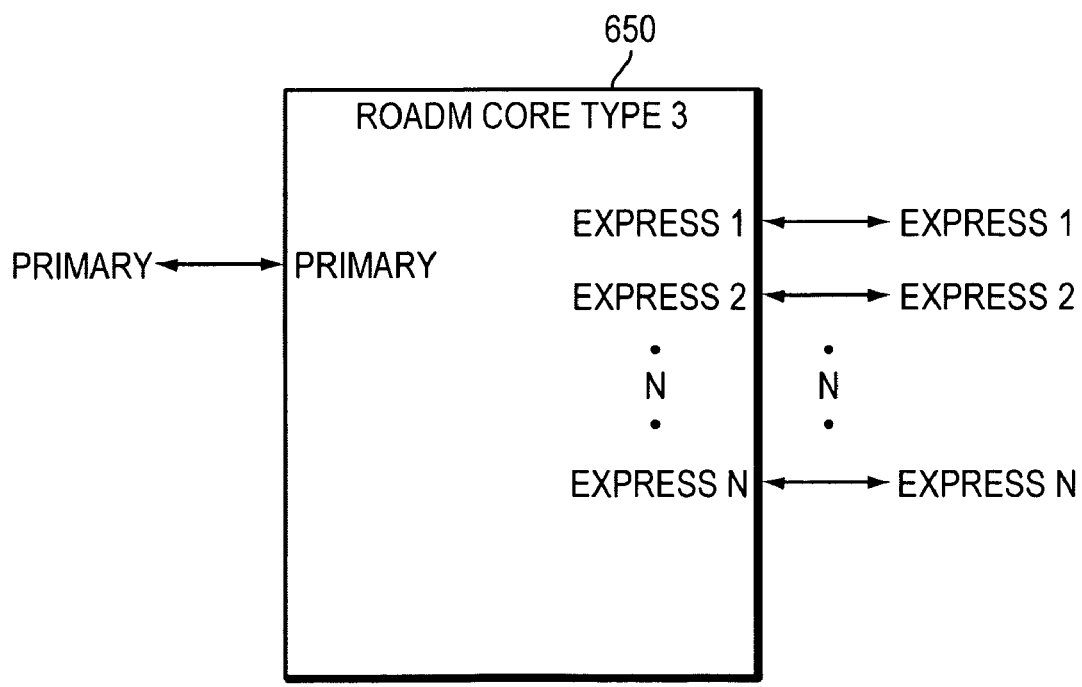
FIG. 6B is a simplified block diagram of an example type-3 ROADM core device.

FIGS. 6A and 6B are block diagrams of alternative type-3 ROADM cores 605 and 650, respectively. The type-3 ROADM core 605 shown in FIG. 6A includes a bidirectional primary interface and N bidirectional express interfaces, which are labeled Express 1, Express 2, ..., Express N. A type-1 light distributor splits input traffic from the primary interface into N signals, each of which is coupled to one of the N output ports of the corresponding express interfaces. Similarly, the inputs to the express interfaces are coupled to a type-4 light combiner, which outputs the combined signals on the output port of the primary interface.

The type-3 ROADM core 650 shown in FIG. 6B can also transmit traffic via a bidirectional primary interface and N bidirectional express interfaces, which are labeled Express 1, Express 2, ..., Express N.

Figure 7A:
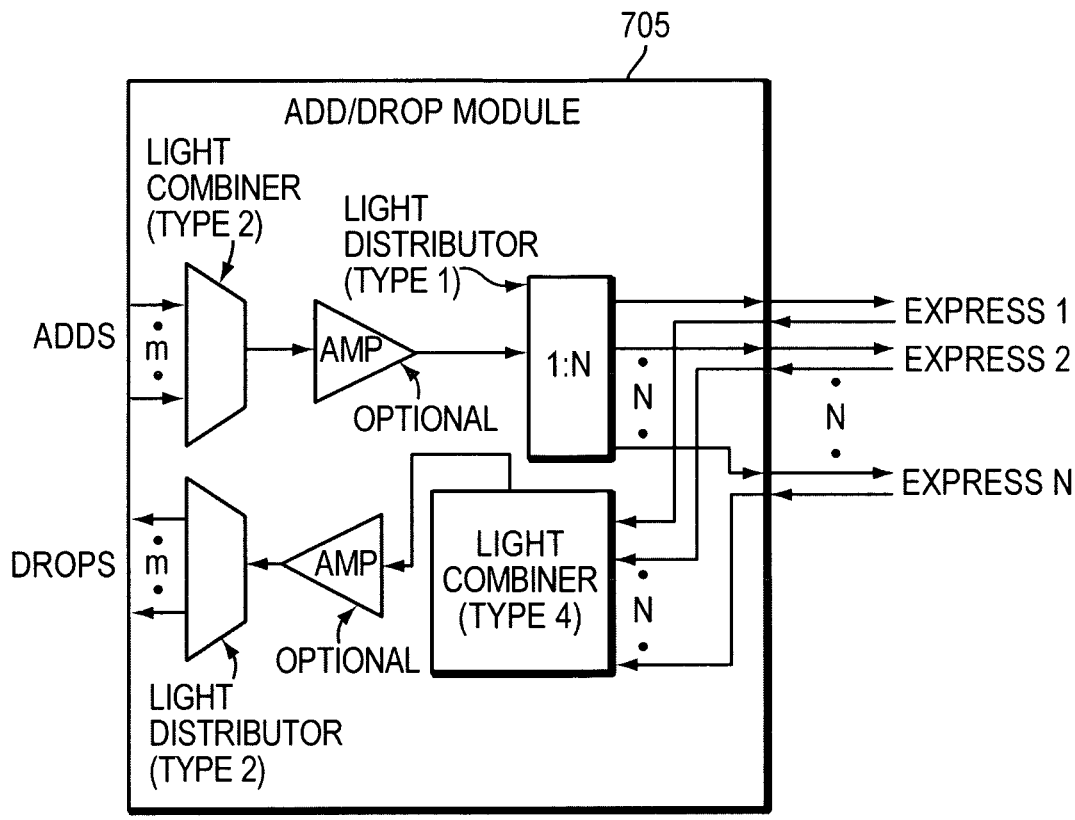
FIG. 7A is a block diagram of an example directionless add/drop module.
Figure 7B:
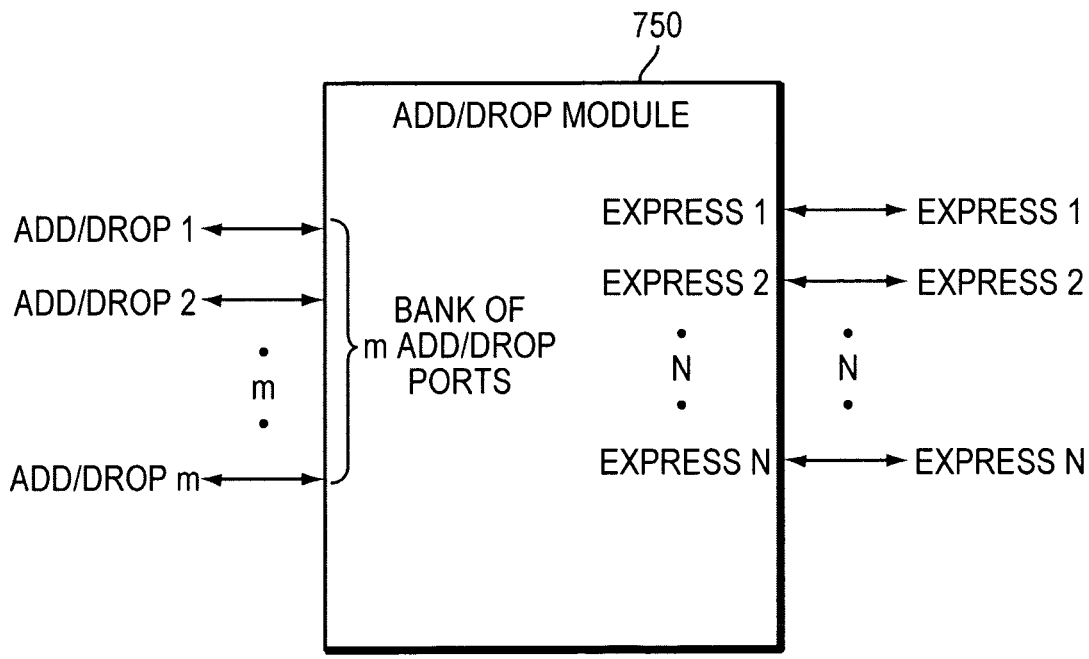
FIG. 7B is a simplified block diagram of an example directionless add/drop module.

FIGS. 7A and 7B are block diagrams of alternative directionless add/drop modules 705 and 750, respectively. The add/drop module 705 shown in FIG. 7A includes a bank of add ports ("Adds"), a bank of drop ports ("Drops"), and N bidirectional express interfaces, which are labeled Express 1, Express 2, ..., Express N. A type-2 light combiner multiplexes the traffic from the bank of add ports. A type-1 light distributor splits the output of the type-2 light combiner into N signals, each of which is coupled to one of the N output ports of a corresponding express interface. In certain embodiments, the output of the type-2 light combiner is amplified using an optional amplifier before being split.

Similarly, the inputs to the express interfaces are coupled to a type-4 light combiner, which outputs the combined signals to a type-2 light distributor. The type-2 light distributor demultiplexes the combined signals and transmits the demultiplexed signals via the bank of drop ports. In certain embodiments, the output of the type-4 light combiner is amplified using an optional amplifier before being demultiplexed.

Figure 8:
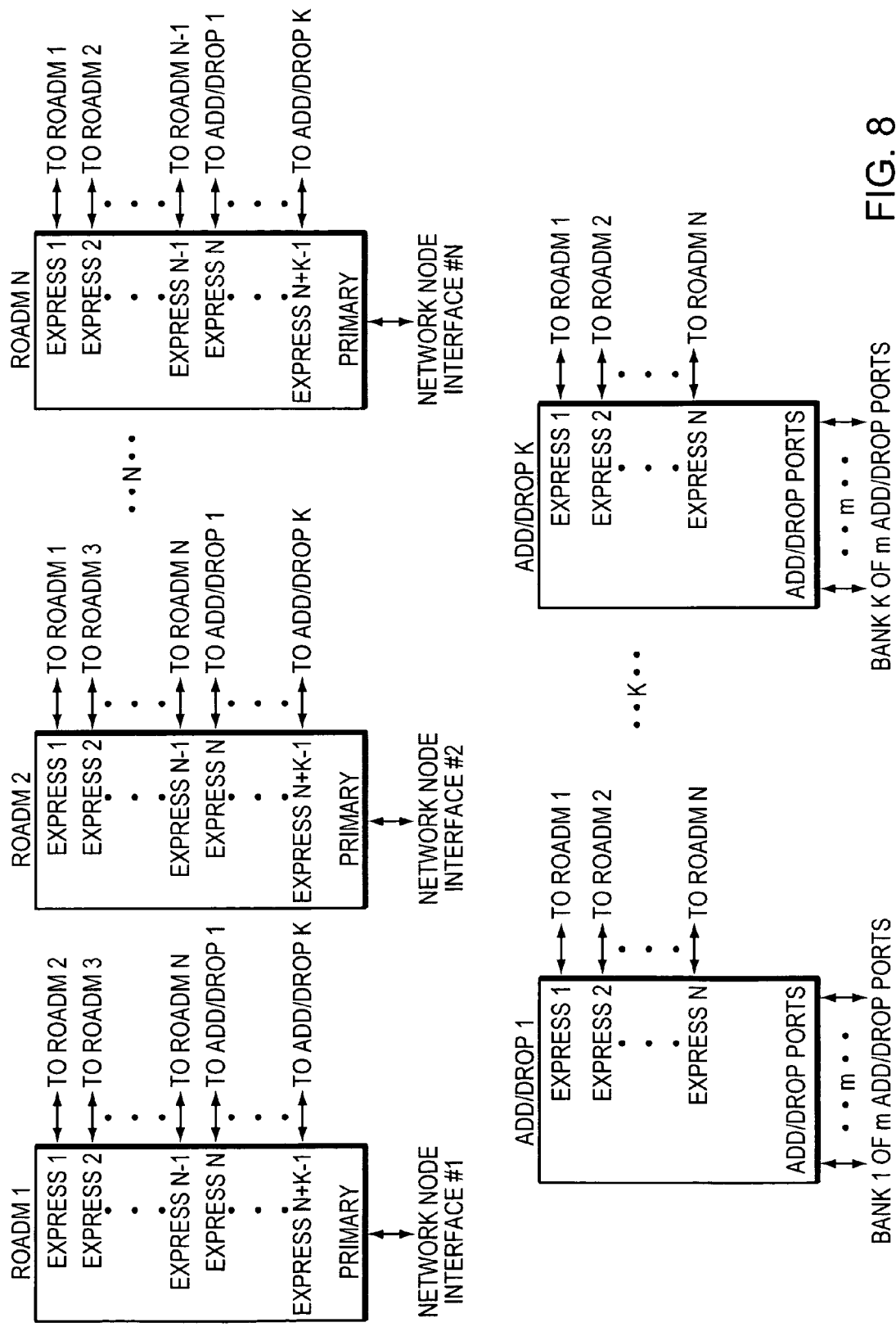
FIG. 8 is a simplified block diagram of an example N-degree optical node that includes N ROADMs and K directionless add/drop modules.

The add/drop module 750 shown in FIG. 7B can also transmit traffic via a bank of m add/drop ports and N bidirectional express interfaces, which are labeled Express 1, Express 2, ..., Express N. FIG. 8 shows a generalized version of an N-degree optical node containing N ROADMs and K directionless add/drop modules. It can be seen that each ROADM provides one network node interface and each of the K directionless add/drop modules provides a bank of m add/drop ports. Each ROADM is connected to each of the other ROADMs and to each of the directionless add/drop modules via express ports on the ROADMs and add/drop modules. In certain embodiments, the number of express ports on each ROADM may be greater than or equal to the number of express ports on each add/drop module. For instance, in some preferred embodiments, each ROADM has seven express ports and each add/drop module has four express ports. In other embodiments, each add/drop module may have more express ports than each ROADM.

For example, Express 1 on ROADM 1 is connected to Express 1 on ROADM 2, Express N−1 on ROADM 1 is connected to Express 1 on ROADM N, Express N on ROADM 1 is connected to Express 1 on Add/Drop 1, and Express N+K−1 on ROADM 1 is connected to Express 1 on Add/Drop K. In general, each ROADM contains N+K−1 express ports, and each directionless add/drop module contains N express ports.

In a typical system design, a given ROADM may contain a fixed number of express ports. For instance, in one example a given type-3 ROADM core could contain eight express ports. Also, in a typical design, a given directionless add/drop module may contain a fixed number of express ports and a fixed number of add/drop ports. For instance, in one example a given directionless add/drop module could contain eight express ports and 44 add/drop ports (where the maximum number of unique wavelengths (frequencies) in the network is equal to 44). Using the example ROADM with eight express ports and the example directionless add/drop module with eight express ports and 44 add/drop ports, the node configurations in the below table are possible.

| Node Degrees (R) | Maximum Number of Banks of 44 Channel Directionless Add/Drop Ports ($K_{max}$) |
|---|---|
| 8 | 1 |
| 7 | 2 |
| 6 | 3 |
| 5 | 4 |
| 4 | 5 |
| 3 | 6 |
| 2 | 7 |

Since it typically makes little sense to have more banks of add/drop ports than node degrees, the table above would typically be reduced to the table shown below.

| Node Degrees (R) | Maximum Number of Banks of 44 Channel Directionless Add/Drop Ports |
|---|---|
| 8 | 1 |
| 7 | 2 |
| 6 | 3 |
| 5 | 4 |
| 4 | 4 |
| 3 | 3 |
| 2 | 2 |

In general, for a type-3 ROADM core containing N express ports and a directionless add/drop module containing J express ports, for a given node containing R network interfaces (i.e., R degrees), and assuming every ROADM is connected to all other ROADMs (so that N≧R−1), and assuming every ROADM is connected to every add/drop module (so that J≧R ), the following equation can be used to determine the maximum number of directionless add/drop modules $K_{max}$ that can be supported by the given node:

$$K_{max} = N - R + 1$$

As an example, for the case where a given type-3 ROADM core contains eight express ports and a given directionless add/drop port module contains eight express ports, a given node could be configured as a six-degree node with up to three directionless add/drop modules.

Other types of light combiners, light distributors and ROADM core devices can be combined to form example embodiments of the invention. A discussion of various light combiners (e.g., Type-1, Type-1A, Type-2, Type-3 and Type-4), light distributors (e.g., Type-1, Type-1A, Type-2, Type-3 and Type-4), ROADM core devices (e.g., Type-1, 2, 3 and 4) can be found in U.S. Patent Application Publication No. 2008/0013954. Further example embodiments are described below.

FIG. 9 is a block diagram of an alternative embodiment of an optical node that uses a colorless directionless add/drop module 905. The colorless, directionless add/drop module 905 can be created from the colored directionless add/drop module 705 of FIG. 7A by replacing the type-2 light combiner with a type-1 light combiner, and by replacing the type-2 light distributor with a type-1 light distributor followed by a tunable filter array. The optical node shown in FIG. 9 also includes a colored directionless add/drop module 910 (shown at the right).

The colored directionless add/drop module 910 provides 44 add/drop ports, while the colorless directionless add/drop module 905 provides 16 add/drop ports with the ability to add 16 additional colorless directionless add/drop ports via the expansion ports (i.e., the ports labeled "Expansion In" and "Expansion Out") on the module 905. In general, a directionless add/drop module containing N express ports can be used to supply directionless add/drop ports to nodes containing up to N degrees. As shown in FIG. 9, for instance, the colorless directionless add/drop module 905 can be used to support systems with up to four degrees, since it contains four express ports. However, one may use a directionless add/drop module containing less than N express ports within a node containing N degrees by attaching the directionless module to less than the total number of ROADMs within the node.

Figure 10:
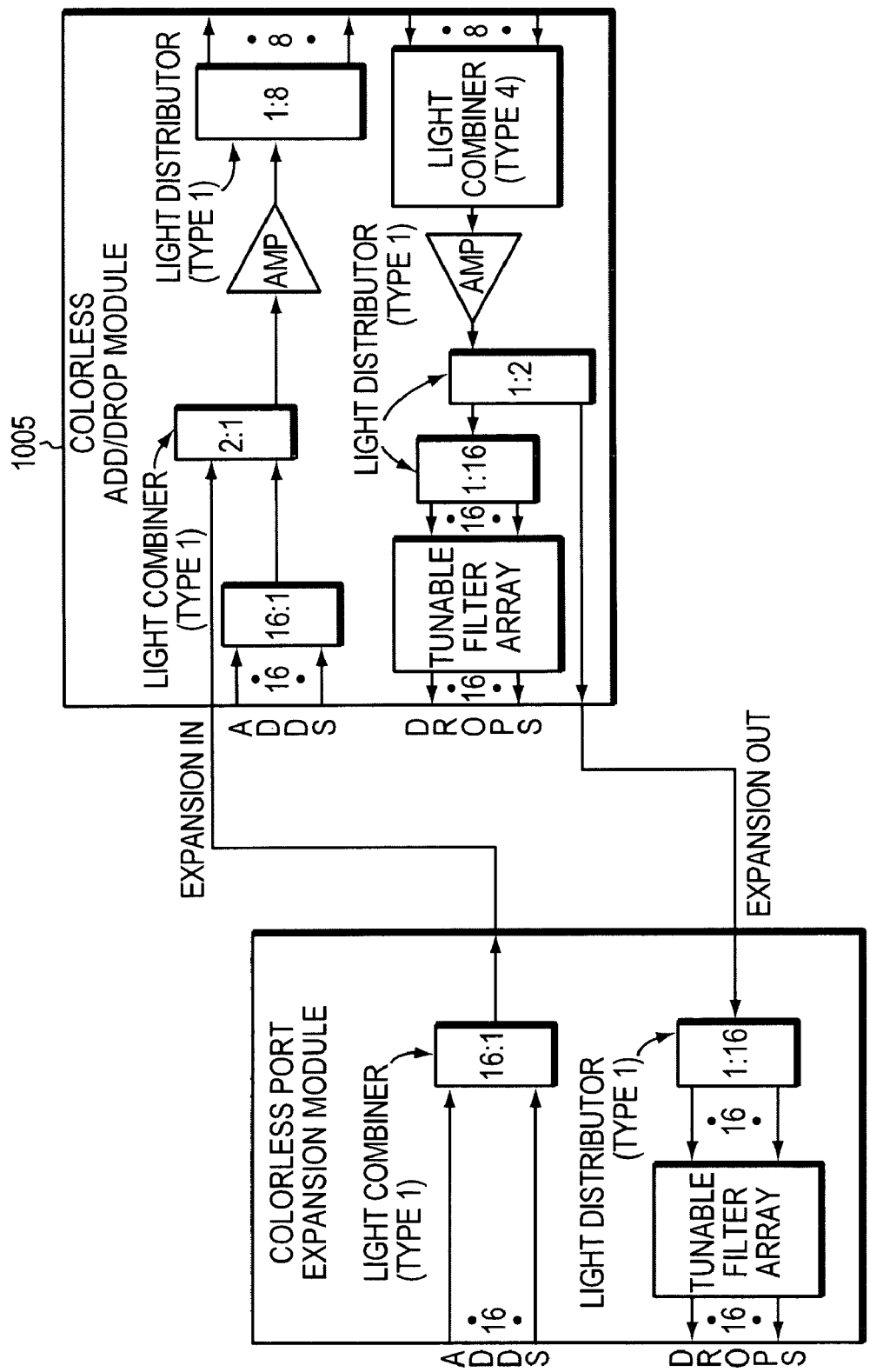
FIG. 10 is a block diagram of a colorless directionless add/drop module and colorless port expansion module according to an example embodiment of the invention.

FIG. 10 illustrates a colorless directionless add/drop module 1005 that can support up to eight degrees since it contains eight output express ports from the 1:8 type-1 light distributor and eight input express ports to the type-4 light combiner. Coupling the colorless add/drop module 1005 to a colorless port expansion module makes it possible to offer an additional sixteen add ports and an additional sixteen drop ports. The colorless add/drop module 1005 operates in much the same way as the colored add/drop module 705 shown in FIG. 7A, except that the type-2 light combiner and distributor have been replaced with a type-1 light combiner and distributor, respectively. In addition, a 1:2 type-1 light distributor is coupled to the output of the type-4 light combiner, possibly via an optical amplifier ("AMP"). One output of the 1:2 type-1 light distributor is coupled to the input of the 1:16 light distributor; the other is coupled to an expansion output port. The expansion output port may be connected, in turn, to a colorless port expansion module. A 1:16 type-1 light distributor in the colorless port expansion module further splits and transmits the signal from the expansion output to a bank of drop ports ("Drops"), possibly via tunable filter array, which selectively removes unwanted wavelengths.

In reciprocal fashion, the colorless port expansion module accepts additional signals via add ports ("Adds") and combines them with a 16:1 type-1 light combiner. The output of the 16:1 type-1 light combiner is coupled to an expansion input port of the colorless add/drop module 1005, which, in turn, connects to one input of a 2:1 type-1 light combiner. The other input of the 2:1 type-1 light combiner is coupled to the output of the 16:1 light combiner. The output of the 2:1 type-1 light combiner is coupled to the 1:8 type-1 light distributor, possibly via an optional amplifier ("AMP").

Figure 11:
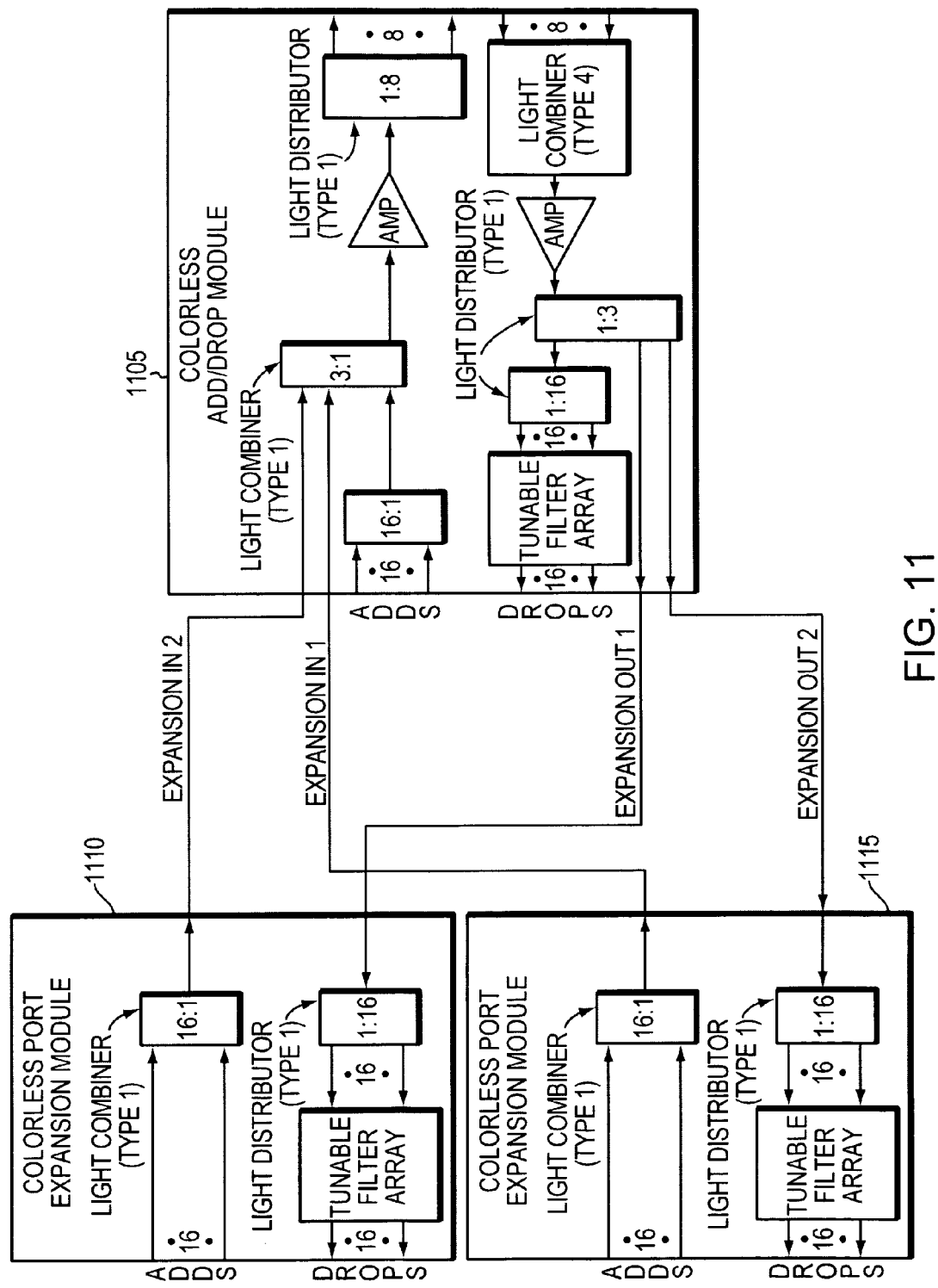
FIG. 11 is a block diagram of a colorless directionless add/drop module and two colorless port expansion modules according to an example embodiment of the invention.

FIG. 11 illustrates a colorless directionless add/drop module 1105 which can fully support nodes up to eight degrees while providing support for up to 48 colorless add/drop ports according to an example embodiment. The colorless directionless add/drop module 1105 contains two expansion input ports and two expansion output ports. As shown, the two expansion ports allow two colorless port expansion modules 1110, 1115 to be attached to the colorless directionless add/drop module 1105. Other combinations are also possible.

For instance, a colorless directionless add/drop module with 8 embedded colorless add/drop ports and support for five bidirectional expansion ports could be similarly implemented. This could be accomplished by replacing the 3:1 type 1 light combiner, the 16:1 type-1 light combiner, the 1:3 type-1 light distributor, the 1:16 type-1 light distributor, and the 16 port tunable filter array with a 6:1 type 1 light combiner, an 8:1 type-1 light combiner, a 1:6 type-1 light distributor, a 1:8 type-1 light distributor, and an 8 port tunable filter array, respectively, on the colorless add/drop module 1105. Similarly, an 8 port colorless port expansion module could be created from the 16 port expansion modules 1110, 1115 shown in FIG. 11 by replacing the 16:1 type-1 light combiner, the 1:16 type-1 light distributor, and the 16 port tunable filter array with an 8:1 type-1 light combiner, a 1:8 type-1 light distributor, and an 8 port tunable filter array, respectively.

In addition, an input optical amplifier (not shown) can be placed prior to the 1:16 light distributor on the colorless port expansion module, and an output optical amplifier (not shown) can be placed after to the 16:1 light combiner on the colorless port expansion modules 1110, 1115 of FIG. 11. It should be noted that the optical amplifiers are optional and, if implemented, may be variable gain amplifiers or fixed gain amplifiers, and the fixed gain amplifiers may optionally have a VOA placed before their inputs in order to attenuate signals by some programmable amount prior to amplification.

Figure 12A:
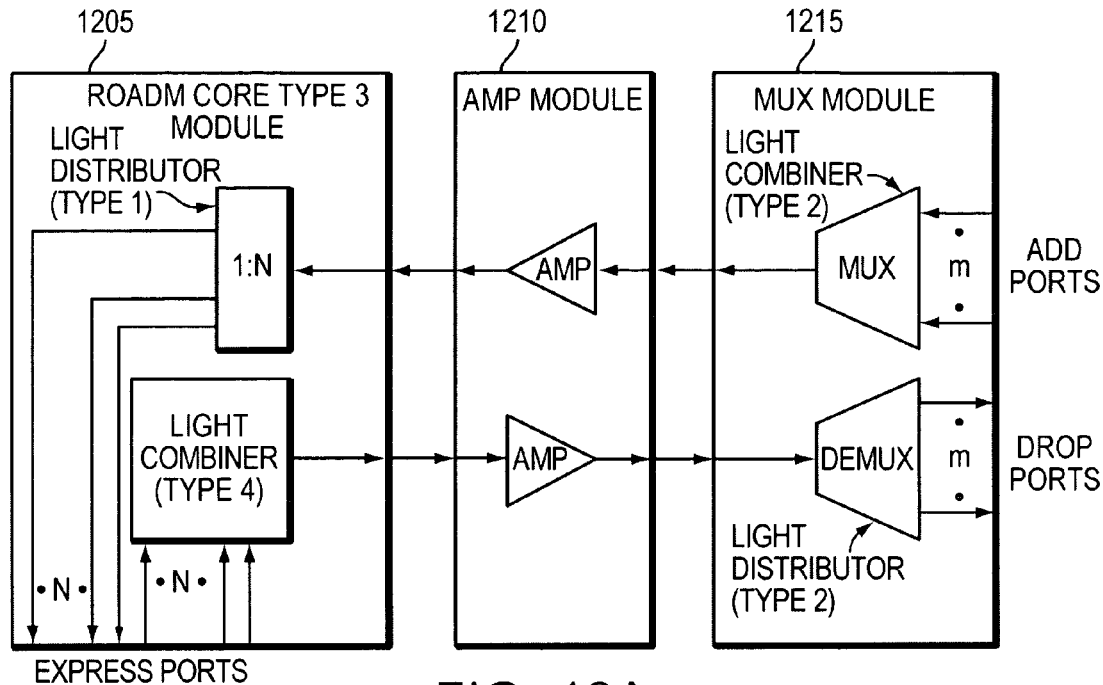
FIG. 12A is a block diagram of a type-3 ROADM core module, amplifier module and MUX module according to an example embodiment.

FIG. 12A is a block diagram that shows how a module containing a type-3 ROADM core can be combined with a module containing a type-2 light distributor and a type-2 light combiner (and optional optical amplifiers) in order to create the functionality of the directionless add/drop module 705 shown in FIG. 7A. For example, FIG. 12A shows a ROADM Core Type-3 Module 1205 combined with an AMP module 1210 (containing two optical amplifiers) and a Mux module 1215 (containing a type-2 light combiner and a type-2 light distributor) in order to form the functionality of the FIG. 7A colored directionless add/drop module.

Figure 12B:
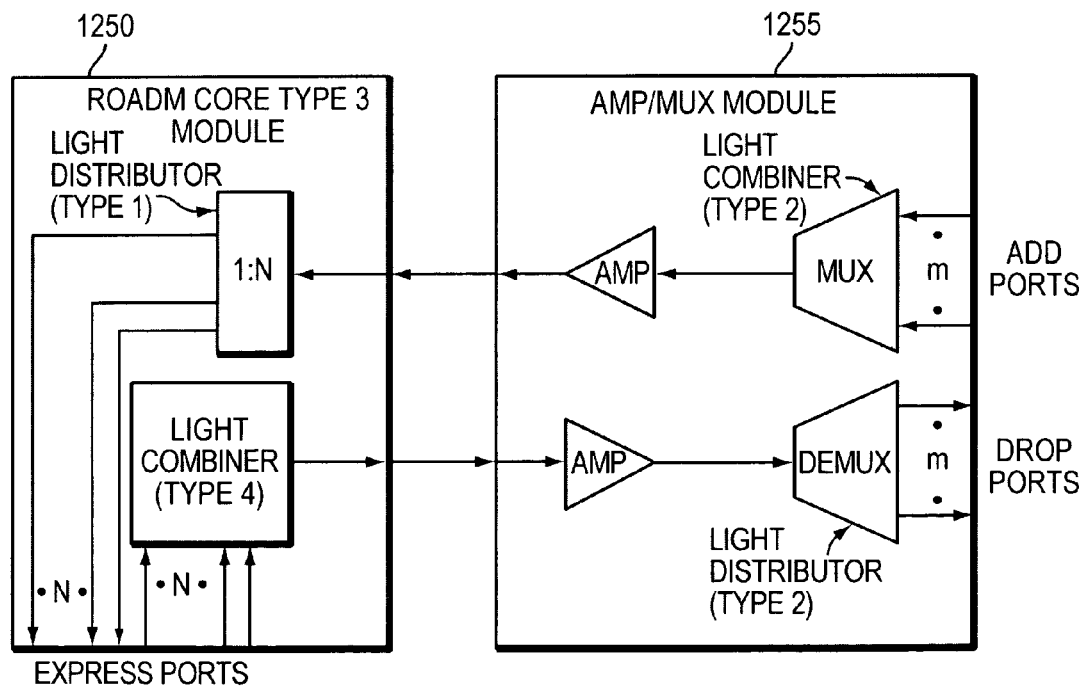
FIG. 12B is a block diagram of a type-3 ROADM core module and a combined amplifier module and MUX module according to an example embodiment.

FIG. 12B shows a ROADM Core Type-3 Module 1250 combined with an AMP/Mux module 1255 (containing two optical amplifiers, a type-2 light combiner and a type-2 light distributor) in order to form the functionality of the FIG. 7A colored directionless add/drop module 705. Here, the AMP/MUX module 1255 includes an optical amplifier ("AMP") coupled to the output of a multiplexer ("Mux") and another optical amplifier coupled to the input of a demultiplexer ("De-Mux").

Figure 12C:
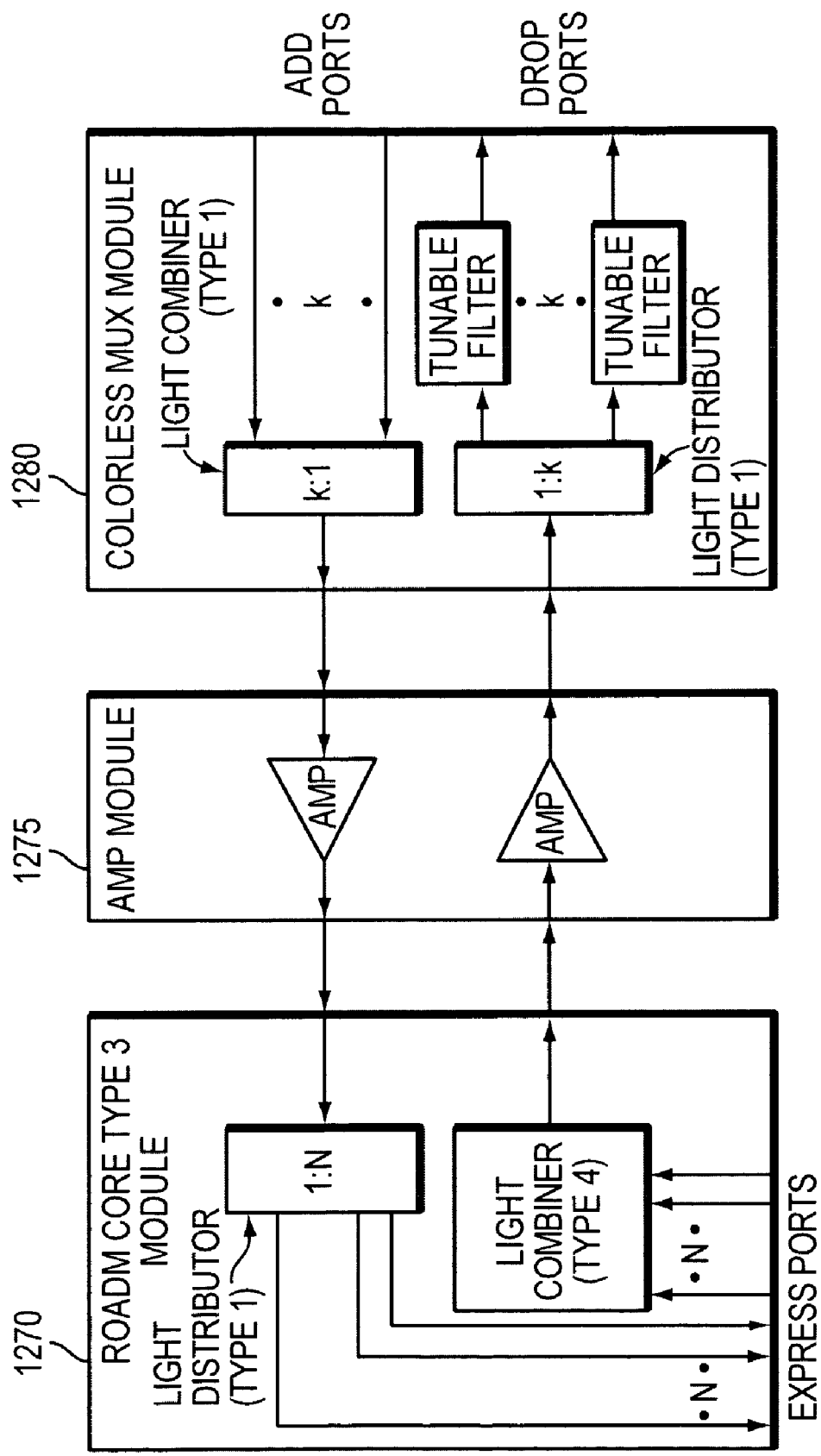
FIG. 12C is a block diagram of a type-3 ROADM core, amplifier module, and colorless MUX module according to an example embodiment.

FIG. 12C shows a ROADM Core Type-3 Module 1270 combined with an AMP module 1275 (containing two optical amplifiers) and a Colorless Mux module 1280 (containing a type-1 light combiner, a type-1 light distributor and an array of tunable filters) in order to form the functionality of a colorless directionless add/drop module. Here, a colorless MUX module 1280 replaces the MUX module 1215 of FIG. 12A. A type-1 light combiner combines signals from k add ports of the colorless MUX module 1280, then transmits the combined signals to the AMP module 1275. Similarly, a type-1 light distributor in the colorless MUX module 1280 distributes signals from the AMP module 1275 via individual tunable filters to each of k drop ports.

Figure 13A:
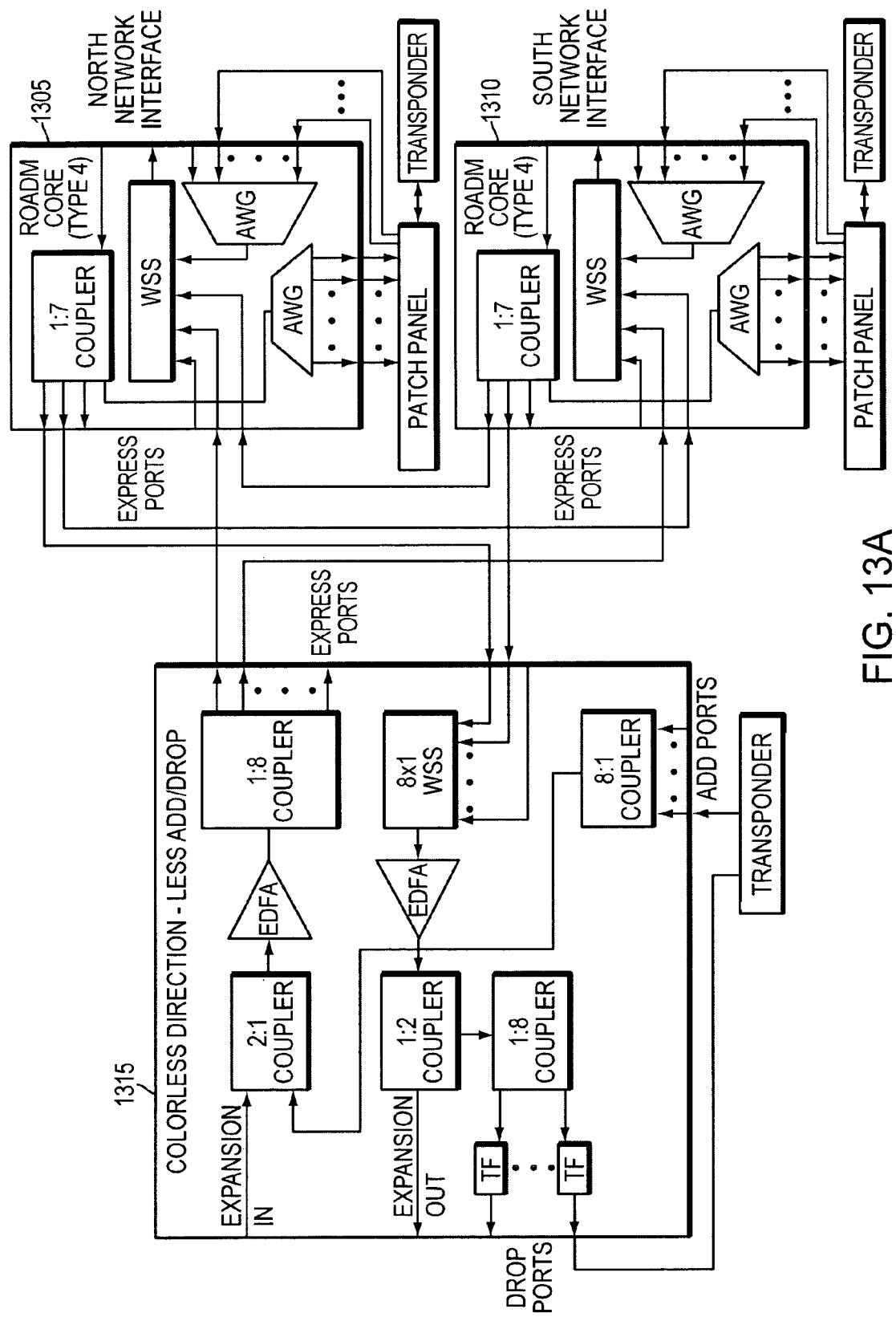
FIG. 13A is a block diagram of type-4 ROADM core modules and a colorless directionless add/drop module according to an example embodiment.

FIG. 13A is a block diagram showing how type-4 ROADM cores (containing integrated type-2 light distributors and combiners) can be used in place of the type-3 ROADM cores in order to supplement the directionless add/drop ports with fixed directional add/drop ports. In the type-4 ROADM cores 1305, 1310 shown in FIG. 13A, a wavelength selective switch (WSS) serves as the type-4 light combiner, array waveguide gratings (AWGs) serve as both the type-2 light distributor and the type-2 light combiner, and a 1:7 optical coupler serves as the type-1 light distributor. The colorless directionless add/drop module 1315 can provide colorless add/drop ports to either (or both) the north network interface and the south network interface, while the patch panel associated with the north ROADM core 1305 provides colored add/drop ports dedicated to the north network interface, and the patch panel associated with the south ROADM core 1310 provides colored add/drop ports dedicated to the south network interface.

Figure 13B:
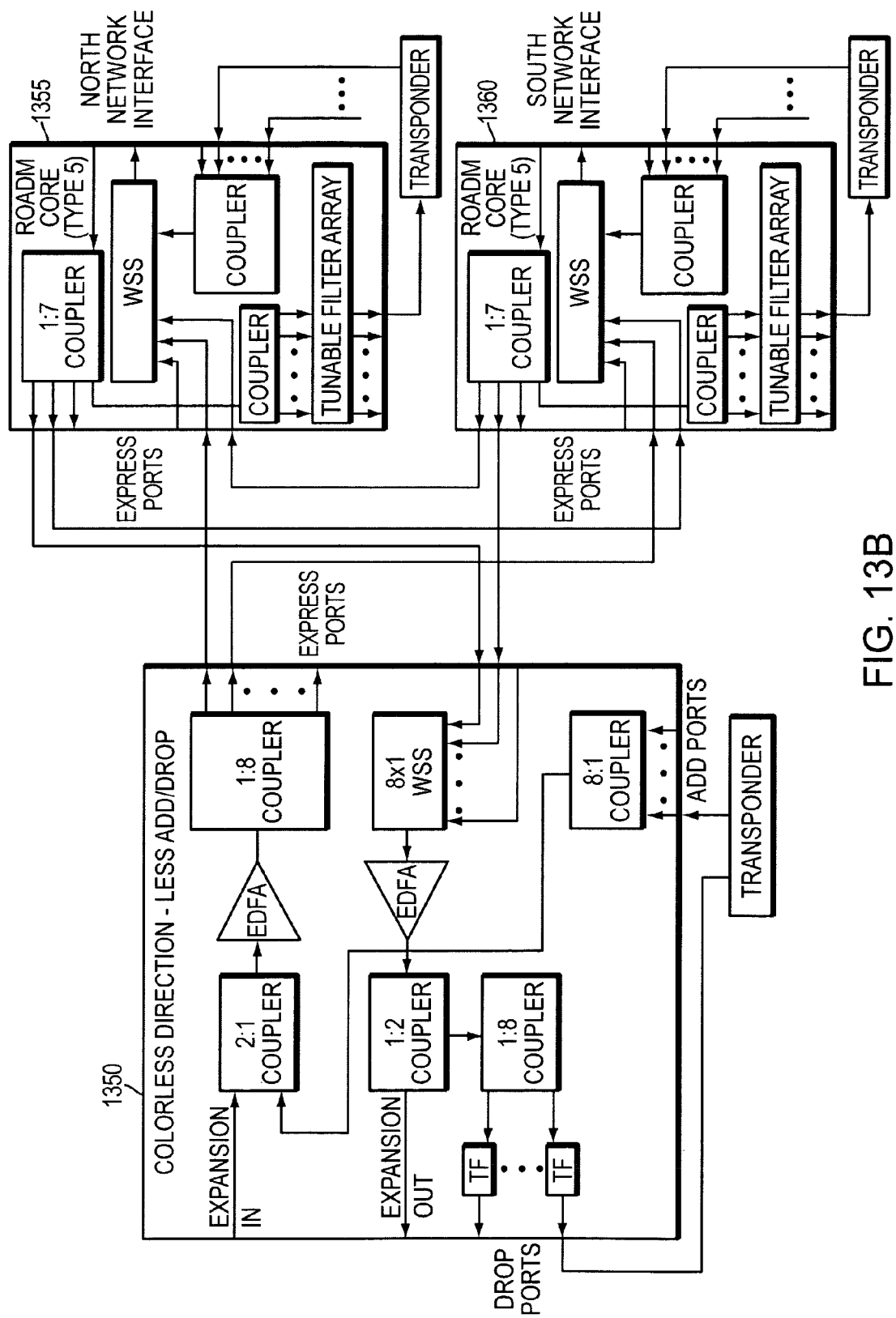
FIG. 13B is a block diagram of type-5 ROADM core modules and a colorless directionless add/drop module according to an example embodiment.

FIG. 13B is a block diagram of type-5 ROADM core modules paired with a colorless directionless add/drop module, such as the colorless directionless add/drop module 1315 shown in FIG. 13A. The type-5 ROADM core module contains the type-3 ROADM core along with some number of embedded colorless add/drop ports. These embedded add/drop ports provide directed colorless add/drop ports to the network interface to which the ROADM core is attached. FIG. 13B depicts the colorless directionless add/drop module 1350 connected to two type-5 ROADM core modules 1355, 1360.

The previous discussions centered around the type-3, type-4, and type-5 ROADM cores. These cores are similar in that they all contain type-4 light combiners with N inputs and 1 output, and type-1 light distributors with 1 input and N outputs. The mirror image of these three ROADM cores is the type-1 ROADM core. The type-1 ROADM core contains a type-4 light distributor with 1 input and N outputs, and a type-1 light combiner with N inputs and 1 output.

Figure 14:
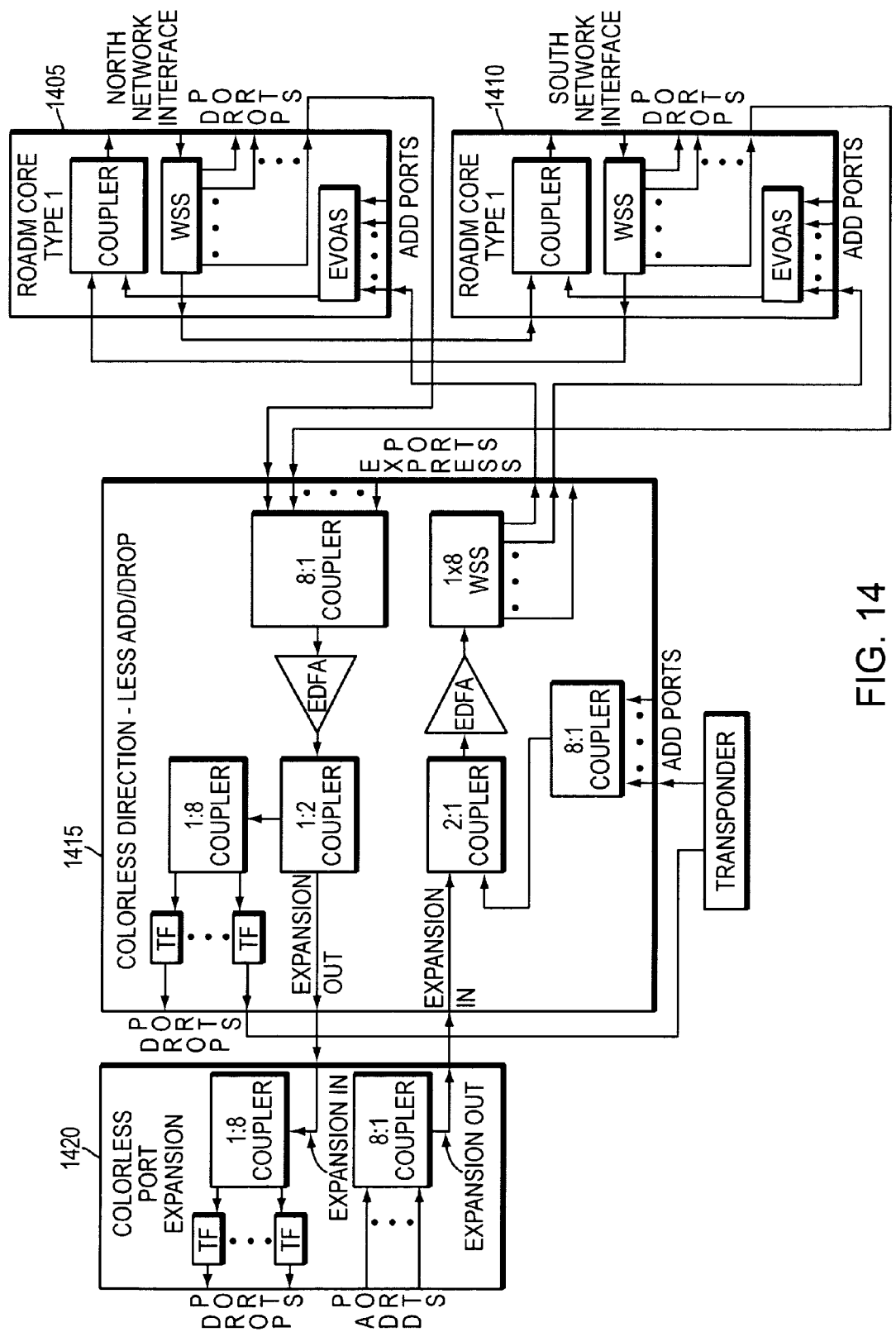
FIG. 14 is a block diagram of type-1 ROADM core modules, a colorless directionless add/drop module and colorless port expansion module according to an example embodiment.

FIG. 14 illustrates an example embodiment depicting one such possible type-1 ROADM core 1405, 1410 where a WSS serves as the type-4 light distributor, and an optical coupler serves as the light combiner. Additionally, an EVOA (electronically variable optical attenuator) may be placed on each of the express input ports. The EVOAs can be used to power balance a signal applied to an express input port connected to a transponder. The signal added via a transponder would be power balanced with the signals from other transponders and with the individual wavelengths on the express input ports that are connected to either other type-1 ROADM cores or colorless directionless add/drop modules. Alternatively, an individual EVOA can be placed on the transmitter of each transponder, and the EVOAs on the type-1 ROADM core can be removed.

FIG. 14 shows a single colorless directionless add/drop module 1415 connected to both ROADM cores 1405, 1410. Although similar to the colorless directionless add/drop module shown in FIGS. 13A and 13B (used with the type-3 and type-4 ROADM cores), the colorless directionless add/drop module 1415 shown in FIG. 14 is not identical to the colorless directionless add/drop module shown in FIGS. 13A and 13B. On the colorless directionless add/drop module 1415 shown in FIG. 14, a WSS serves as a 1 by 8 type-4 light distributor, while on the colorless directionless add/drop module shown in FIGS. 13A and 13B, a WSS serves as an 8 by 1 type-4 light combiner. In the colorless directionless add/drop module shown in FIGS. 13A and 13B, a 1:8 coupler (serving as a 1 to 8 type-1 light distributor) is used to direct light to the express input ports of the type-4 ROADM core, while in the colorless directionless add/drop module 1415 shown in FIG. 14, an 8:1 coupler (serving as an 8 to 1 light combiner) is used to accept light from the express output ports of the type-1 core ROADM 1405, 1410. Therefore, in much the same way that the type-1 ROADM core is the mirror image of the type-3 and type-4 ROADM core, the colorless directionless add/drop module 1415 shown in FIG. 14 is the mirror image of the colorless directionless add/drop module shown in FIGS. 13A and 13B (at least with respect to the processing of the express ports).

Some similarities exist between the two colorless directionless add/drop modules, however. For instance, a set of tunable filters is connected to the drop ports of both colorless directionless modules, and a type-1 light combiner is used to aggregate the add ports of both colorless directionless modules. The same colorless port expansion module can be used for both colorless directionless modules. A colored directionless add/drop module (similar to the module shown in FIG. 7A) could be created in support of the type-1 ROADM core by replacing the tunable filter array and 1:8 coupler of the FIG. 14 colorless directionless add/drop module with a type-2 light distributor, and by replacing the 8:1 coupler used on the add ports of the FIG. 14 colorless directionless add/drop module with a type-2 light combiner. However, since the type-1 ROADM core is typically used with colorless add/drop ports (although it is not required), it is less likely one would create a colored directionless add/drop module for use with the type-1 ROADM core.

A second type of colorless directionless add/drop module, shown in FIG. 14, may be referred to as a type-2 colorless directionless add/drop module, while the colorless directionless add/drop module of FIGS. 13A and 13B may be referred to as a type-1 colorless directionless add/drop module.

As shown in FIG. 14, in the add direction, the 8:1 coupler (serving as type-1 light combiner) on the type-2 colorless directionless add/drop module 1415 is used to combine the transmits wavelengths (of differing frequencies) from up to eight tunable transponders. These eight wavelengths are then combined with any additional added wavelengths from the colorless port expansion module 1420, and optionally amplified by the EDFA attached to the 1×8 WSS (serving as the type-4 light distributor) on the type-2 colorless directionless add/drop module. The 1×8 WSS on the type-2 colorless directionless add/drop module is then used to selectively forward each added wavelengths to one of the ROADM core modules.

Care should be taken to prevent wavelength contention on the output of the coupler (serving as the type-1 light combiner) on the various type-1 ROADM cores in the node. For instance, if a first wavelength of frequency $f_x$, is applied to one of the add ports of the North network interface ROADM core, then no colorless directionless add/drop module or other ROADM core module may forward a second wavelength to the north network interface ROADM core of the same frequency $f_x$, otherwise wavelength contention will occur at the output of the coupler on the north ROADM, resulting in the data content corruption of both wavelengths.

In the drop direction of FIG. 14, the WSS devices (serving as the type-4 light distributor) on the ROADM cores selectively forward each wavelength received from their corresponding network interfaces to the type-2 colorless directionless add/drop module, or to one of their express ports operating as an embedded colorless drop port, or to another ROADM core. For the case where there are multiple type-2 colorless directionless add/drop modules present, each of the WSS devices on the ROADM cores selectively forward each wavelengths received from their corresponding network interfaces to one of the colorless directionless add/drop modules, or to one of their express ports operating as an embedded colorless add/drop port, or to another ROADM core.

Care should also be taken to prevent wavelength contention at the output of the 8:1 coupler used to combine input express port signals on the type-2 colorless directionless add/drop module. For instance, if a first wavelength of frequency $f_x$ is applied to one of the input express ports of the colorless directionless add/drop module by one ROADM core, the second ROADM core cannot also apply a wavelength of the same frequency $f_x$ to an input express port of the colorless directionless add/drop module, otherwise wavelength contention will occur at the output of the 8:1 coupler, resulting in the data content corruption of both wavelengths.

The 8:1 coupler connected to the express input ports on the type-2 colorless directionless add/drop module in FIG. 14 is used to combine the wavelengths sent from each of the ROADM cores into one composite signal. This signal is then optionally amplified, and sent to a 1:2 optical coupler on the colorless directionless add/drop module. The 1:2 coupler is used to broadcast all the wavelengths from the amplifier to both the colorless port expansion module and the internal 1:8 coupler that is attached to the tunable filter array. Each tunable filter on the colorless expansion module and the colorless directionless add/drop module receives all the wavelengths sent from all the ROADM cores, and each tunable filter can selectively drop any of these wavelengths to their respective drop port.

FIG. 15 shows a DWDM node configuration 1500 identical to the node configuration shown in FIG. 9, except that each type-3 ROADM core is replaced with a type-1 ROADM core 1511-1514, and the type-1 colorless directionless add/drop module is replaced with the type-2 colorless directionless add/drop module 1520, and the colored directionless add/drop module of FIG. 9 is replaced with an equivalent colored directionless add/drop module 1525 which can interface to the type-1 ROADM core. The add/drop ports on either directionless add/drop module 1520, 1525 can be directed to any of the four network node interfaces.

Figure 16A:
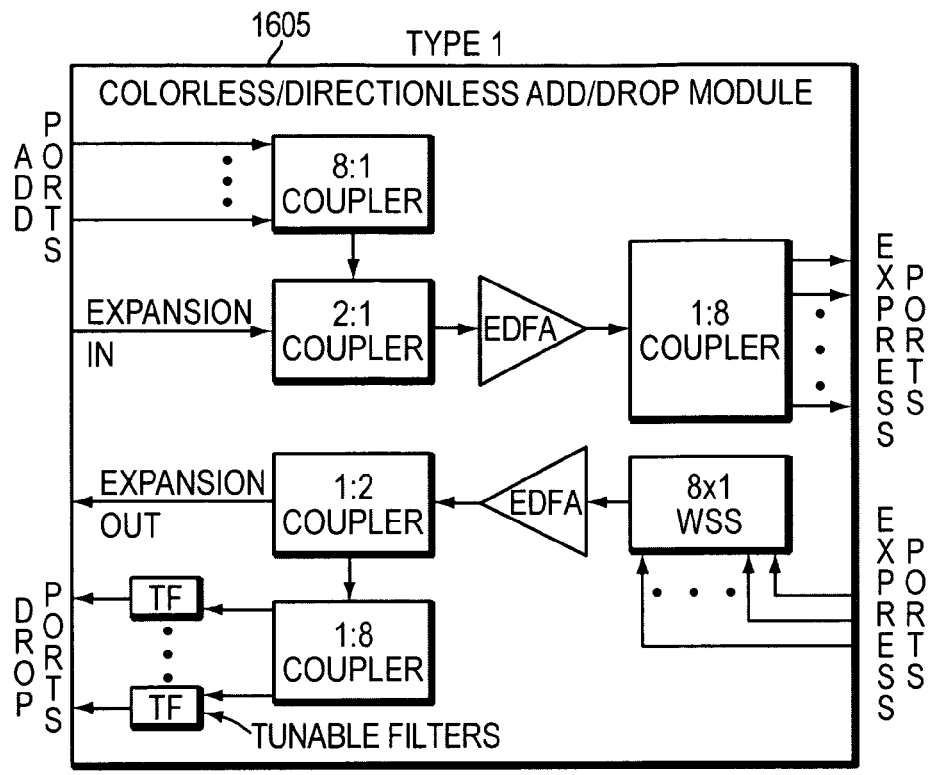
FIG. 16A is a block diagram of a type-1 colorless directionless add/drop module according to an example embodiment.
Figure 16B:
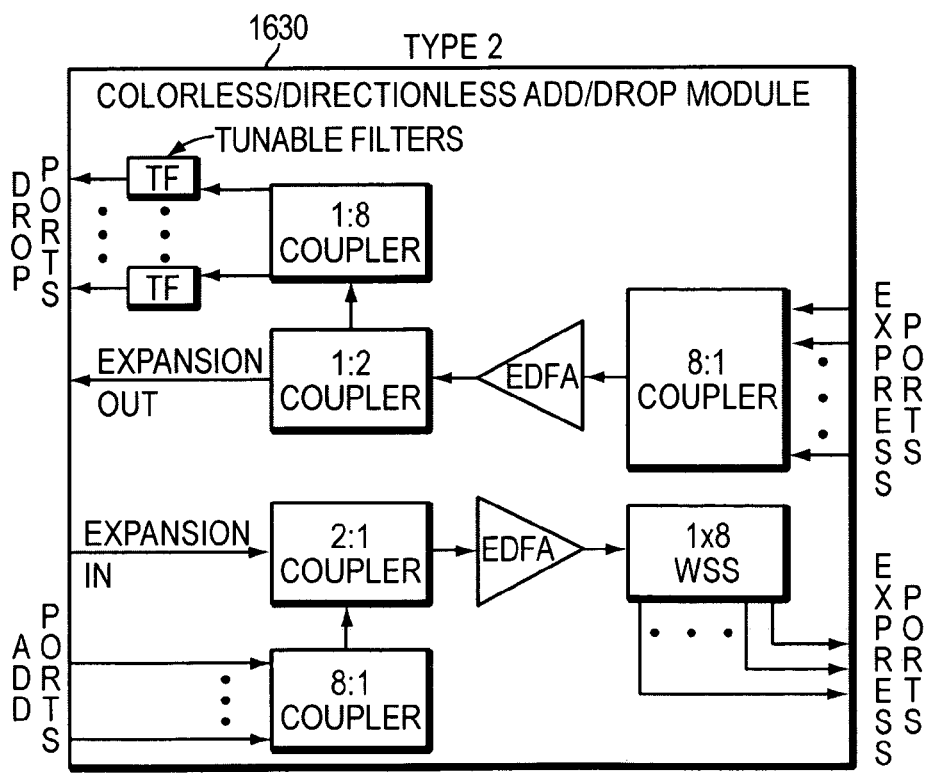
FIG. 16B is a diagram of a type-2 colorless directionless add/drop module according to an example embodiment.

FIGS. 16A and 16B illustrate two example embodiments of colorless directionless add/drop modules depicted side-by-side for comparison purposes. It can be seen that both modules 1605, 1630 contain identical optical components; however, the components are interconnected in two different ways on the two different module types.

In the add/drop module 1605 of FIG. 16A, signals (not shown) transmitted via a set of add ports are combined using an 8:1 coupler. The output of the 8:1 coupler is combined with signal(s) (not shown) on an expansion input using a 2:1 coupler, which, in turn, connects to an erbium-doped fiber amplifier (EDFA). The EDFA amplifies the combined signals and transmits them to a 1:8 coupler, which directs the amplified signal to each of eight express output ports. Similarly, eight express input ports are coupled to inputs of a 8:1 WSS, which outputs a combined signal to an EDFA. The EDFA feeds a 1:2 coupler, which transmits signals to an expansion output port and a 1:8 coupler. The 1:8 coupler splits its input eight ways, then transmits each of the eight outputs to a corresponding drop port via each of eight tunable filters (TF).

In the add/drop module 1630 of FIG. 16B, signals (not shown) transmitted via a set of add ports are combined using an 8:1 coupler. The output of the 8:1 coupler is combined with signal on an expansion input using a 2:1 coupler, which, in turn, connects to an erbium-doped fiber amplifier (EDFA). The EDFA amplifies the combined signals and transmits them to a 1:8 WSS, which directs the amplified signal to eight express output ports. Similarly, eight express input ports are coupled to the inputs of a 8:1 coupler, which outputs a combined signal to an EDFA. The EDFA feeds a 1:2 coupler, which transmits signals to an expansion output port and a 1:8 coupler. The 1:8 coupler splits its input eight ways, then transmits each of the eight outputs to a corresponding drop port via each of eight tunable filters (TF).

Figure 16C:
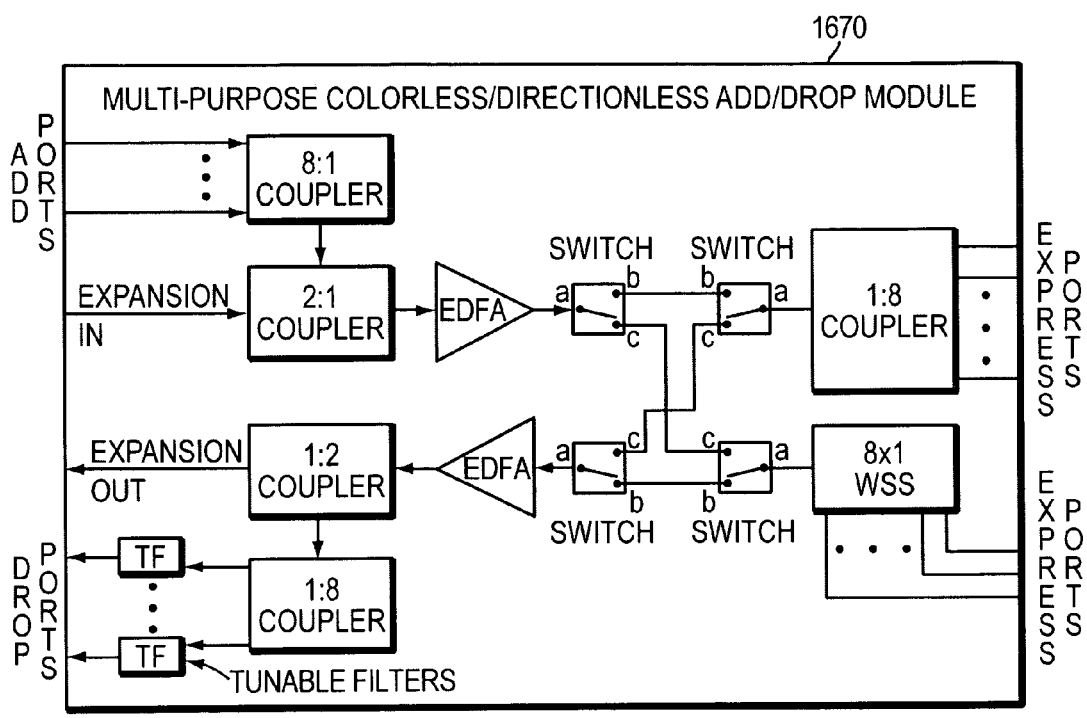
FIG. 16C is a block diagram of a multi-purpose colorless directionless add/drop module according to an example embodiment.

FIG. 16C illustrates a single "multi-purpose" colorless directionless add/drop module 1670 that can be utilized in both the node of FIG. 9 and the node of FIG. 15. Referring to FIG. 16C, the multi-purpose module 1670 takes advantage of the fact that the same optical coupler can be used as either a 1 by 8 type-1 light distributor or as an 8 by 1 type-1 light combiner. It also take advantage of the fact that most WSS devices can be used as either an 8 by 1 type-4 light combiner or as a 1 by 8 type-4 light distributor. Simple optical switches may then be used to interconnect the various components so that the module 1670 can be configured to operate as either a type-1 or type-2 colorless directionless add/drop module.

In order to configure the multi-purpose module 1670 as a type-1 colorless directionless add/drop module, each optical switch is set so that terminal "a" is connected to terminal "b."

In order to configure the multi-purpose module 1670 as a type-2 colorless directionless add/drop module, each optical switch is set so that terminal "a" is connected to terminal "c." It should be noted that if optical isolators are used on the inputs to the WSS when configured as a type-1 module, these isolators should also be switched out or otherwise by-passed when the multi-purpose module 1670 is configured as a type-2 module.

Figure 17:
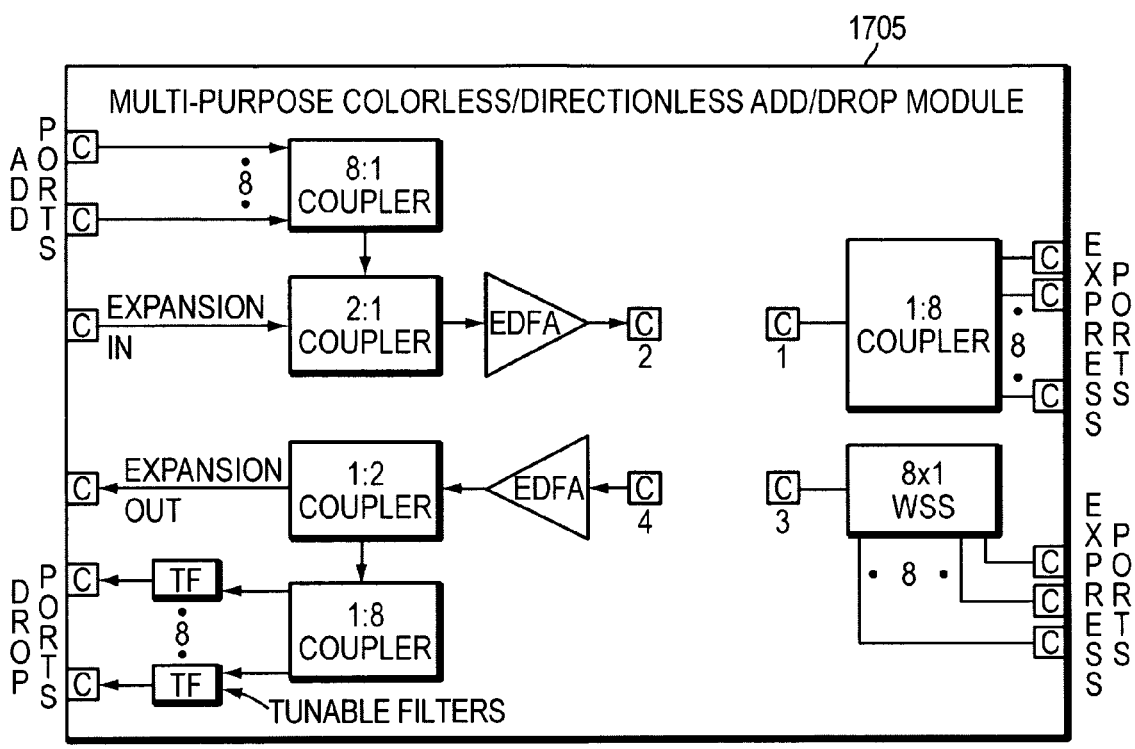
FIG. 17 is a block diagram of a multi-purpose colorless directionless add/drop module according to an example embodiment.

FIG. 17 illustrates an example embodiment of a multi-purpose colorless directionless add/drop module 1705 that can be configured as either a type-1 colorless directionless add/drop module or as a type-2 colorless directionless add/drop module. External optical connectors are denoted by small squares containing the letter "c" and attached to the exterior perimeter of the box surrounding all the components within the module. Internal optical connectors, also denoted by the small squares containing the letter "c" are located in the interior section of the box surrounding the components within the module. Each of the 4 internal optical connectors are sequentially number 1-4.

Figure 18A:
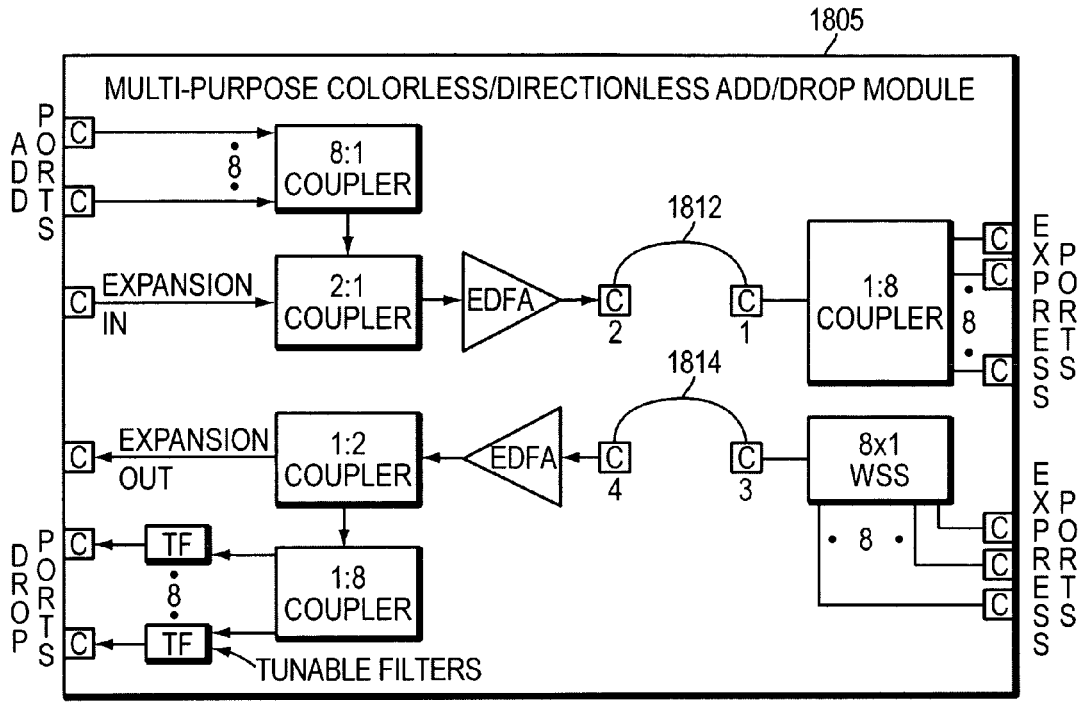
FIG. 18A is a block diagram of the multi-purpose colorless directionless add/drop module of FIG. 17 configured as a type-1 colorless directionless add/drop module according to an example embodiment.
Figure 18B:
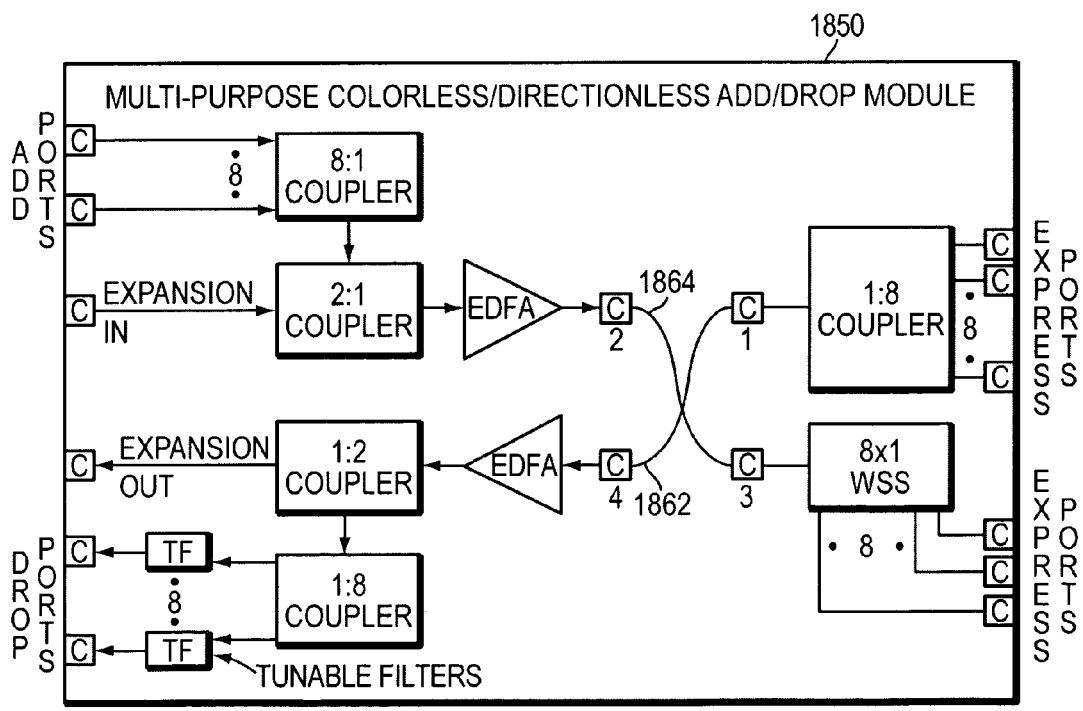
FIG. 18B is a block diagram of the multi-purpose colorless directionless add/drop module of FIG. 17 configured as a type-2 colorless directionless add/drop module according to an example embodiment.

FIGS. 18A and 18B are block diagrams showing alternative configurations of multi-purpose modules using optical jumpers. In order to configure the multi-purpose module as a type-1 colorless directionless add/drop module 1805, optical jumpers 1812 and 1814 are connected between the internal optical connectors as shown in FIG. 18A. Two optical jumpers 1812 and 1814 (each containing a single strand of fiber and two optical connectors) may be used. In order to configure the multi-purpose module as a type-2 colorless directionless add/drop module 1850, optical jumpers 1862 and 1864 are connected between the internal optical connectors as shown in FIG. 18B.

In the configurations shown in FIGS. 18A and 18B, two optical jumpers (1812, 1814, 1862 and 1864, each of which contain a single strand of fiber and two optical connectors) are used. The optical jumpers could be contained within the module and configured when the module is manufactured (such that an end user of the module is unable to access the jumper cables). Alternatively, the internal connectors could be made available to the end user such that the end user is able to configure the module for either application. For example, with the later approach, there could be a small door or other similar opening on the module which would allow an end user access to the four internal connections.

Figure 19A:
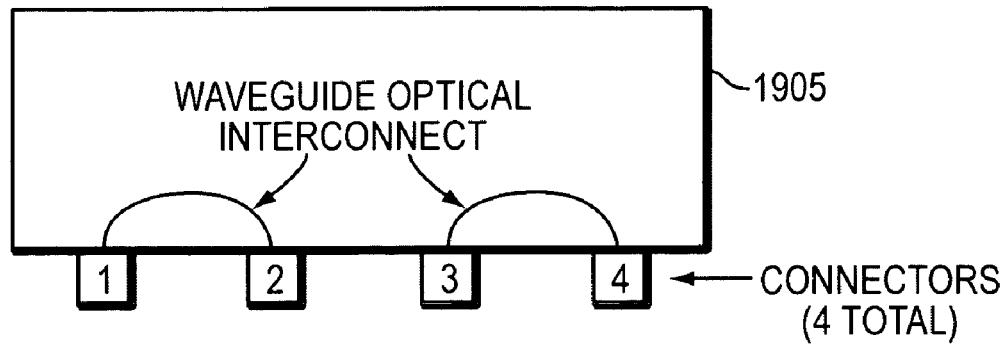
FIGS. 19A-C are block diagrams of example planar lightwave circuits according to example embodiments.
Figure 19B:
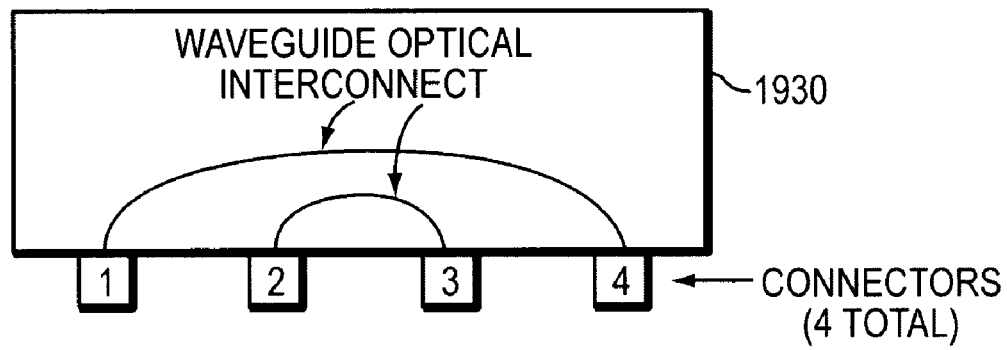
Figure 19C:
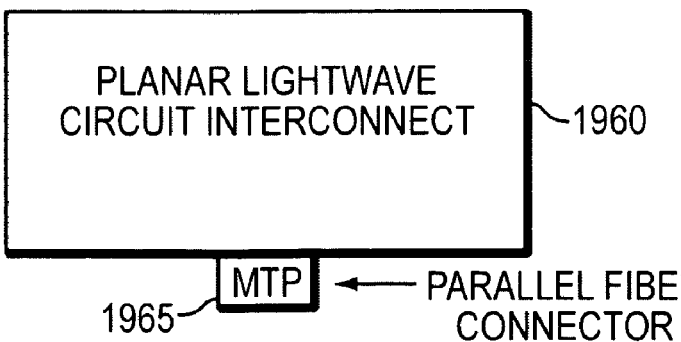

FIGS. 19A-19C are block diagrams of example planar lightwave circuits (PLCs) that can be used instead of optical jumpers to configure multi-purpose modules. The internal optical connectors can be co-located on the module, and two types of small PLC boards which contain two different interconnect patterns could be used. With careful organization of the four internal optical connectors, two single layer connection patterns could be created with no optical cross-overs.

FIG. 19A shows a planar lightwave circuit 1905 which could be used to interconnect the connectors labeled 1 to 4 in FIG. 17 in order to make the connections corresponding to the type-1 module of FIG. 18A. Similarly, FIG. 19B shows a planar lightwave circuit 1930 which could be used to interconnect the connectors labeled 1 to 4 in FIG. 17 in order to make the connections corresponding to the type-1 module of FIG. 18B. FIG. 19C shows a planar lightwave circuit 1960 equipped with a compact parallel connector 1965 (supporting 4 fibers). The connector could be an MTP type connector with four parallel fibers (as shown in FIG. 19C), or the connector could consist of a double set of dual-LC connectors, or some other alternative optical connector. The small planar lightwave circuit boards 1905, 1930, 1960 can easily plug into the multi-purpose colorless directionless add/drop module in order to configure the module. The PLC boards 1905, 1930, 1960 could plug into the front panel of the module or some place behind the front panel. Alternatively, bend-insensitive fiber could be used create small compact jumper devices that provide the same connections as the PLC boards.

Figure 20:
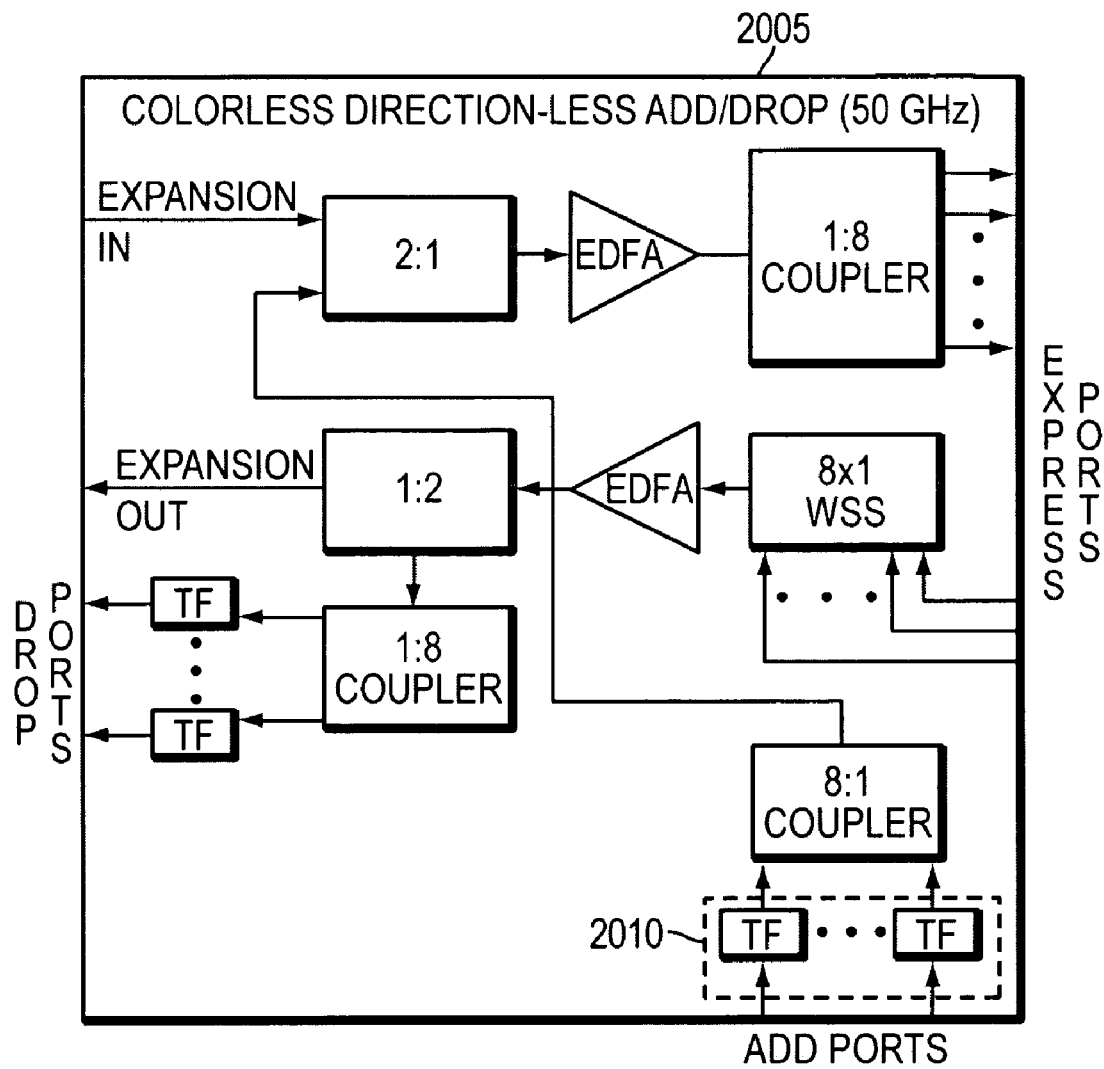
FIG. 20 is a block diagram of a 50 GHz colorless directionless add/drop module according to an example embodiment.

FIG. 20 is a block diagram of a 50 GHz colorless directionless add/drop module. The previous colorless directionless add/drop modules assume the use of DWDM optics with wavelengths spaced at 100 GHz. In order to support DWDM optics with wavelengths spaced at 50 GHz, an additional tunable filter array 2010 may be coupled to the add ports of the equivalent colorless directionless add/drop module 2005, as shown in FIG. 20. The 50 GHz colorless directionless add/drop module 2005 contains a 50 GHz WSS device, and all tunable filters have the narrower bandwidths associated with 50 GHz filters.

Figure 21:
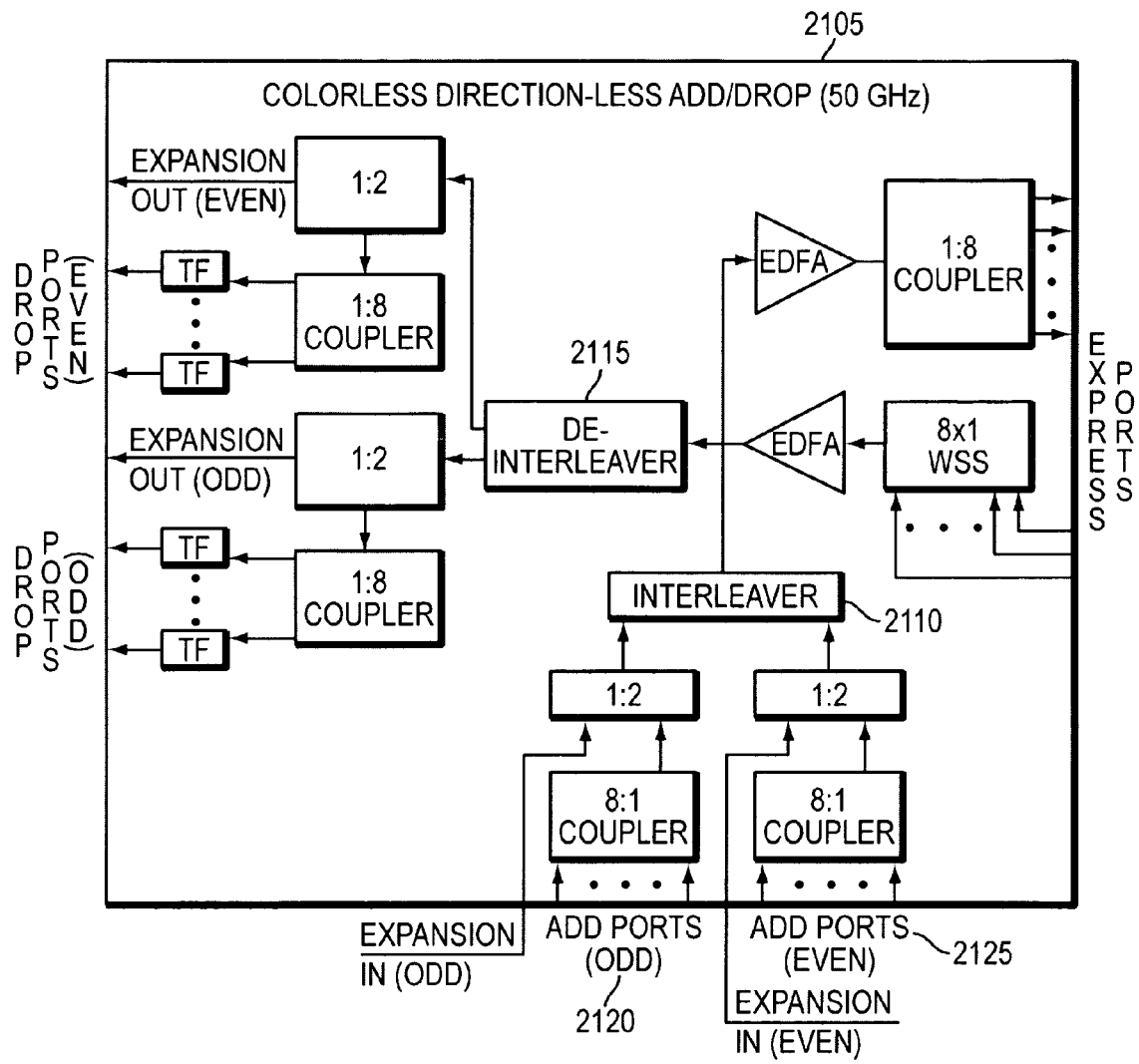
FIG. 21 is a block diagram of a 50 GHz colorless directionless add/drop module according to an alternative example embodiment.

FIG. 21 illustrates an example embodiment of the invention depicting a 50 GHz 50 GHz colorless directionless add/drop module 2105. In this embodiment, an interleaver filter 2110 is used on the add side of the module 2105, and a de-interleaver filter 2115 is used on the drop side of the module. The de-interleaver filter 2115 separates 50 GHz spaced wavelengths into a set of even wavelengths (spaced 100 GHz apart) and a set of odd wavelengths (also spaced 100 GHz apart). The odd set of wavelengths can then be forwarded to a first tunable filter array (with 100 GHz bandwidths), while even set of wavelengths can then be forwarded to a second tunable filter array (with 100 GHz bandwidths).

On the add side, there is a set of add ports 2120 for odd wavelengths and a set of add ports 2125 for even wavelengths. The odd wavelengths (spaced 100 GHz apart) are combined by a first 8:1 combiner, while the even wavelengths (spaced 100 GHz apart) are combined by a second 8:1 combiner. The signal containing the odd wavelengths are then sent to a first input of a 2 to 1 interleaver filter 2110, while the signal containing the even wavelengths are sent to a second input of the 2 to 1 interleaver filter 2110. The interleaver filter 2110 is then used to combine the two sets of wavelengths into one composite signal containing both the odd and even wavelengths, where the odd and even wavelengths are interleaved with one another. The composite signal is then optionally amplified and forwarded to a 1 to 8 optical coupler that is used to broadcast the interleaved signal to multiple ROADM core modules (also containing 50 GHz spaced optics).

The FIG. 20 and FIG. 21 modules 2005, 2105 are type-1 50 GHz colorless directionless add/drop modules. Type-2 50 GHz colorless directionless add/drop modules can be created by performing similar substitutions of the 100 GHz components on the type-2 colorless directionless add/drop module shown in FIG. 14. For instance, the 100 GHz WSS on the type-2 colorless directionless add/drop module in FIG. 14 can be replaced with a 50 GHz WSS, the 100 GHz tunable filter array can be replaced with a 50 GHz tunable filter array, and an additional 50 GHz tunable filter array can optionally be added to the add ports of the colorless directionless add/drop module in order to create the type-2 50 GHz colorless directionless add/drop module.

Figure 22:
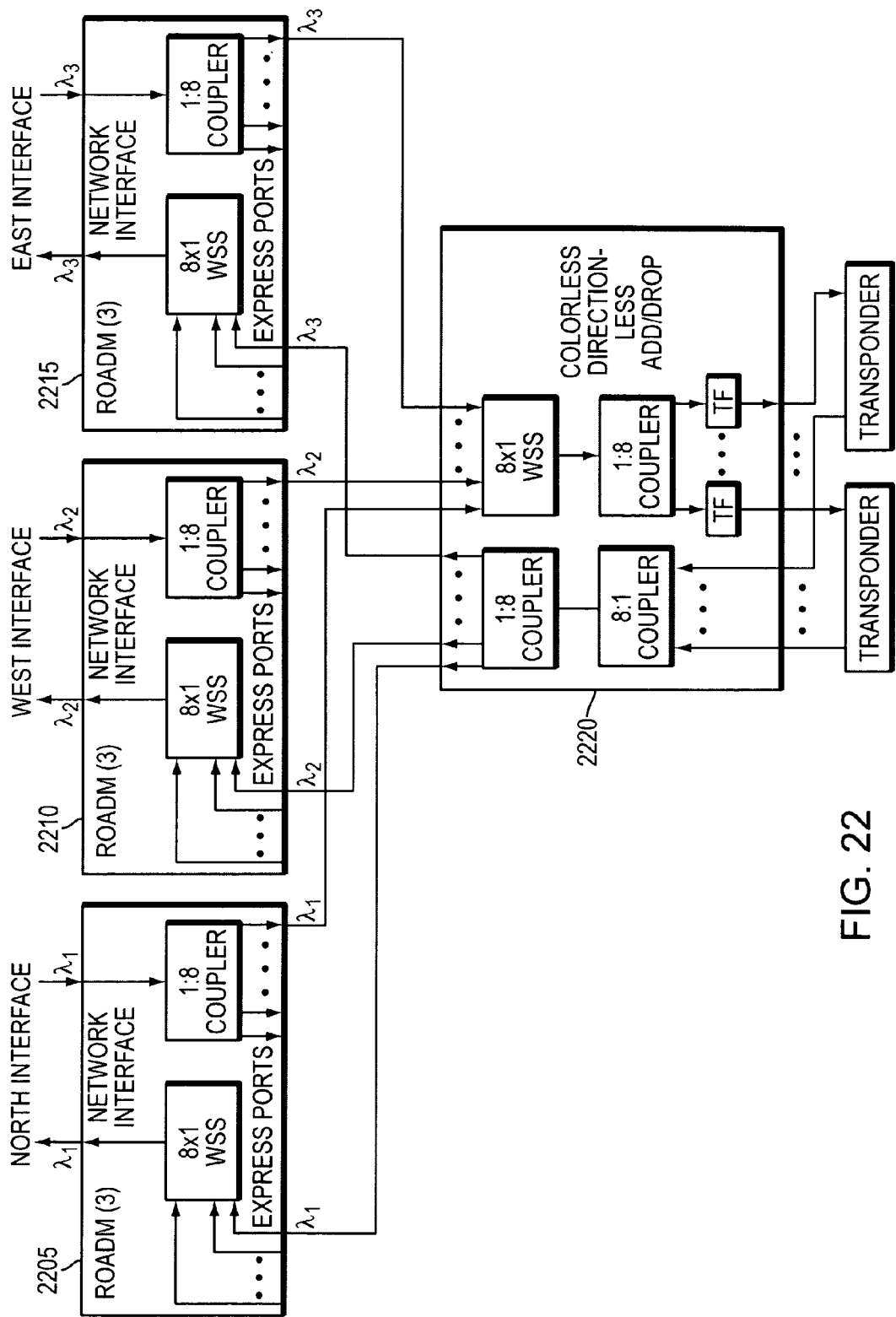
FIG. 22 is a block diagram of an optical node including three ROADM core modules and a colorless directionless add/drop module according to an example embodiment.

FIG. 22 shows an example embodiment where a node contains three degrees, and thus three ROADMs (Type-3 ROADMS). Initially a single colorless directionless add/drop module 2220 is deployed in the node, as shown in FIG. 22. A single wavelength is add/dropped from the North Interface 2205 (λ1), a single wavelength is add/dropped from the West Interface 2210 (λ2), and a single wavelength is add/dropped from the East Interface 2215 (λ3). Some time later, there is a desire to add/drop λ1' from the West Interface 2210, where λ1' is of the same frequency as λ1 which is add/dropped from the North Interface 2205 (but contains different data). Wavelength λ1' could be forwarded to the colorless directionless add/drop module 2220 in FIG. 22, but since λ1' is of the same frequency as λ1, the WSS within 2220 would not be able to forward λ1' to its output port, as this would cause contention with λ1, which is already on its output port. Similarly, in the add direction on the colorless directionless add/drop module 2220 in FIG. 22, λ1' would contend with λ1 at the output of the 8:1 coupler on the colorless directionless add/drop module 2220.

Figure 23:
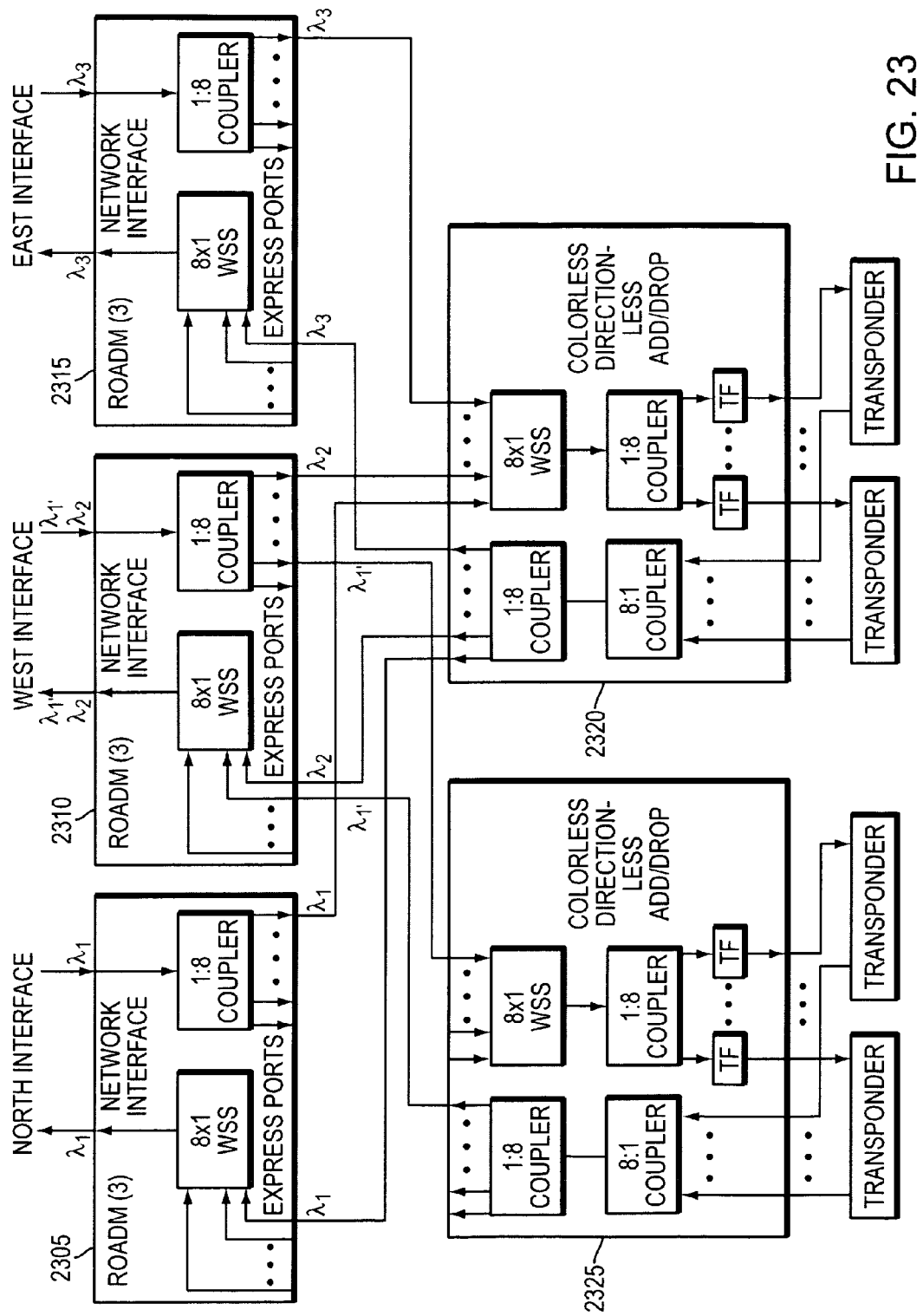
FIG. 23 is a block diagram of an optical node including three ROADM core modules and two colorless directionless add/drop modules according to an example embodiment.

FIG. 23 illustrates one solution to the contention issue where a second colorless directionless add/drop module 2325 is added to the node. For this case, λ1' is now routed to the second colorless directionless add/drop module 2325, and as a result, there is no wavelength contention at any point in the node. However, in order to route λ1' to the second colorless directionless add/drop module 2325, a second express port should be utilized on the ROADM 2310 attached to the West Interface, as shown in FIG. 23. However, using a second express port on the ROADM 2310 may prevent the second express port from being used for other purposes (such as the expansion of the node to greater than three degrees). Therefore, there may be situations where it is desirable to add multiple colorless directionless add/drop modules to a node while using only a single express port on each ROADM module.

Figure 24:
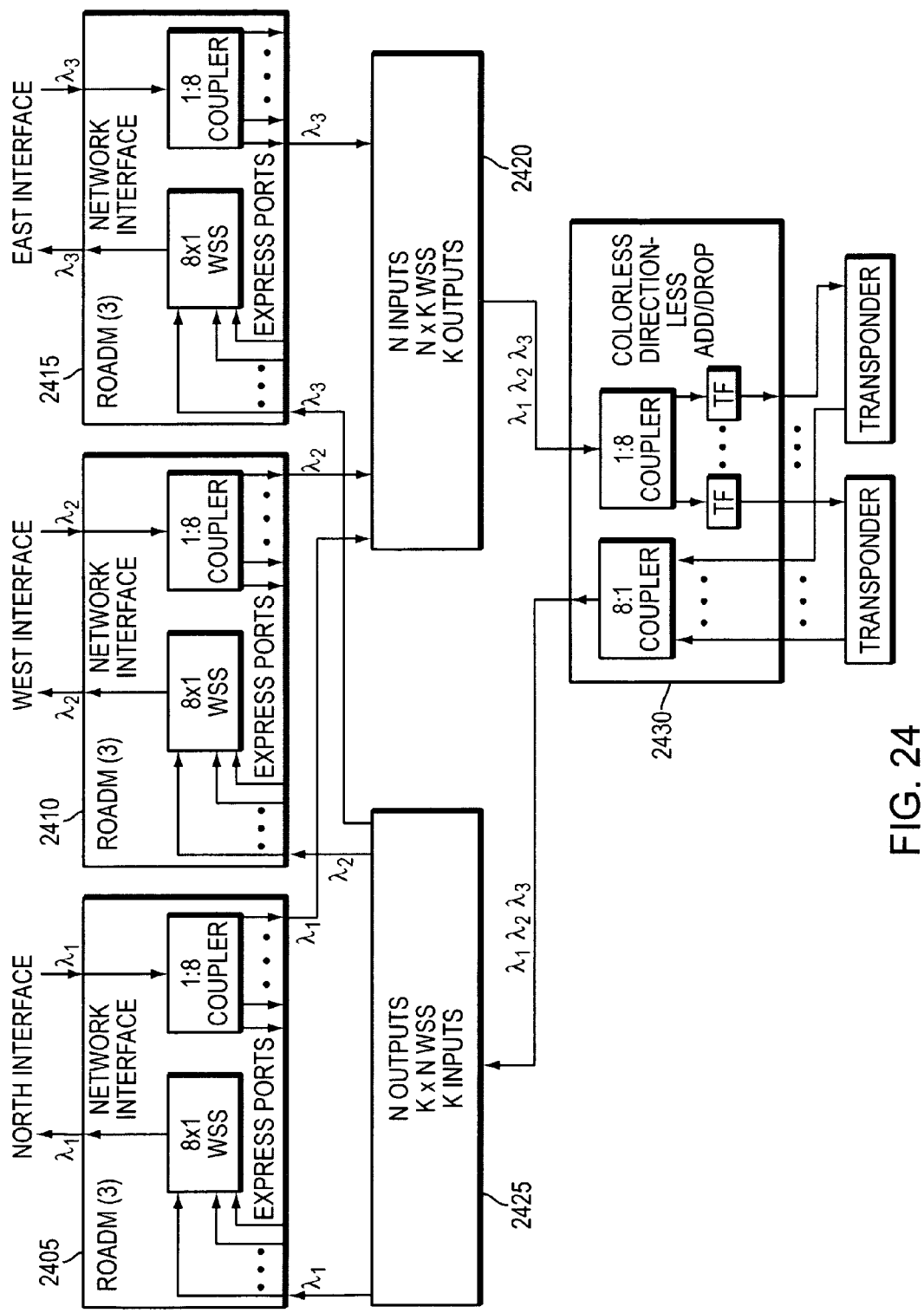
FIG. 24 is a block diagram of an optical node including three ROADM core modules, a K×N wavelength selective switch (WSS) module, a N×K WSS module, and a colorless directionless add/drop module according to an example embodiment.
Figure 25:
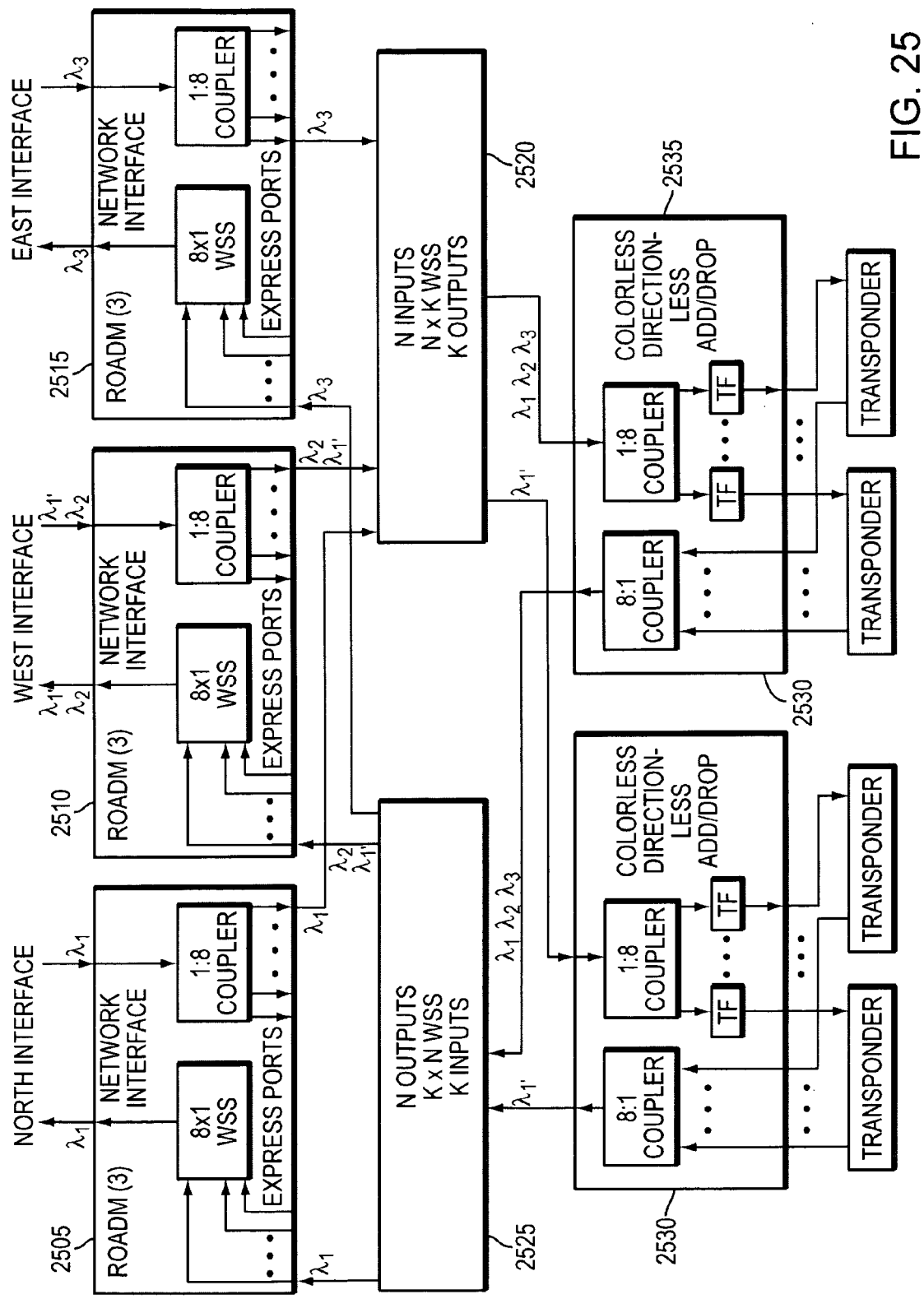
FIG. 25 is a block diagram of an optical node including three ROADM core modules, a K×N WSS module, a N×K WSS module, and two colorless directionless add/drop modules according to an example embodiment.

FIGS. 24-26 illustrate example embodiments depicting an N×K WSS. An N×K WSS can be used to limit the number of ROADM express ports needed to support multiple colorless directionless add/drop modules.

FIG. 24 illustrates an example embodiment where a simpler colorless directionless add/drop module 2430 is deployed along with an N×K WSS 2420 and a K×N WSS 2425. Ideally, the N×K WSS 2420 and the K×N WSS 2425 would reside on the same physical module. In general, an N×K WSS 2420 contains N physical optical inputs and K physical optical outputs. The N×K WSS 2420 provides the ability to route any wavelength arriving on any of the N inputs to any of the K outputs (with the assumption that no two wavelengths of the same frequency are forwarded to the same output). Similarly, the K×N WSS 2425 provides the ability to route any wavelength arriving on any of the K inputs to any of the N outputs (with the assumption that no two wavelengths of the same frequency are forwarded to the same output). In general, the value of N and K can be any integer value, but in practice N may be equal to the maximum number of degrees supported by the node, while K may be equal to the maximum number of colorless directionless add/drop modules supported by the node.

The embodiment of FIG. 24 is similar to the case shown in FIG. 22 where a single wavelength is add/dropped from the North Interface (λ1), a single wavelength is add/dropped from the West Interface (λ2), and a single wavelength is add/dropped from the East Interface (λ3). However, in FIG. 24, a simpler colorless directionless add/drop module may be used, that is, one which does not contain a WSS or a second 1:8 coupler. A WSS is not required on the colorless directionless add/drop module 2430 because the filtering function of the WSS is now performed by the N×K WSS 2420. Similarly, a second 1:8 "fan-out" coupler is not needed on the colorless directionless add/drop module because the fan out function is now performed by the K×N WSS 2425.

FIG. 25 illustrates an example embodiment where λ1' may be add/dropped from the West Interface, where λ1' is of the same frequency as λ1 which is add/dropped from the North Interface. As was the case in the previous scenario, a second colorless directionless add/drop module 2530 is added to the node to prevent contention at the single colorless directionless add/drop module shown in FIG. 24. However, in this embodiment, there is no need to use a second express port on the ROADM 2510 associated with the West Interface. Instead, a second output is used on the N×K WSS 2520 and a second input is used on the K×N WSS 2525, and then the N×K WSS 2520 is used to route λ1' to the second colorless directionless add/drop module 2530, and the K×N WSS 2525 is used to route λ1' from the colorless directionless add/drop module 2530 to the ROADM 2510 associated with the West Interface. It should be noted that within the configuration shown in FIG. 25, the N×K WSS 2520 and K×N WSS devices are single points of failure.

FIG. 26 is an example embodiment illustrating how single point failures can be eliminated by adding a second module 2625 containing an N×K WSS and a K×N WSS, and by adding some simple optical switches to the colorless directionless add/drop module 2630, 2635 and to the ROADMs 2605, 2610, 2615. It is assumed that only one of the two K×N-plus-N×K WSS modules 2620, 2625 is actively used at any point in time. The switches on the ROADM modules 2605, 2610, 2615 and the colorless directionless add/drop modules 2630, 2635 direct wavelengths to and from the active K×N-plus-N×K WSS module.

If the active K×N-plus-N×K WSS module fails, then the switches on the ROADM modules 2605, 2610, 2615 and the colorless directionless add/drop modules 2630, 2635 would switch to the standby K×N-plus-N×K WSS module, thus avoiding the single point of failure (such as that shown in FIG. 25). It should be noted that it is possible to use 1 to 2 optical couplers instead of 1 to 2 optical switches at the output of the ROADMs 2605, 2610, 2615, and it is possible to use 1 to 2 optical couplers instead of 1 to 2 optical switches at the output of the colorless directionless add/drop modules 2630, 2635 shown in FIG. 26.

It should be noted that the K×N-plus-N×K WSS module (2620, 2625) could operate as a stand-alone colorless directionless add/drop module. If the K×N-plus-N×K WSS module was used in this manner, the K inputs/outputs of the module would be connected directly to transponders.

Figure 27:
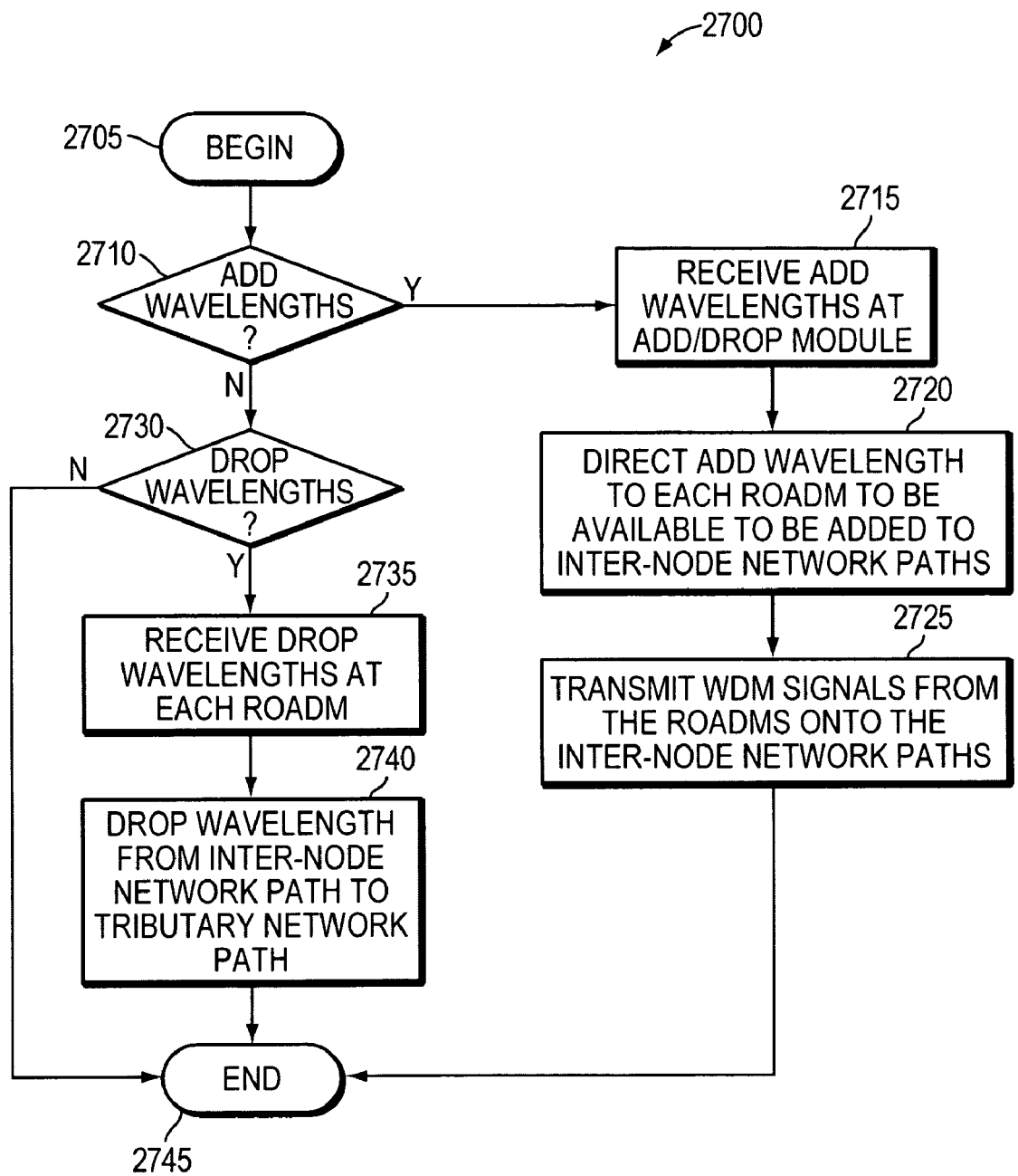
FIG. 27 is a flow diagram illustrating procedures performed in accordance with example embodiments of the invention.

FIG. 27 is a flow diagram illustrating a method 2700 for routing optical signals within an optical node according to an example embodiment of the invention. Routing begins (2705) by determining if the optical signals to be routed are add wavelengths (2710). If the signals are add wavelengths, then an add/drop module receives the add wavelengths (2715). The add wavelengths are directed to each ROADM (2720) where they are available to be added to inter-node network paths. Next, the respective WDM signals are transmitted (2725) from the at least two ROADMs onto the inter-node network paths.

If the optical signals to be routed are not add wavelengths (2710), the next determination is whether the optical signals are drop wavelengths (2730); if so, the ROADMs receive drop wavelengths (2735) via the inter-node network paths such that they are available to be dropped to the tributary network passed via intra-node network paths. Finally, the drop wavelengths may be dropped (2740) to the tributary network paths.

Figure 28:
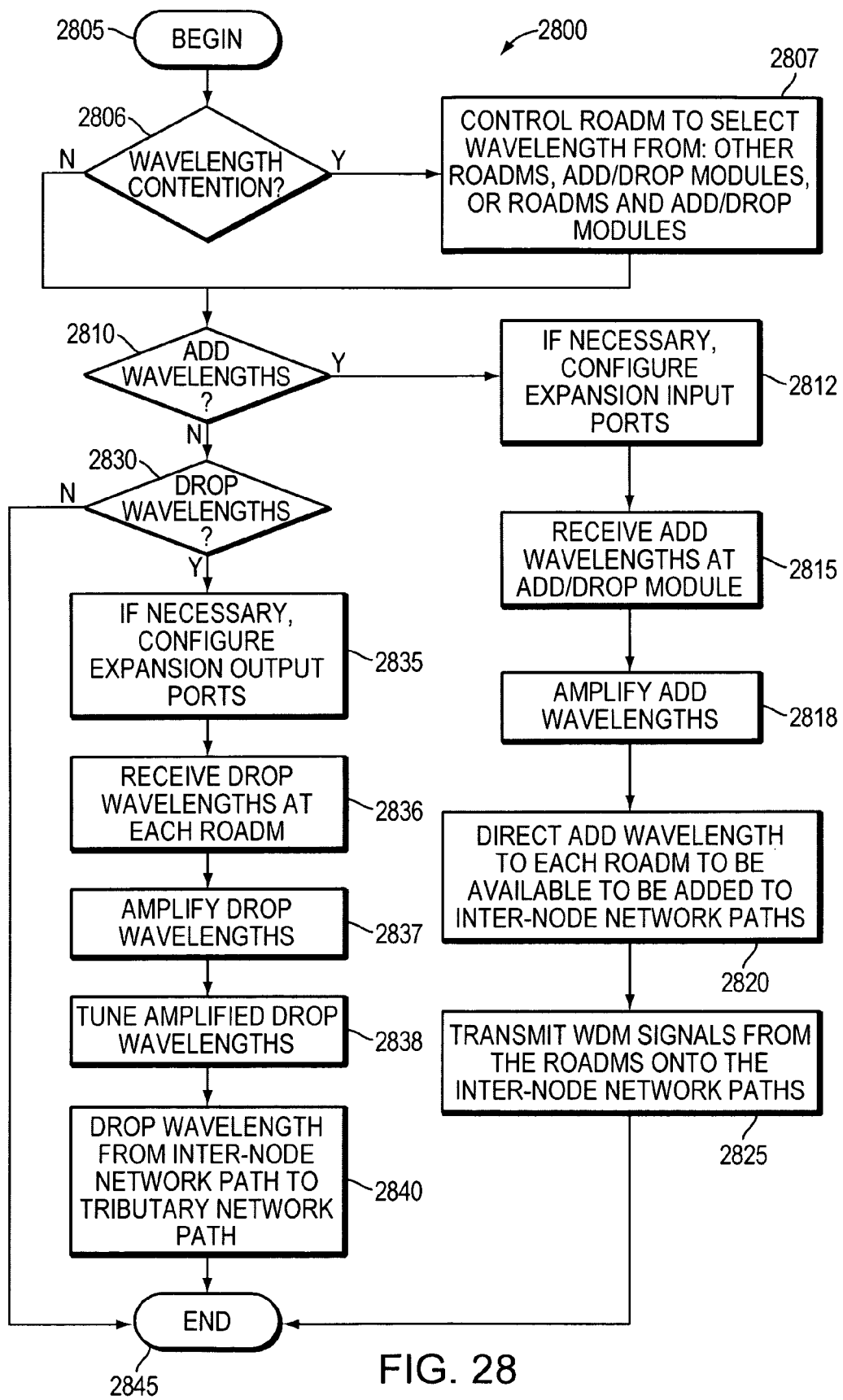
FIG. 28 is a flow diagram illustrating alternative procedures performed in accordance with example embodiments of the invention.

FIG. 28 is a flow diagram illustrating an alternative example method 2800 for routing optical signals within an optical node according to example embodiments of the invention. Routing begins (2805), with checking (2806) if there is wavelength contention (i.e., more than one of the same wavelength from different sources). If wavelength contention exists, one ROADM may be controlled (2807) to select one of the contending wavelengths from other ROADMs, add/drop modules, or a combination of ROADMs and add/drop modules.

If the optical signals to be routed are add wavelengths (2810), the add/drop module receives the add wavelengths (2815), possibly after configuration of expansion ports (2812) to accommodate additional add wavelengths. Next, the add wavelengths are amplified (2818) before being directed to each ROADM (2820), where they are available to be added to inter-node network paths. The add wavelengths are then transmitted (2825) from the at least two ROADMs onto the inter-node network paths.

If the optical signals to be routed are not add wavelengths (2810), the next determination is whether the optical signals are drop wavelengths (2830). If so, expansion input ports are configured as necessary (2835) to accommodate additional drop wavelengths. The ROADMs receive the drop wavelengths (2836) via the inter-node network paths such that they are available to be dropped to the tributary network passed via intra-node network paths. The drop wavelengths are amplified (2837) and tuned (2838) before being dropped to the tributary network paths (2840).

In the foregoing description, the invention is described with reference to specific example embodiments thereof. The specification and drawings are accordingly to be regarded in an illustrative rather than in a restrictive sense. It will, however, be evident that various modifications and changes may be made thereto, such as in a form of computer program product or software, hardware, firmware, or any combination thereof, without departing from the broader spirit and scope of the present invention.

Software embodiments of the present invention may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While this invention has been particularly shown and described with references to example embodiments thereof, it will be understood by those skilled in the art that various changes in form and details may be made therein without departing from the scope of the invention encompassed by the appended claims.

What is claimed is:

1. An optical node, comprising:
   at least two reconfigurable optical add/drop multiplexers (ROADMs) to transmit respective wavelength division multiplexed (WDM) signals onto at least two inter-node network paths; and
   at least one add/drop module including add ports to direct each add wavelength received from tributary network paths to any of the at least two ROADMs via intra-node network paths to be available to be added to the inter-node network paths.

2. The optical node according to claim 1 wherein the add/drop module further includes drop ports coupled to each of the ROADMs via the intra-node network paths to drop wavelengths from any of the at least two inter-node network paths to the tributary network paths.

3. The optical node according to claim 2 wherein the add/drop module further includes at least one expansion port, wherein the at least one expansion port is selectably configured to add additional add/drop ports to the add/drop module.

4. The optical node according to claim 2 wherein the optical node is a core node of a metro network configured to deliver video content from content servers via nodes of the metro network to nodes on tributary network paths coupled to the metro network by the core nodes.

5. The optical node according to claim 1 wherein the number of add/drop modules is fewer than the number of ROADMs.

6. The optical node according to claim 1 wherein the at least one add/drop module includes a colored add/drop module.

7. The optical node according to claim 1 wherein the at least one add/drop module includes a colorless add/drop module.

8. The optical node according to claim 7 wherein the at least one add/drop module further includes a tunable filter array.

9. The optical node according to claim 1 wherein the at least one add/drop module includes an optical amplifier to amplify the wavelengths to be transmitted to each of the ROADMs via the intra-node network paths.

10. The optical node according to claim 1 wherein the at least two ROADMs and at least one add/drop module further include express ports, wherein the number of express ports is a function of the number ROADMs and add/drop modules.

11. The optical node according to claim 10 wherein the number of express ports on each ROADM is more than the number of express ports on each add/drop module.

12. The optical node according to claim 10 wherein the number of express ports on each ROADM is equal to the number of express ports on each add/drop module.

13. The optical node according to claim 10 wherein the number of express ports on each ROADM is fewer than the number of express ports on each add/drop module.

14. The optical node according to claim 1 wherein the optical node further includes at least two add/drop modules and a controller, wherein the controller is operable to configure the ROADMs to select one of at least two of the same wavelengths from the at least two add/drop modules to output the wavelength on the respective inter-node path.

15. The optical node according to claim 1 wherein the optical node further includes at least three ROADMs and a controller, wherein the controller is operable to configure a ROADM to select one of at least two of the same wavelengths from the other ROADMs to output the wavelength on the respective inter-node path.

16. The optical node according to claim 1 wherein the optical node further includes a controller operable to configure each ROADM to select one of at least two of the same wavelengths from the at least one add/drop module and from the at least one other ROADM to output the wavelength on the respective inter-node path.

17. The optical node according to claim 1 wherein the at least one add/drop module includes multiple optical devices, including combiners, distributors, and amplifiers.

18. The optical node according to claim 1 wherein the at least one add/drop module further includes a wavelength selective switch (WSS), wherein the WSS is used to select wavelengths from multiple intra-node network paths or to direct wavelengths to multiple intra-node network paths.

19. A method of routing optical signals within an optical node, the method comprising:
 directing add wavelengths received from tributary network paths to each of at least two reconfigurable optical add/drop multiplexers (ROADMs) via intra-node network paths to be available to be added to inter-node network paths; and
 transmitting respective wavelength division multiplexed (WDM) signals from the at least two ROADMs onto the inter-node network paths.

20. The method according to claim 19 further including directing drop wavelengths received via the inter-node network paths at the at least two ROADMs to be available to be dropped to the tributary network paths via the intra-node network paths.

21. The method according to claim 20 wherein directing add or drop wavelengths is performed using fewer add/drop modules than ROADMs.

22. The method according to claim 20 further including configuring expansion ports to provide the ability to direct additional add or drop wavelengths.

23. The method according to claim 20 wherein directing add or drop wavelengths is performed in a colored manner.

24. The method according to claim 20 wherein adding or dropping wavelengths is performed in a colorless manner.

25. The method according to claim 20 wherein directing drop wavelengths includes tuning the wavelength prior to dropping the wavelengths.

26. The method according to claim 20 further including amplifying the wavelengths prior to directing them to be added or dropped.

27. The method according to claim 20 further including delivering video content from content servers to nodes on tributary network paths via nodes on a metro network, wherein the optical node is a core node of the metro network.

28. The method according to claim 20 wherein adding or dropping wavelengths is performed using at least one of the following: combining the wavelengths, distributing the wavelengths, and amplifying the wavelengths.

29. The method according to claim 19 further including transmitting and receiving at least a subset of WDM signals via inter-node paths in an express manner.

30. The method according to claim 19 further including controlling one ROADM to select one of at least two of the same wavelengths to output the wavelength onto a respective inter-node network path.

31. The method according to claim 30 wherein the one ROADM is among at least three ROADMs, and wherein controlling the one ROADM includes selecting the wavelength from other ROADMs.

32. The method according to claim 30 wherein controlling the one ROADM includes selecting the wavelength from at least one add/drop module and the at least one other ROADM.

33. The method according to claim 30 wherein controlling one ROADM includes selecting the wavelength from at least two add/drop modules.

* * * * *